US006236530B1

(12) United States Patent
Schneider et al.

(10) Patent No.: US 6,236,530 B1
(45) Date of Patent: May 22, 2001

(54) DATA CARTRIDGE LIBRARY HAVING A PIVOTING CARTRIDGE TRANSPORT

(75) Inventors: Robert E. Schneider, Louisville; Brian P. Egan, Thornton; John D. Miller, Boulder, all of CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/401,652

(22) Filed: Sep. 23, 1999

Related U.S. Application Data

(60) Division of application No. 09/121,541, filed on Jul. 24, 1998, which is a continuation-in-part of application No. 08/970,205, filed on Nov. 14, 1997.

(51) Int. Cl.[7] .................................................. G11B 15/68
(52) U.S. Cl. .................................................................. 360/92
(58) Field of Search ........................................................ 360/92

(56) References Cited

U.S. PATENT DOCUMENTS

| 4,918,548 | 4/1990 | O'Donnell et al. | 360/92 |
|---|---|---|---|
| 4,972,277 | 11/1990 | Sills et al. | 360/92 |
| 4,984,106 | 1/1991 | Herger et al. | 360/92 |
| 5,021,902 | 6/1991 | Ishikawa et al. | 360/92 |
| 5,059,772 | 10/1991 | Younglove | 360/92 |
| 5,103,986 | 4/1992 | Marlowe | 211/41 |
| 5,184,260 | 2/1993 | Pierrat | 360/92 |
| 5,237,467 | 8/1993 | Marlowe | 360/92 |
| 5,402,283 | 3/1995 | Yamakawa et al. | 360/92 |
| 5,416,653 | 5/1995 | Marlowe | 360/92 |
| 5,442,500 | 8/1995 | Hidano et al. | 360/92 |
| 5,469,310 | 11/1995 | Slocum et al. | 360/92 |
| 5,487,579 | 1/1996 | Woodruff et al. | 294/115 |
| 5,498,116 | 3/1996 | Woodruff et al. | 360/92 |
| 5,502,697 | 3/1996 | Taki | 360/92 |
| 5,555,143 | 9/1996 | Hinnen et al. | 360/92 |
| 5,659,440 | 8/1997 | Acosta et al. | 360/92 |
| 5,739,978 | 4/1998 | Ellis et al. | 360/92 |

*Primary Examiner*—Craig A. Renner
(74) *Attorney, Agent, or Firm*—Nixon & Vanderhye P.C.

(57) ABSTRACT

A cartridge library comprises plural cells for accommodating therein a cartridge of information storage media and a tape drive which transduces information relative when a cartridge is loaded into the drive. A cartridge loader (also known as the cartridge transport assembly) is mounted to the drive assembly for picking a selected cartridge from one of the cells and for inserting the selected cartridge into a cartridge slot in the drive. The drive assembly is stationary but the cartridge loader is pivotal about the drive assembly, and particularly about a pivot axis which is parallel to a center line of the data cartridge when the data cartridge is inserted into the drive assembly. The drive assembly includes a toothed transport track engageable by the cartridge transport assembly for incremental pivotal motion of the cartridge transport assembly about the pivot axis. The library also has a wall connected to the library frame, the wall having a series of windows formed in predetermined relationship with the cells of the magazine. The windows are used to detect a status (e.g., presence, absence, misinsertion) of the data cartridge in the magazine. In addition, the series of windows are employed for detecting a position of the cartridge transport assembly about the pivot axis. The cartridge transport assembly comprises a carriage first section and a carriage second section which is translatable relative to the carriage first section. A pair of cartridge engagement arms are mounted to the carriage second section for selectively partially inserting the data cartridge into the drive assembly. The cartridge transport assembly further includes a secondary cartridge contact member (forming part of a "flipper assembly") which operates in response to movement of the engagement arm to moves the selected cartridge from partial insertion to full insertion into the drive. Also, the secondary cartridge contact member serves as a stop surface when the cartridge is ejected from the drive.

4 Claims, 48 Drawing Sheets

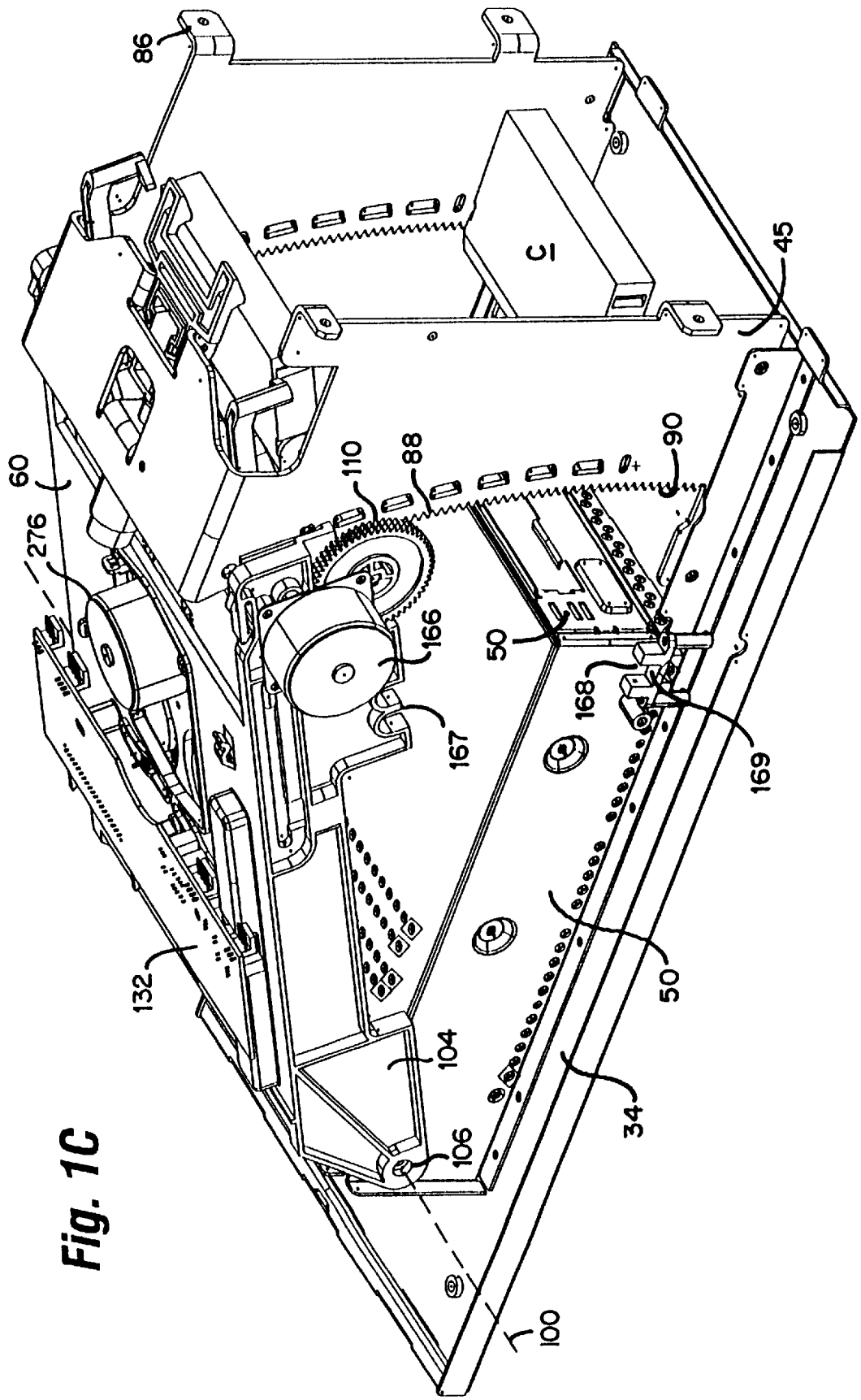

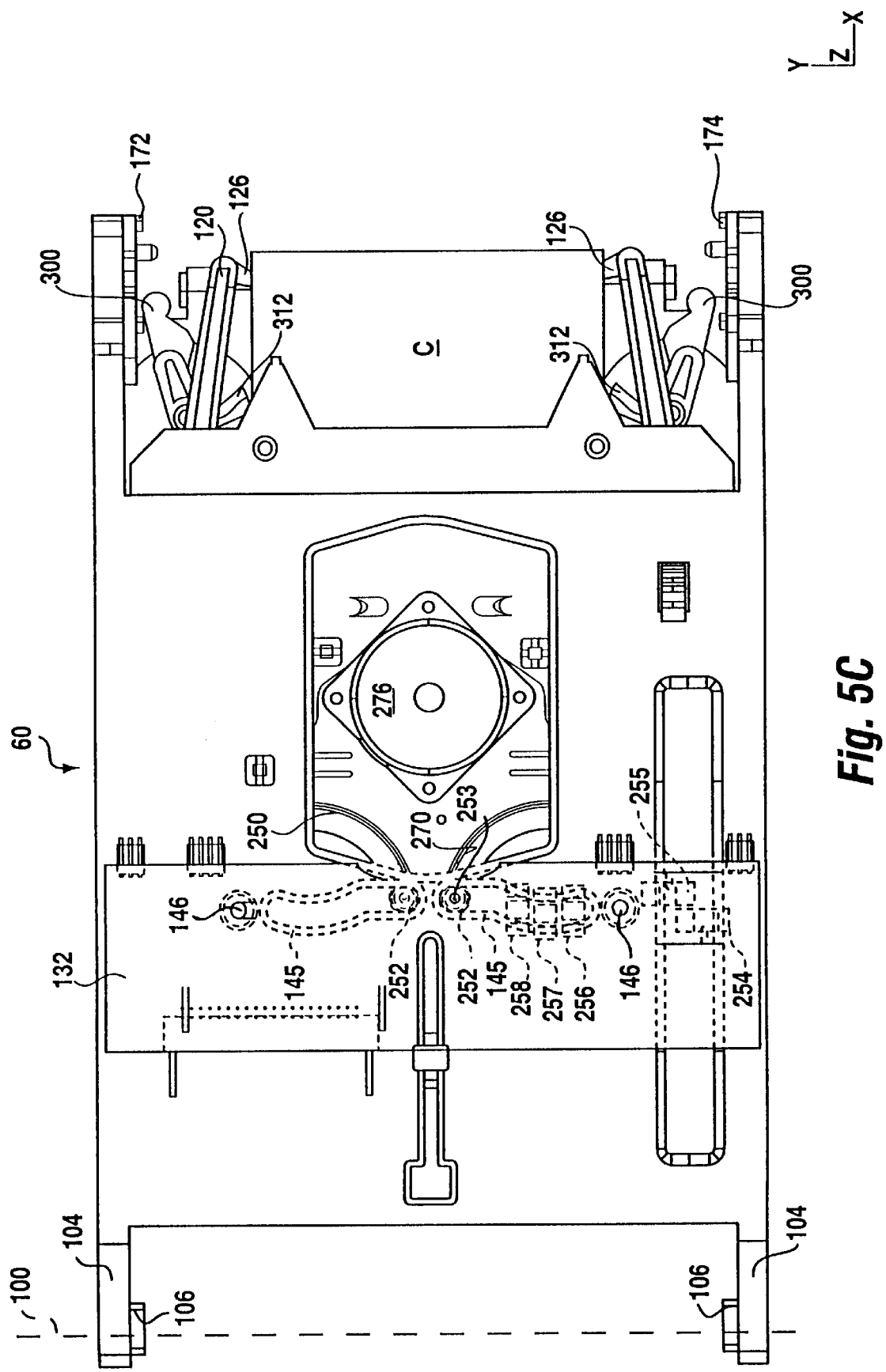

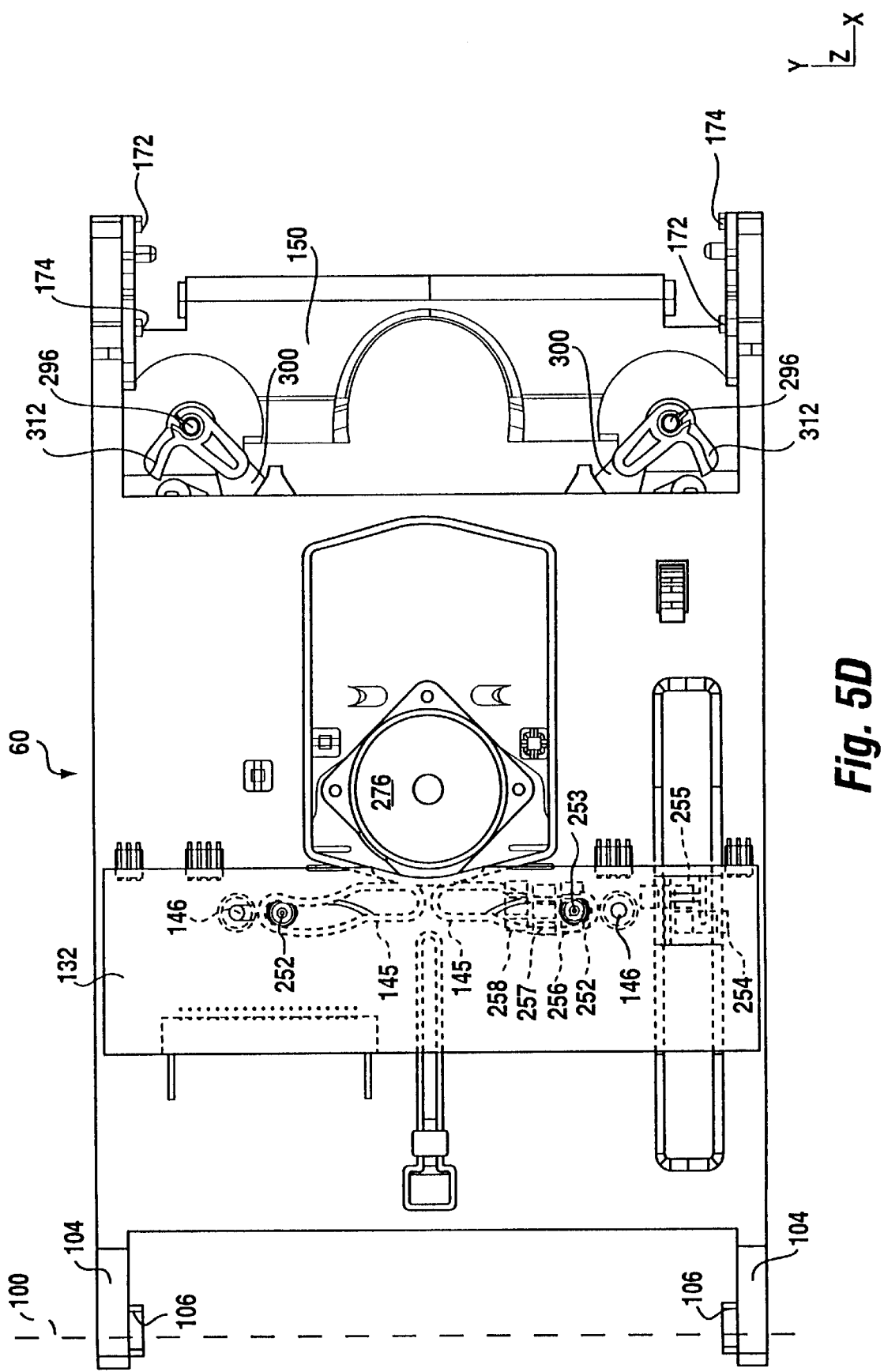

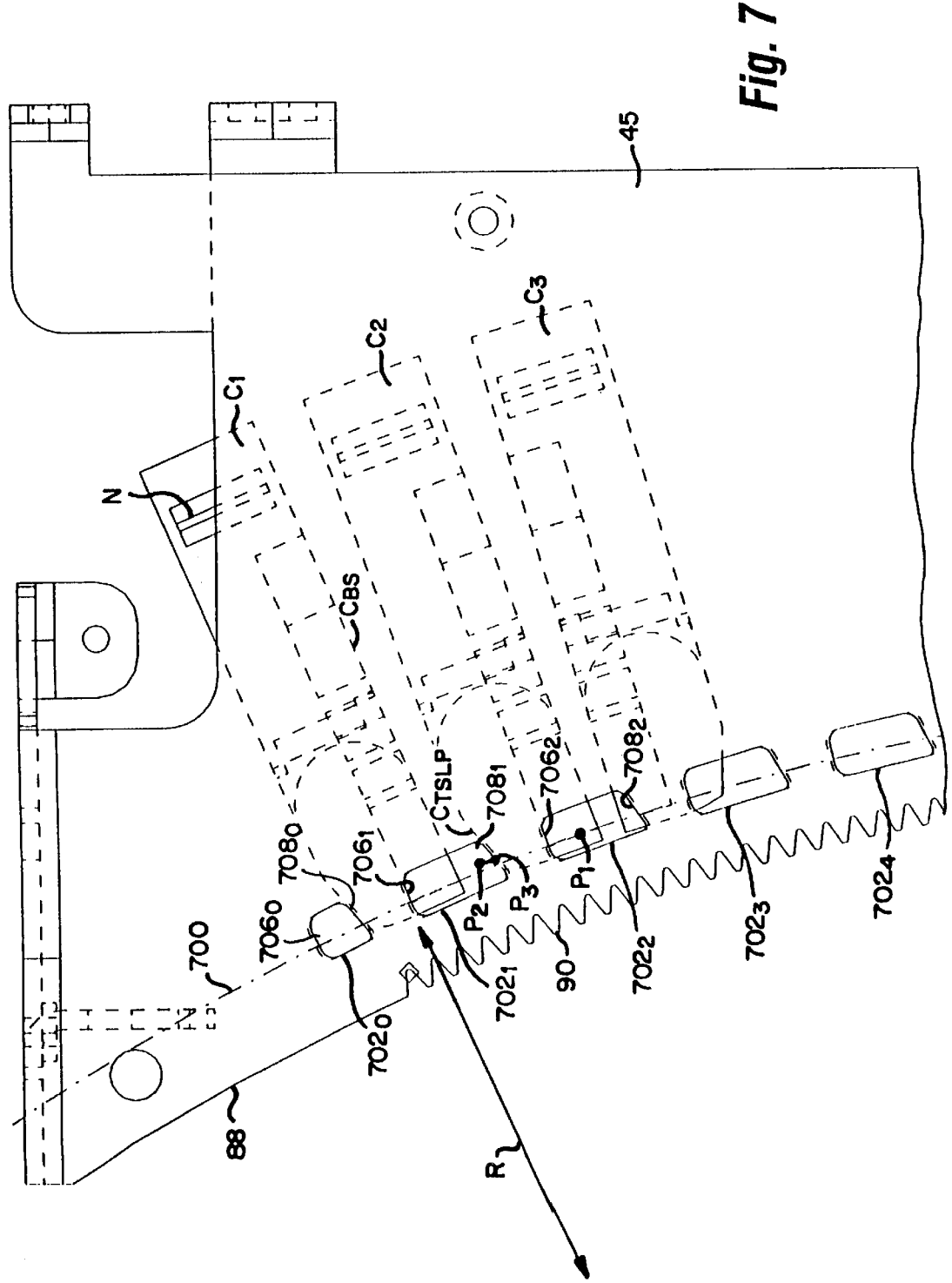

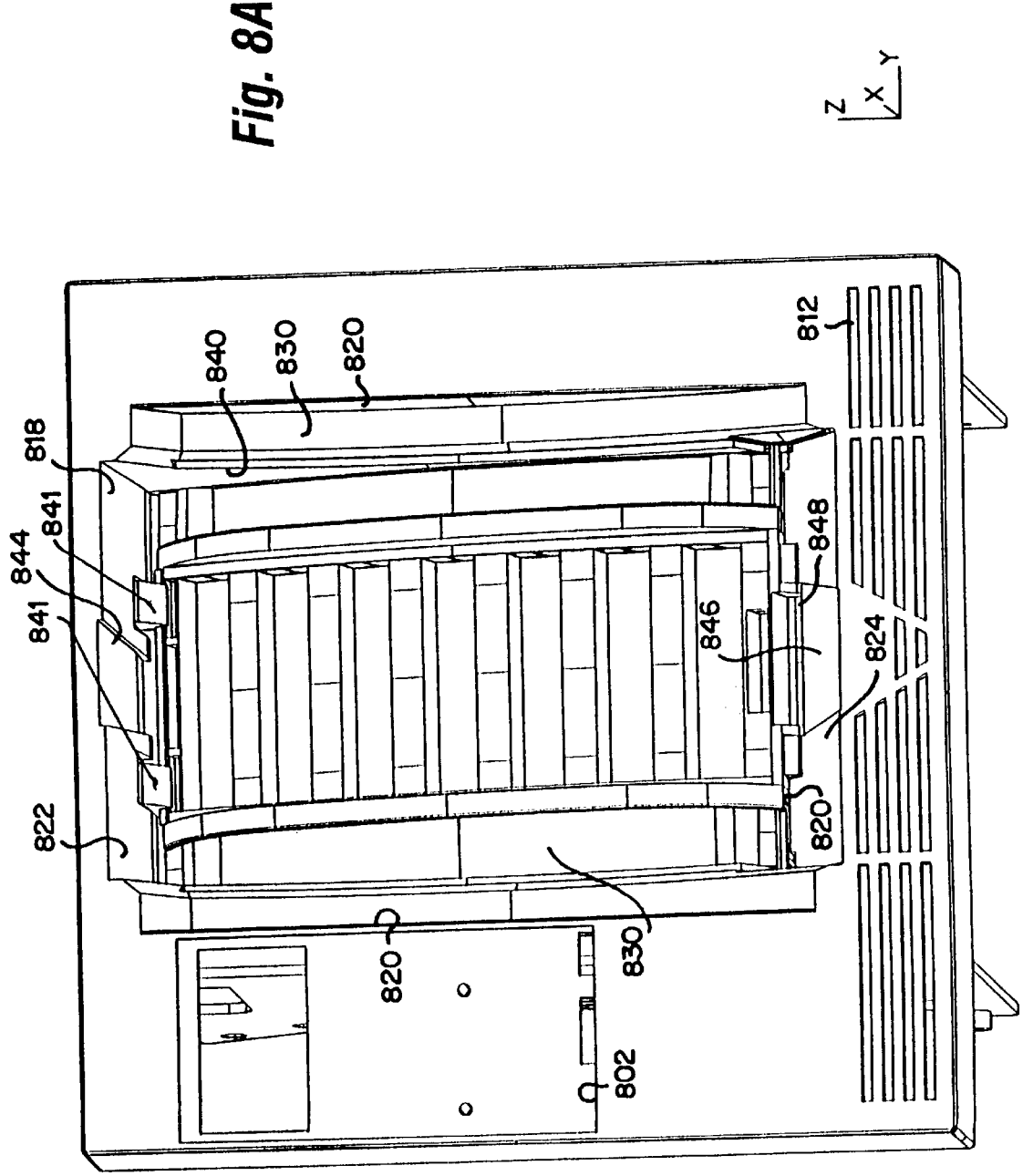

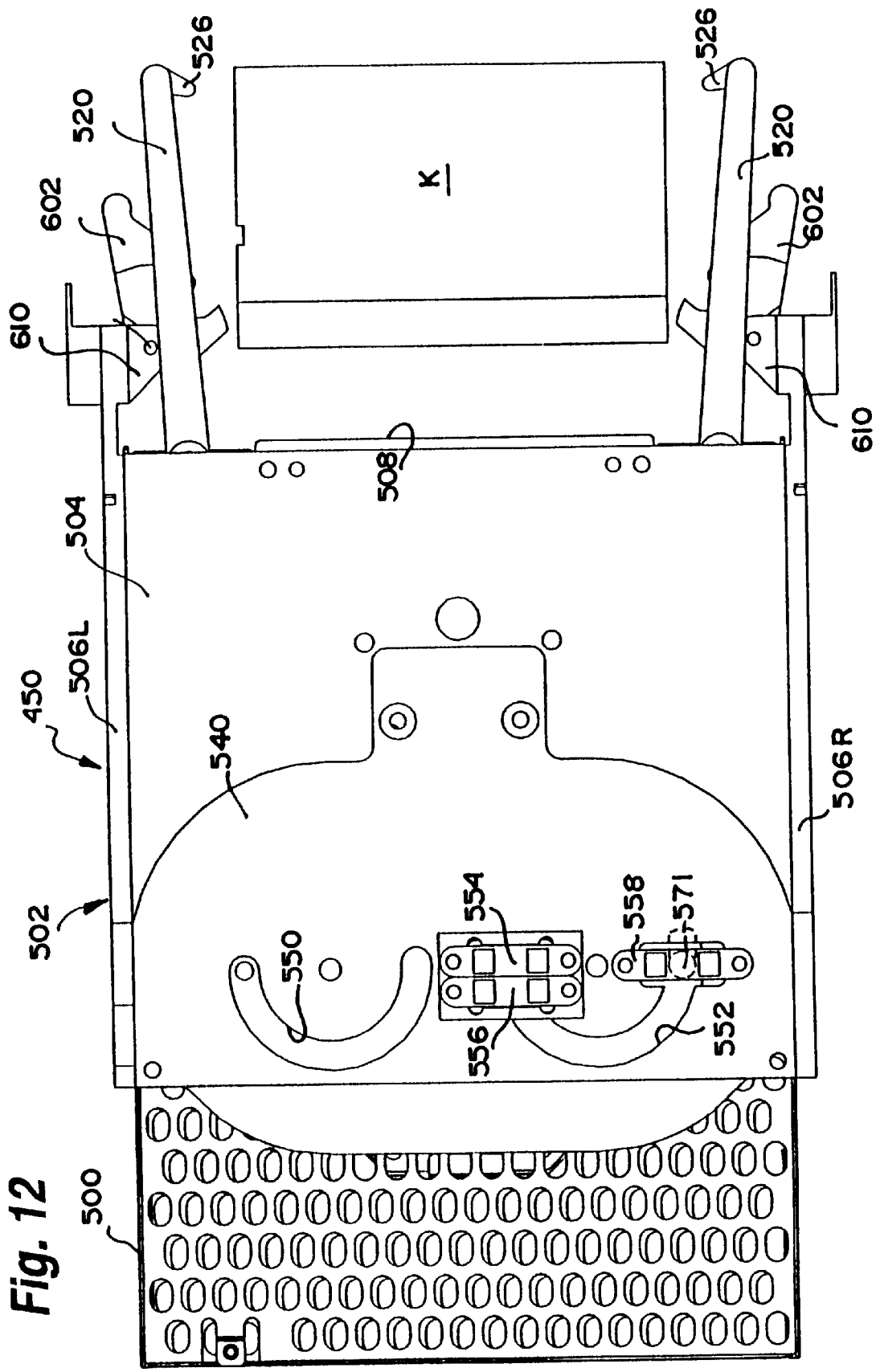

DATA CARTRIDGE LIBRARY HAVING A PIVOTING CARTRIDGE TRANSPORT

This is a divisional of application Ser. No. 09/121,541, filed Jul. 24, 1998, which is a Continuation-in-Part of application Ser. No. 08/970,205, filed Nov. 14, 1997, the entire content of which is hereby incorporated by reference in this application.

BACKGROUND

This application is and is related to simultaneously-filed U.S. patent application Ser. No. 09/121,966 entitled CARTRIDGE MAGAZINE AND LIBRARY EMPLOYING SAME, incorporated herein by reference.

1. Field of the Invention

The present invention pertains to the storage of information, and particularly to automated cartridge handling systems such as cartridge libraries which store cartridges or cassettes of magnetic tape.

2. Related Art and Other Considerations

The economic and compact storage of information is increasingly important in the computer industry, particularly so as the computer unleashes new potentials in numerous fields such as audio visual and/or multimedia.

In the early days of computers, information requiring storage could be transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g.. music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble juke boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

The following United States patents, all commonly assigned herewith and incorporated herein by reference, disclose various configurations of automated cartridge libraries, as well as subcomponents thereof (including cartridge engagement/transport mechanisms and storage racks for housing cartridges):

U.S. Pat. No. 4,984,106 to Herger et al., entitled "CARTRIDGE LIBRARY SYSTEM AND METHOD OF OPERATION THEREOF".

U.S. Pat. No. 4,972,277 to Sills et al., entitled "CARTRIDGE TRANSPORT ASSEMBLY AND METHOD OF OPERATION THEREOF".

U.S. Pat. No. 5,059,772 to Younglove, entitled "READING METHOD AND APPARATUS FOR CARTRIDGE LIBRARY".

U.S. Pat. No. 5,103,986 to Marlowe, entitled "CARTRIDGE RACK".

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled "PICKER MECHANISM FOR DATA CARTRIDGES".

U.S. Pat. No. 5,718,339 to Woodruff et al., entitled "CARTRIDGE RACK AND LIBRARY FOR ENGAGING SAIME".

Important to the automation of cartridge libraries as previously known has been the provision of the cartridge changer or cartridge engagement/transport mechanism for picking or gripping a cartridge and moving the cartridge between a storage position and the tape drive. Such rotobic mechanisms, often called a cartridge "picker" or "gripper", is typically mounted in a library frame in order to introduce and remove cartridges relative to one or more stationary drives. The stationary drive and the picker are mounted to the same basic frame structure of the library, but otherwise are structurally independent.

A cartridge library with a movable drive has been proposed in U.S. Pat. No. 5,739,978, entitled CARTRIDGE HANDLING SYSTEM WITH MOVING I/O DRIVE, which is incorporated herein by reference. In such arrangement, a tape drive moves (e.g., pivots) into alignment and then linearly moves into operative relation to receive the cartridge. This arrangement essentially obviates use of a cartridge "gripper" or "changer", since the drive itself performs that function.

In some drives it is necessary that a "soft" load be performed. That is, a cartridge must first be inserted partially into the drive slot, and thereafter an additional force provided in order to insert fully the cartridge into the drive. Traditionally, the additional force has been accomplished by backing the gripper away from the drive after the cartridge has been partially inserted into the slot, and then having the gripper return in a second motion to push the cartridge entirely into the drive.

What is need therefore, and an object of the present invention, is method and apparatus for effectively handling cartridges in a cartridge library.

BRIEF SUMMARY OF THE INVENTION

A cartridge library comprises plural cells for accommodating therein a cartridge of information storage media and a tape drive which transduces information relative when a cartridge is loaded into the drive. A cartridge loader (also known as the cartridge transport assembly) is mounted to the drive assembly for picking a selected cartridge from one of the cells and for inserting the selected cartridge into a cartridge slot in the drive. In one embodiment, the drive assembly is pivotal with the cartridge loader pivoting in unison therewith. In another embodiment, the drive assembly is stationary but the cartridge loader is pivotal about the drive assembly, and particularly about a pivot axis which is parallel to a center line of the data cartridge when the data cartridge is inserted into the drive assembly. In this embodiment, the data cartridge lies between a magazine and the pivot axis in a direction of insertion of the data cartridge into the drive assembly when the data cartridge is inserted into the drive assembly.

The drive assembly includes a toothed transport track engageable by the cartridge transport assembly for incremental pivotal motion of the cartridge transport assembly about the pivot axis. The transport track has an arcuate shape. The cartridge transport assembly comprises a gear which engages the toothed transport track.

The library also has a wall connected to the library frame, the wall having a series of windows formed in predetermined relationship with the cells of the magazine. The windows are used to detect a status (e.g., presence, absence, misinsertion) of the data cartridge in the magazine. In addition, the series of windows are employed for detecting a position of the cartridge transport assembly about the pivot axis. The cartridge transport assembly carries a sensor which detects the status of the data cartridge in the magazine and the position of the cartridge transport assembly about the pivot axis. The wall which has the window formed therein also has the transport track formed thereon.

The cartridge transport assembly comprises a carriage first section and a carriage second section which is translatable relative to the carriage first section. A pair of cartridge engagement arms are mounted to the carriage second section for selectively engaging and releasing the data cartridge. A motor mounted to the carriage first section serves both to actuate the pair of cartridge engagement arms and translation of the carriage second section in a direction toward and away from the magazine. The cartridge transport assembly further comprises a cam follower pin mounted on the engagement arms for mating with a caming groove formed on the carriage second section. Rototatable members driven by the motor are mounted to the carriage second section and have the pair of engagement arms respectively connected thereto. A guide member is mounted on each rotatable member, the guide member being situated for cooperating simultaneously with a guide surface formed in the carriage first section for facilitating translation of the carriage second section. Rotation of the rotatable members influences an extent of separation of the pair of data cartridge engagement arms.

The engagement arms of the cartridge transport assembly insert partially a selected cartridge into the drive. The cartridge transport assembly further includes a secondary cartridge contact member (forming part of a "flipper assembly") which operates in response to movement of the engagement arm to moves the selected cartridge from partial insertion to full insertion into the drive. Also, the secondary cartridge contact member serves as a stop surface when the cartridge is ejected from the drive.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1C is a side isometric view of portions of an interior of the cartridge library of FIG. 1 with housing and other elements removed.

FIG. 5A, FIG. 5B, FIG. 5C, FIG. 5D, and FIG. 5E are top views showing a sequence of operations performed by a cartridge transport system of the cartridge library of FIG. 1.

FIG. 7 is a side view of portions of a magazine mounting assembly of the cartridge library of FIG. 1.

FIG. 8A and FIG. 8B are respective front and rear views of a front wall and magazine mounting assembly of the cartridge library of FIG. 1 with a magazine inserted therein.

FIG. 12 is a side view of the drive assembly of FIG. 11.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances detailed descriptions of well known devices circuits, and methods are omitted so as not to obscure the description of the present invention with unnecessary detail.

Figure 1:
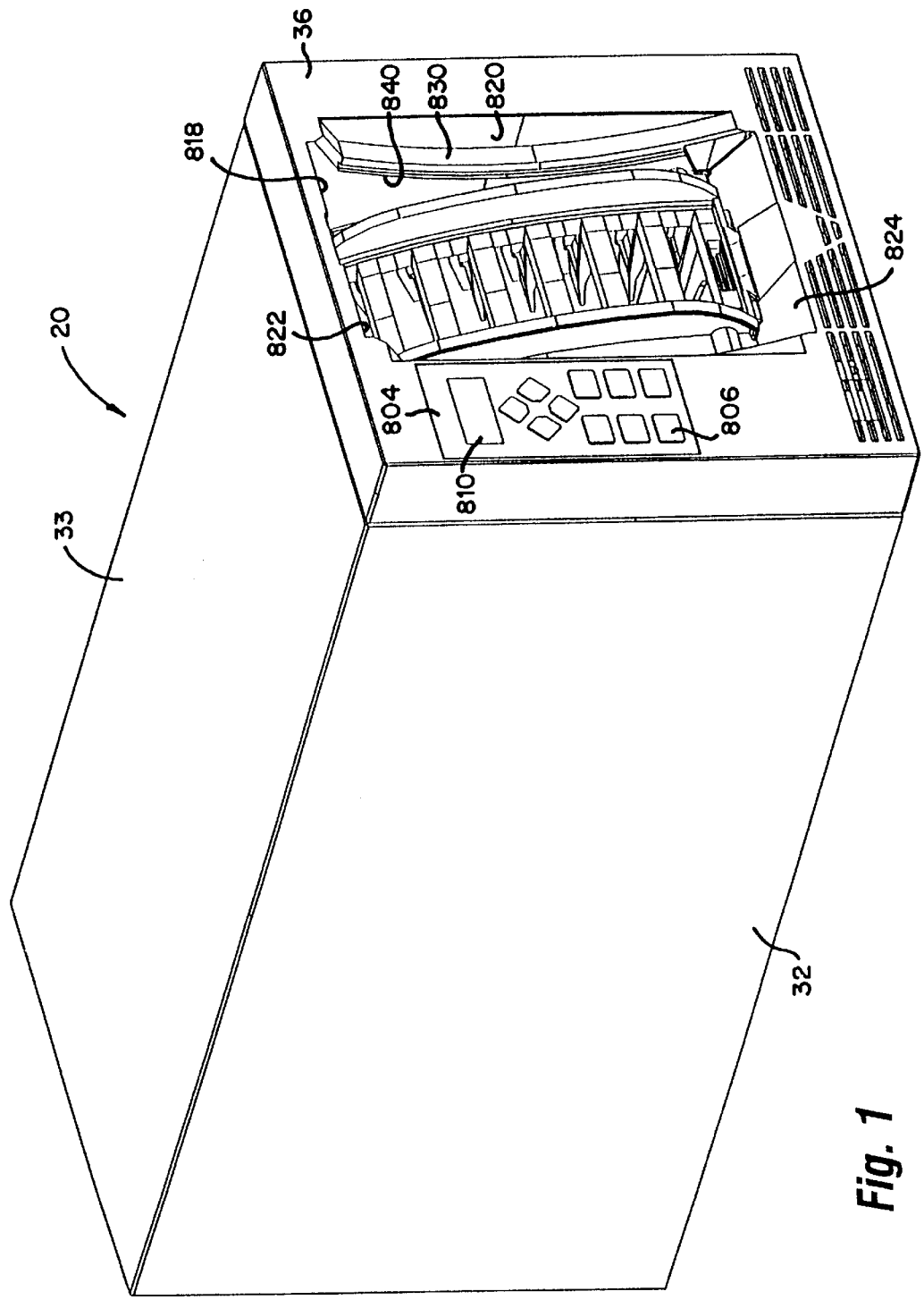
FIG. 1 is a side isometric view of an exterior of a cartridge library according to an embodiment of the invention.

FIG. 1 shows the exterior of a cartridge library 20 according to a first embodiment of the invention. As seen in other figures as hereinafter described, cartridge library 20 accommodates a magazine in which cartridges $C_1$, $C_2$, ... $C_7$ are stored. In the illustrated embodiment cartridges $C_1$, $C_2$, ... $C_7$ are eight millimeter tape cartridges, such as ANSI Standard eight millimeter tape cartridges, for example. Hereinafter, in connection with cartridge library 20, when reference is made to a cartridge generally rather than to any particular cartridge, such representative cartridge is denominated simply with reference letter "C. It should be understood that cartridge library 20 is not limited to the particularly illustrated type of data cartridges, but that other cartridges can instead be utilized.

Figure 1A:
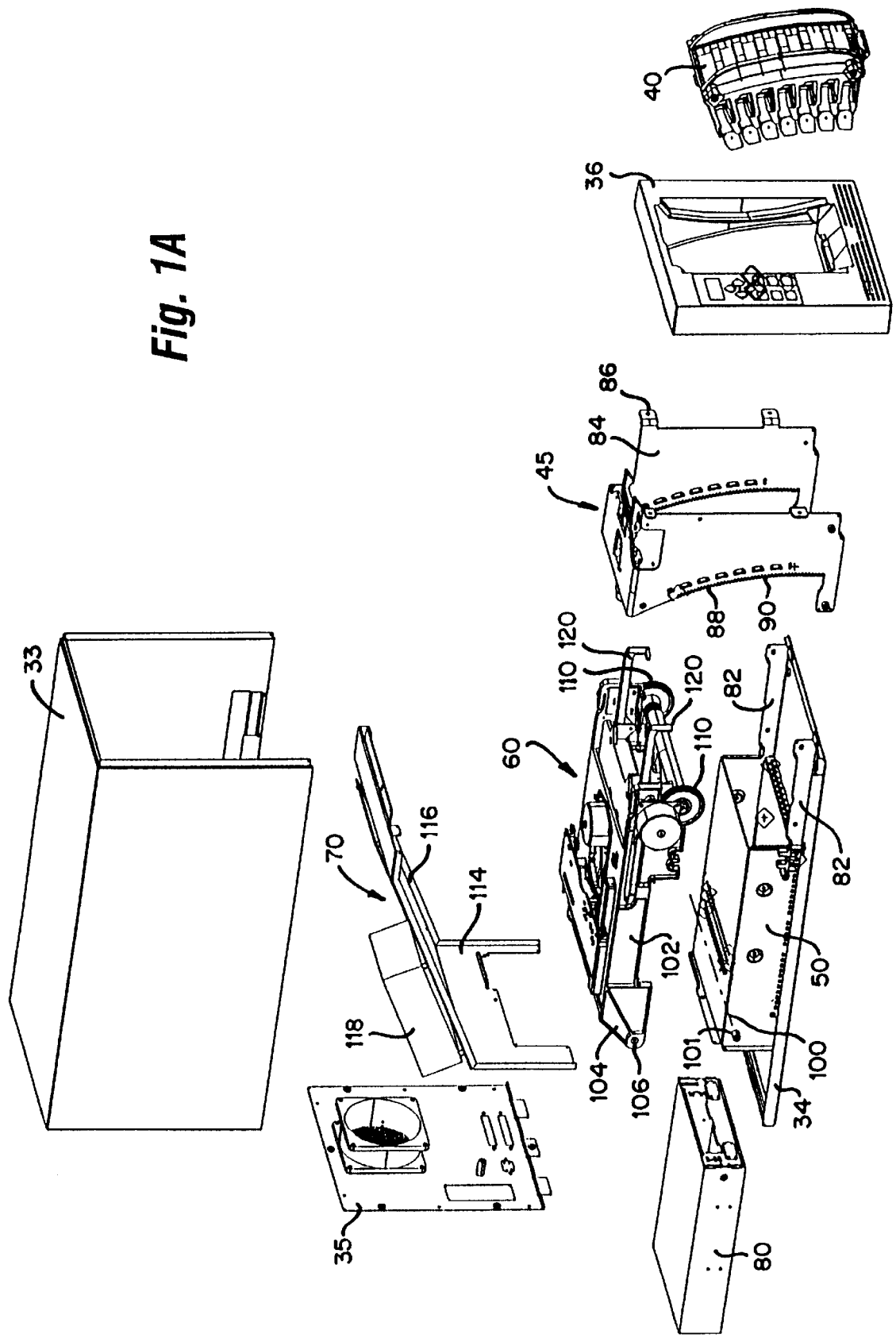
FIG. 1A is an exploded view of a housing and basic components of the cartridge library of FIG. 1.

Cartridge library 20 has a housing 32 which is comprised of a three paneled cover 33; a bottom or base plate 34; a rear wall 35; and a front wall or bezel 36 (see FIG. 1A). As explained hereinafter, a magazine 40 of cartridges are inserted through front wall 36 of cartridge library 20. Mounted within frame 32 are magazine mounting assembly 45; drive mounting assembly 50; cartridge transport system 60, and a controller 65. The controller circuit is oriented on edge and is mounted through a SCSI connector to rear wall 35 of library housing 32. In addition, a partition 70 is provided within housing 32 as hereinafter described.

Figure 1B:
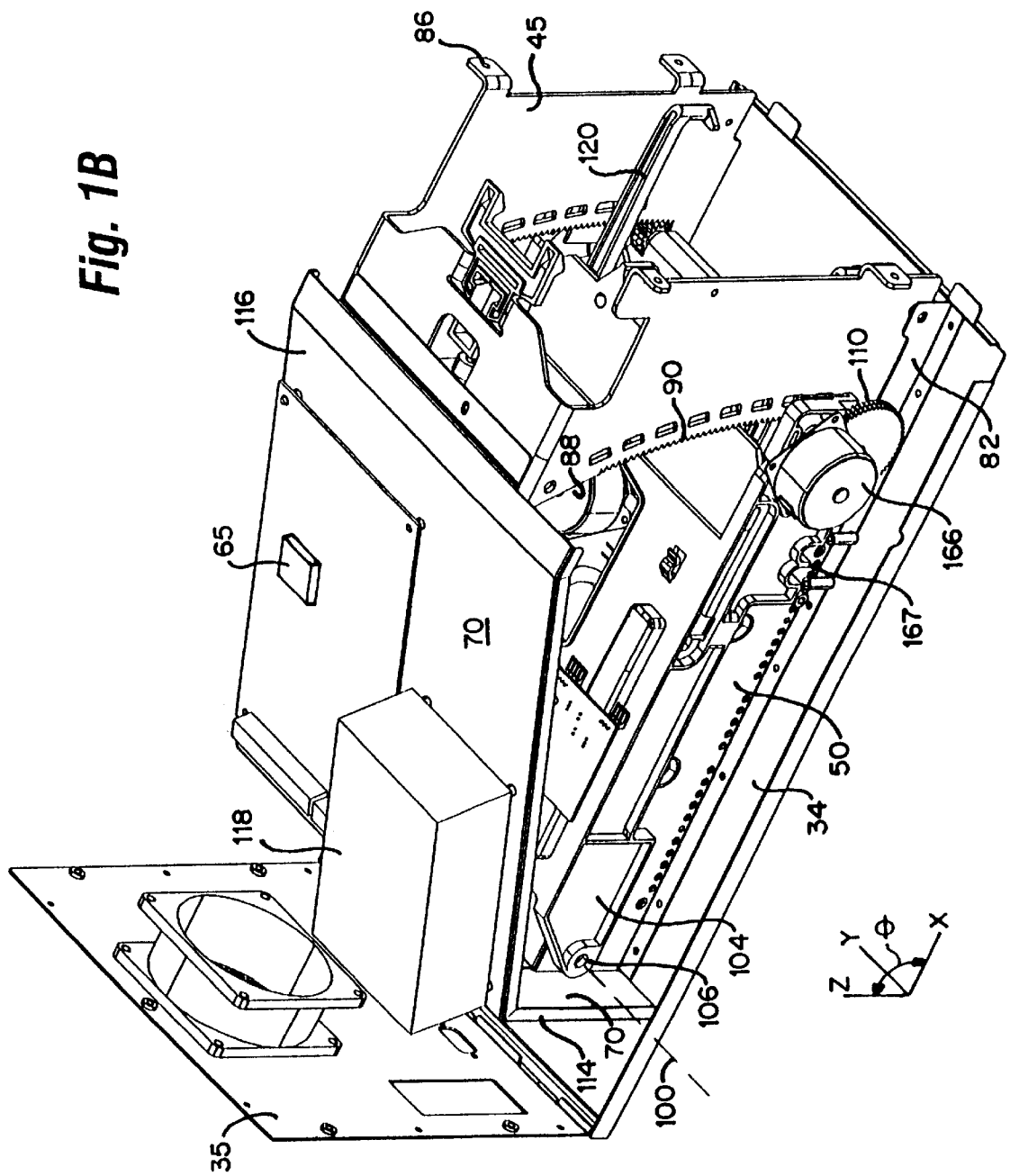
FIG. 1B is a side isometric view of an interior of the cartridge library of FIG. 1 with housing removed.

FIG. 1B shows placement of the various assemblies, systems, and partition 70 within housing 32. As understood from both FIG. 1A and FIG. 1B, drive mounting assembly 50 lies on base plate 34. The drive mounting assembly 50 internally receives a tape drive 80. On opposite sides of drive mounting assembly 50 are a pair of spaced apart, forwardly extending arms 82 which reach to a front edge of base plate 34. Enclosure of tape drive 80 in drive mounting assembly 50, particularly when assembly 50 is formed from sheet metal or the like, provides enhanced EMI (electromagnetic interference) insulation for tape drive 80.

The magazine mounting assembly 45 stands upright on base plate 34 at the front of cartridge library 20 (see FIG. 1A and FIG. 1B). The magazine mounting assembly 45 is an arch-like structure, with opposing magazine mounting assembly walls 84. At their bases, magazine mounting assembly walls 84 are secured by fasteners to distal ends of arms 82. Front edges of the magazine mounting assembly walls 84 have tabs 86 perpendicularly inclined thereto. The front wall 36 is mounted by fasteners to tabs 86. Rear edges 88 of magazine mounting assembly 45 are fabricated along a portion of their arcuate length to form a toothed rack 90.

A pivot axis 100 is formed at the rear of drive mounting assembly 50. In particular, on opposite lateral sides thereof, the housing of drive mounting assembly 50 has two pivot pins 101 extending therefrom. The cartridge transport system 60 has a carriage 102 which rotates about axis 100. At its rear carriage 102 has two opposed lateral flanges 104. The carriage flanges 104 each have an aperture 106 formed therein. The apertures 106 receive corresponding ones of the pivot pins 101 so that cartridge transport system 60 can pivot about pivot axis 100. The rotation of carriage 102 occurs as motor-driven gear assemblies 110 engage toothed rack 90 of magazine mounting assembly 45. That is, carriage 102 rotates about pivot axis 100 as the carriage gear assemblies 110 climb and descend toothed rack 90.

When a cartridge c is loaded into tape drive 80, the pivot axis 100 is parallel, and more particularly in a same plane with, a center line of cartridge C. Moreover, pivot axis 100 is located to the rear of cartridge C, so that cartridge C lies between axis 100 (in the sense of the X axis [see FIG. 1B]) and magazine 40 when cartridge C is inserted into tape drive 80.

The rotation of carriage 102 about pivot axis 100 occurs in an internal front region of housing 32 which is defined by partition 70. The partition 70 is anchored to bottom or base plate 34 over the rear of drive mounting, assembly 50, and has a first segment 114 which extends vertically perpendicularly from bottom or base plate 34. A second segment 116 is inclined at an angle to partition first segment 120 in a forward and upward direction as shown in FIG. 1A. On its upperside, the partition second segment 116 has a power supply 118 mounted thereon, as well as the circuit board upon which controller 65 is mounted (see FIG. 1B).

FIG. 1C shows the structure of FIG. 1B, but with rear wall 35 and partition 70 removed for illustrating how carriage 102 pivots about pivot axis 100. In particular, FIG. 1C shows how carriage gear assemblies 110 engage toothed rack 90. As explained hereinafter, carriage gear assemblies 110 are driven so that carriage 102 pivots whereby cartridge engagement arms 120 thereof are selectively aligned with one of plural cartridge positions in magazine 40 (as magazine 40 is mounted in magazine mounting assembly 45).

Figure 2:
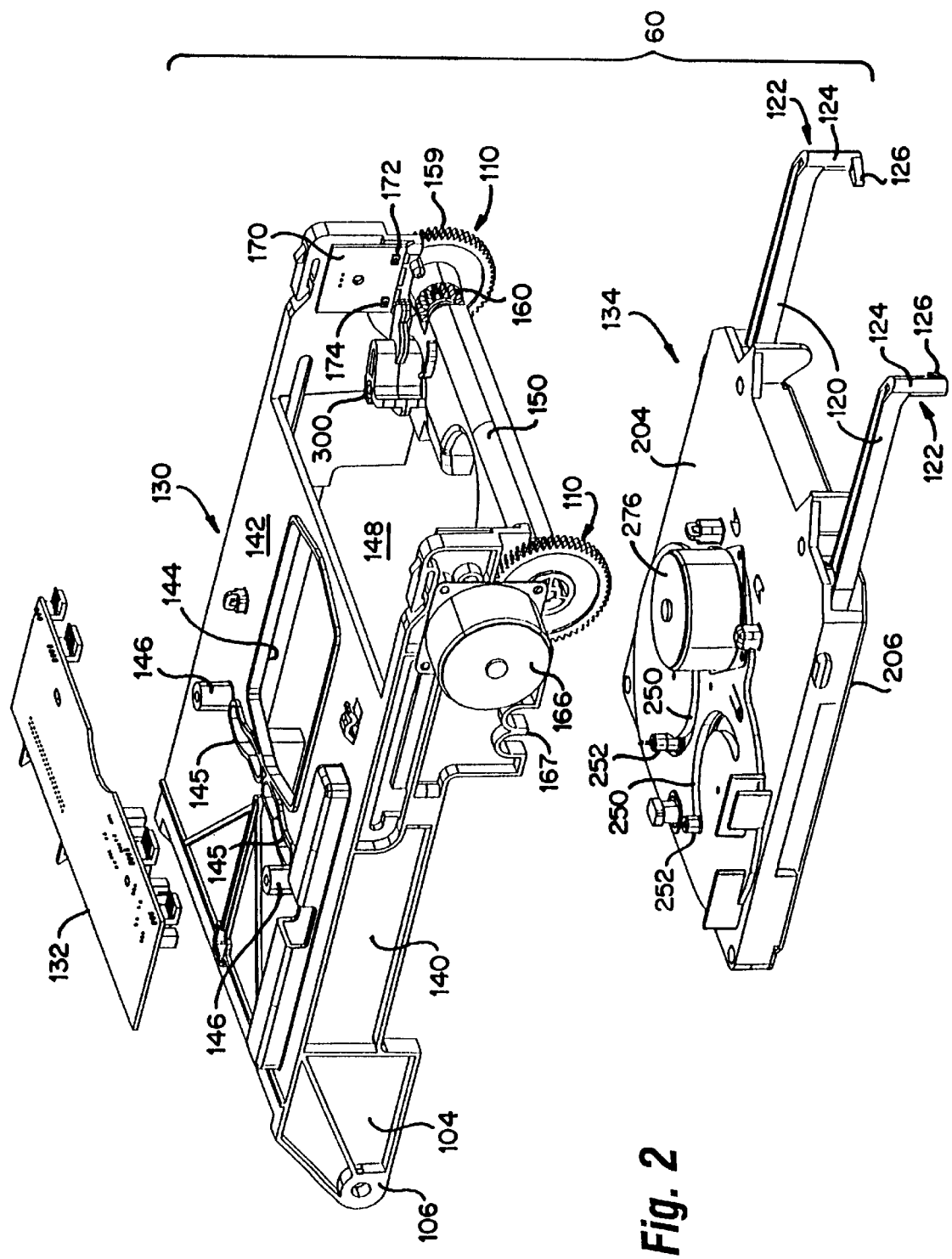
FIG. 2 is a partially exploded side view of a cartridge transport system of the cartridge library of FIG. 1.

As shown in FIG. 2, at their distal ends the cartridge engagement arms 120 have an "L" shaped actuator finger 122 perpendicularly projecting therefrom. Finger 122 has a cylindrical extension 124 and a generally triangularly shaped finger tip 126. Finger tip 126 is configured to engage a cartridge changer notch N provided in cartridge C.

Figure 2A:
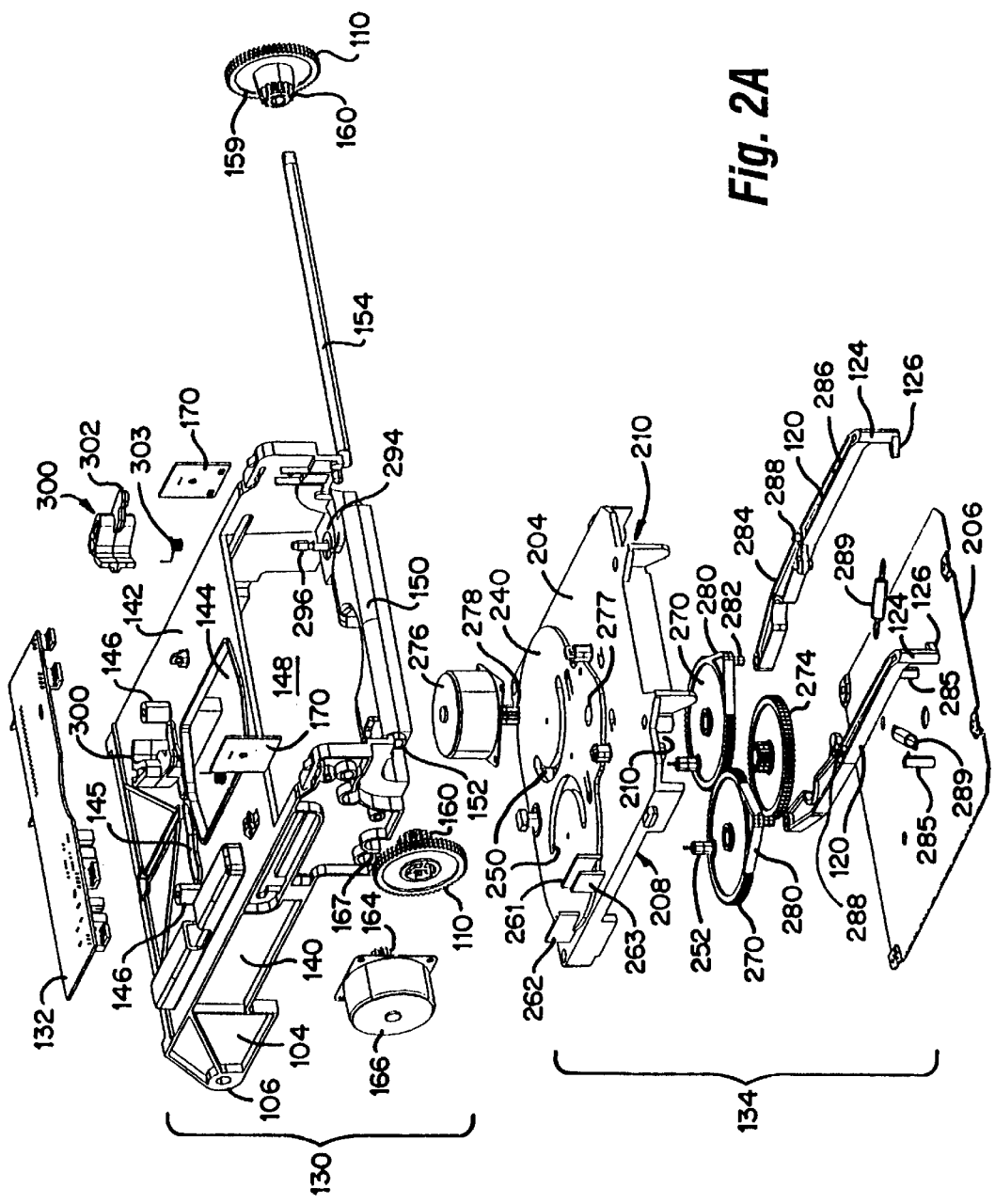
FIG. 2A is a further exploded side view of the cartridge transport system of FIG. 2.
Figure 2B:
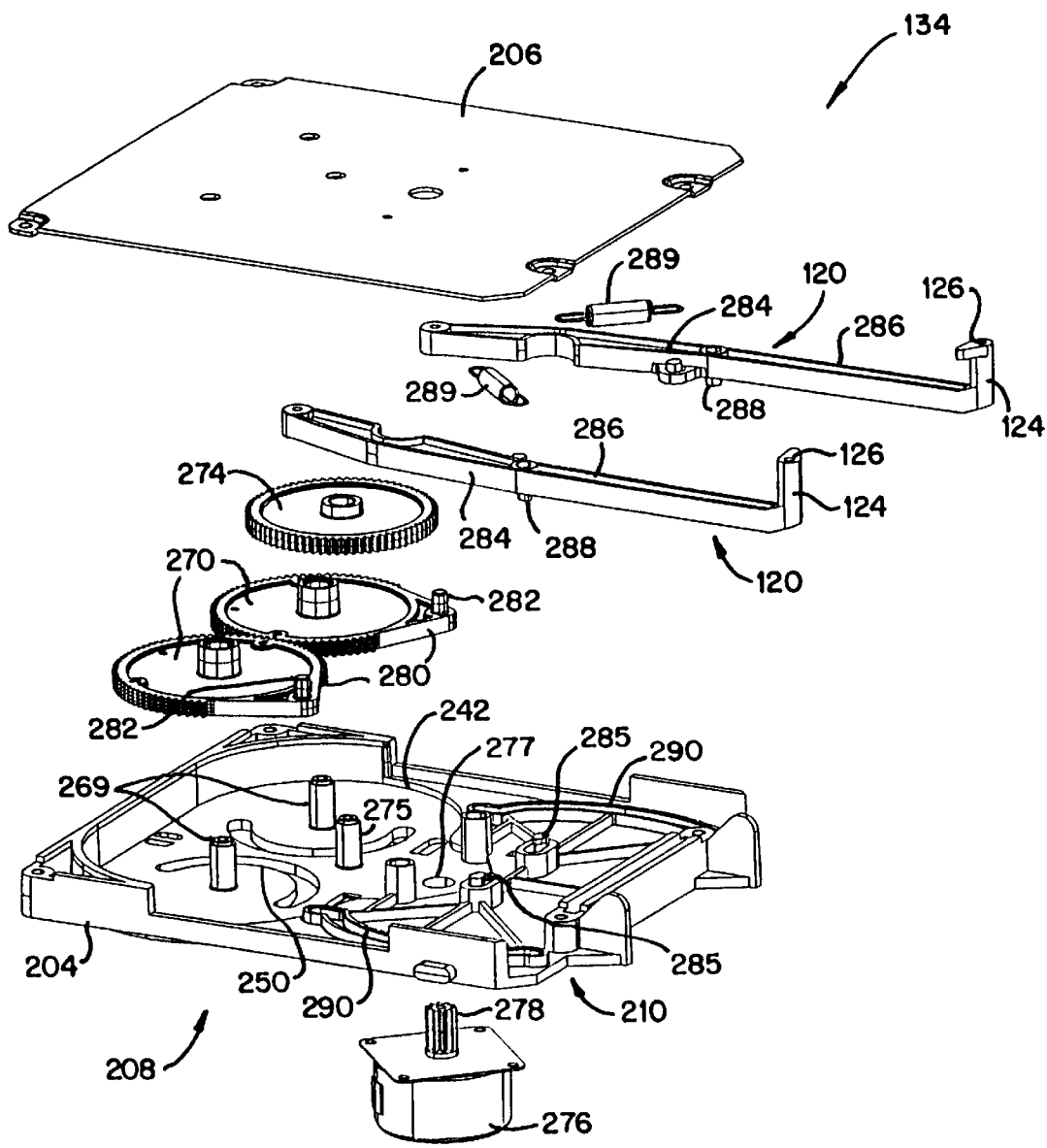
FIG. 2B is a further inverted and exploded side view of an engagement arm actuation unit of Fig. 2.

In addition to showing the structure of cartridge encasement arms 120. FIG. 2 also shows the structure of cartridge transport system 60 generally and carriage 102 particularly. In FIG. 2, cartridge transport system 60 is shown exploded into three of its components, particularly carriage frame 130; circuit board 132: and engagement arm actuation unit 134. FIG. 2A shows even further explosion of carriage frame 130 and engagement arm actuation unit 134. FIG. 2B shows an inverted explosion engagement arm actuation unit 134.

As shown in FIG. 2 and FIG. 2A, carriage frame 130 has two opposing side walls 140 and a top plate 142. The carriage frame top plate 142 has a large central aperture 144 formed therein, as well as two guide slots or apertures 145. Mounted on a topside of carriage frame top plate 142 are two upstanding posts 146 to which and underside of circuit board 132 is mounted. Beneath carriage frame top plate 142 and between carriage frame side walls 140 is a cavity 148 which receives engagement arm actuation unit 134. Carriage frame 130 is also referred to as the carriage first section, while engagement arm actuation unit 134 is also referred to as the carriage second section. As described hereinbelow, the carriage second section 134 is translatable (toward and away from magazine 40) with respect to the carriage first section.

Forwarded edges of carriage frame side walls 140 extend beyond carriage frame top plate 142. Bridging the forwarded edges of carriage frame side walls 140 proximate the bottom of carriage frame 130 is cartridge shelf 150. Cartridge shelf 150 has an internal bore 152 through which an axle 154 rotatably extends. The carriage gear assemblies 110 are secured to opposite ends of axle 154. As perhaps best shown in FIG. 2A, the carriage gear assemblies 110 have both a larger outer gear 159 and a smaller inner gear 160. The larger outer gear 159 meshes with pinion 164 of carriage rotation motor 166. The carriage rotation motor 166 attaches to an outer surface of one of the carriage frame side walls 140. The geared inner collar 160 meshes with toothed rack 90 on magazine mounting assembly 45 as hereinafter described.

The pivoting or rotating of cartridge transport system 60 about pivot axis 100 occurs with reference to a home position. In its home position, cartridge transport system 60 and carriage frame 130 thereof lies in a horizontal plane so that cartridge shelf 150 thereof is aligned to insert into or receive a cartridge from a mouth of tape drive 80. In order to ascertain when cartridge transport system 60 is in its home position, carriage frame 130 has a home position sensed member 167 formed thereon (see FIG. 2). The home position sensed member 167 is formed is formed on an outer surface of a sidewall of carriage frame 130 back of carriage rotation motor 166. Home position sensed member 167 is situated and configured to interrupt a home sensor beam 168 of carriage home sensor 169. Carriage home sensor 169 is mounted to posts rising from base plate 34 as shown in FIG. 1C, for example.

Thus, when the cartridge transport system 60 is rotated to its home or bottom most position, carriage 102 is situated directly above drive mounting assembly 50 so that entrance to tape drive 80 can be gained through the front of carriage frame 130. The home sensor 169 also serves to detect positioning of a cartridge C relative to the tape drive 80, e.g., when cartridge transport system 60 is in its home position.

Interiorily mounted on the forward edges of carriage frame side walls 140 above cartridge shelf 150 are two sensor circuit boards 170. Both sensor boards 170 have a photo emitter 172 and a photodetector 174 (see FIG. 2). The photo emitter 172 on one of the sensor circuit boards 170 is aligned with the photodetector 174 on the other of the sensor circuit boards 170, and vise versa. A photo beam is thus directed between each pair of photo emitter 172 and photodetector 174. As described hereinafter, the front most pair of photo emitter 172 and photodetector 174 are employed to detect whether cartridges are inserted or misinserted with respect to cells of magazine 40. The rearmost pair of photo emitter 172 and photodetector 174 sense the presence of a cartridge on cartridge shelf 150.

The engagement arm actuation unit 134 has a top plate 204 and a bottom plate 206. The bottom of top plate 204 has vertical skirts extending at various lengths therearound, so that an actuation cavity 208 is formed between top plate 204 and bottom plate 206. Two apertures 210 are formed at the forward two corners in the skirt of top plate 204. Distal or forward ends of cartridge engagement arms 120 extend through the respective apertures 210 of top plate 204.

The top plate 204 of engagement arm actuation unit 134 has both a sensing side (shown in FIG. 2A) and a caming side (shown in FIG. 2B). While top plate 204 is generally planar, at its rear the top plate 204 has an offset portion which appears as plateau 240 on the sensing side and as a recess 242 on its caming side.

At its rear, top plate 204 has two semi-circular slots 250 extending therethrough. As described further herein, a guide pin 252 surmounted by a photointerrupter 253 protrudes through each of slots 250 and travels along an arcuate path. In the course of its travel, one these photointerrupters 253 interrupts an optical beam for various sensor assemblies which are mounted on the underside of printed circuit board 132. The sensor assemblies mounted on the underside of printed circuit board 132 are best shown in FIG. 5A and FIGS. 5C–5E. These sensor assemblies includes a first sensor assembly 254; a second sensor assembly 255; a third sensor assembly 256; a fourth sensor assembly 257; and a fifth sensor assembly 258.

The sensing side of engagement arm actuation unit 134 also has three photointerrupters 261, 262, and 263 extending orthogonally therefrom.

Caming side of top plate 204 is shown in FIG. 2B. As mentioned above, recess 242 is formed in caming side of top plate 204. Recess 242 has two eccentrics 270 rotatably mounted thereon over posts 269. Each eccentric 270 has a toothed or geared periphery. As understood from FIG. 2A, each of eccentrics 270 has guide pin 252 positioned near a periphery of the eccentric, with the guide pin 252 extending orthogonally from the plane of the eccentric 270 and upwardly through a corresponding one of the semi-circular slots 250 of top plate 204 and the slots 145 of carriage frame top plate 142. Meshing with each eccentric 270 is an intermediate gear 274. The intermediate gear 274 is rotatably mounted to post 275 (see FIG. 2B). An engagement arm drive motor 276 is mounted on a top side of top plate 204. The top plate 204 has an aperture 277 through a shaft of engagement arm drive motor 276 depends. On the bottom side of top plate 204, the shaft of engagement arm drive motor 276 has a motor pinion 278 mounted thereon. The motor pinion 278 engages the periphery of intermediate gear 274 on the underside of top plate 204, with intermediate gear 274 being in gearing relation with pinion 278 and eccentrics 270 (see FIG. 2B).

As understood from FIG. 2 and FIG. 2A, engagement arm drive motor 276 mounted on top plate 204 of engagement arm actuation unit 134 extends through central aperture 144 of carriage frame 130.

Each eccentric 270 is predominately circular, with an eccentric connector 280 provided at a chordal portion thereof. Eccentrics 270 can have their respective connectors 280 formed integrally therewith. Each eccentric connector 280 carries a pivot pin 282 to which a proximal end of engagement arm 120 is pivotally connected.

The cartridge transport system 60 includes both engagement arms 120 and flipper assemblies hereinafter described. Each engagement arm 120 is a rigid unitary piece comprising two segments, particularly segment 284 and forearm segment 286. Arm segments 284 are biased towards one another. In this respect, the bottom side of top plate 204 has two upstanding posts 285 to which the engagement arm segments 284 of the respective cartridge engagement arms 120 are connected by extension springs 289. At the intersection of segments 284, 286, each engagement arm 120 carries a cam follower pin 288.

As understood with reference to FIG. 2B and FIG. 6A–FIG. 6E subsequently described, cam follower pin 288 of each engagement arm 120 extends into a respective one of caming grooves 290. Caming grooves 290 serve to define a path of travel of engagement arm 120 as the cartridge transport system 60 moves through each of its critical positions as shown in each of FIG. 6A–FIG. 6E, for example.

Rearward of cartridge shelf 150, and extending interiorly from sidewalls of carriage frame 130, is a pair of opposing flipper mounting recesses 294. One of flipper mounting recesses 294 is visible in FIG. 2A; the position of the other of the flipper mounting recesses 294 is symmetrical on the other sidewall of carriage frame 130. Each of the flipper mounting recesses 294 has an post 296 extending upwardly therefrom.

Figure 3:
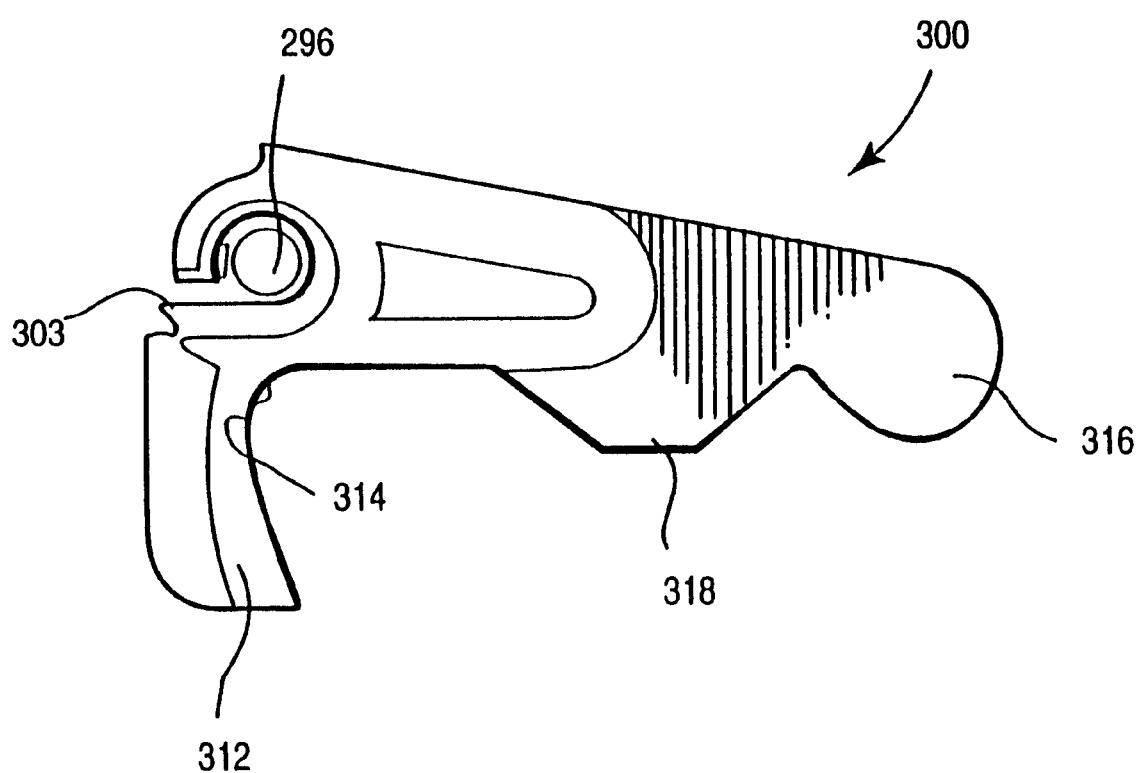
FIG. 3 is a to p view of a flipper assembly employed in the cartridge transport system of FIG. 2.

Rotatably mounted about each post 296 is a secondary cartridge contacting assembly, also known as flipper assembly 300 (see FIG. 2A). Flipper assembly 300 comprises a cartridge contact element 302 which serves to perform a "soft load" of a cartridge C which has already been partially inserted into drive 80. In addition, cartridge contact element 302 serves as a stop and registrar when cartridge C is being ejected or discharged from drive 80. Torsion springs 303 bias flipper assemblies 300 in an opened position i.e., away from a mouth of tape drive 80. As shown e.g., in FIG. 3, the flipper assemblies 300 have a spur 312 which contributes to form a curved arm follower notch 314. The cartridge contact element 302 has two cartridge cooperative surfaces 316, 318. Cartridge cooperative surface 316, which is essentially rounded, serves to push cartridge C into drive 80 during a soft load. Cartridge cooperative surface 318, which is essentially linear, serves as a stop and registrar upon ejection of cartridge C. As explained hereinafter, flipper assemblies 300 are actuated in response to movement of engagement arms 120 to push a cartridge into tape drive 80.

Engagement arms 120 and flipper assemblies 300 serve the functions of primary and secondary cartridge loaders, respectively. A scenario of a cartridge loading operation for loading cartridge C into drive 80 is now described with respect to the specific successive stages shown in three sets of drawings. A first of these sets of drawings, e.g., FIG. 4A, FIG. 4B, FIG. 4C, FIG. 4D, and FIG. 4E, show a side perspective view of the operations of cartridge transport system 60. A second of these sets of drawings, e.g., FIG. 5A, FIG. 5B, FIG. 5C, FIG. 5D, and FIG. 5E, show a top view of operations of cartridge transport system 60. A third of these sets of drawings, e.g., FIG. 6A, FIG. 6B, FIG. 6C, FIG. 6D, and FIG. 6E, show a bottom view of engagement arm actuation unit 134, with bottom plate 206 removed, in a sequence of operations performed by cartridge transport system 60.

Figure 4A:
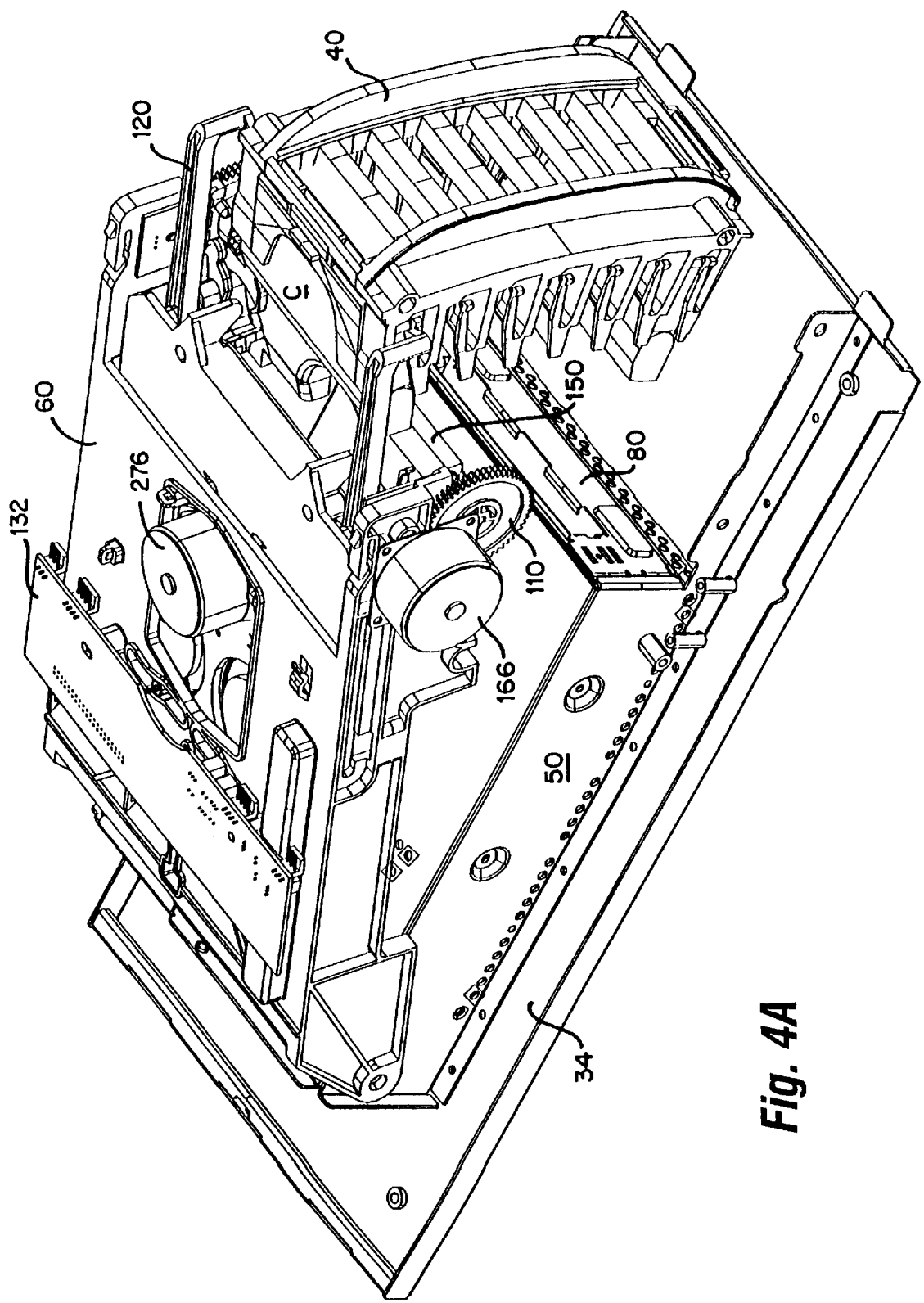
FIG. 4A, FIG. 4B, FIG. 4C, FIG. 4D, and FIG. 4E are side perspective views showing a sequence of operations performed by a cartridge transport system of the cartridge library of FIG. 1.
Figure 5A:
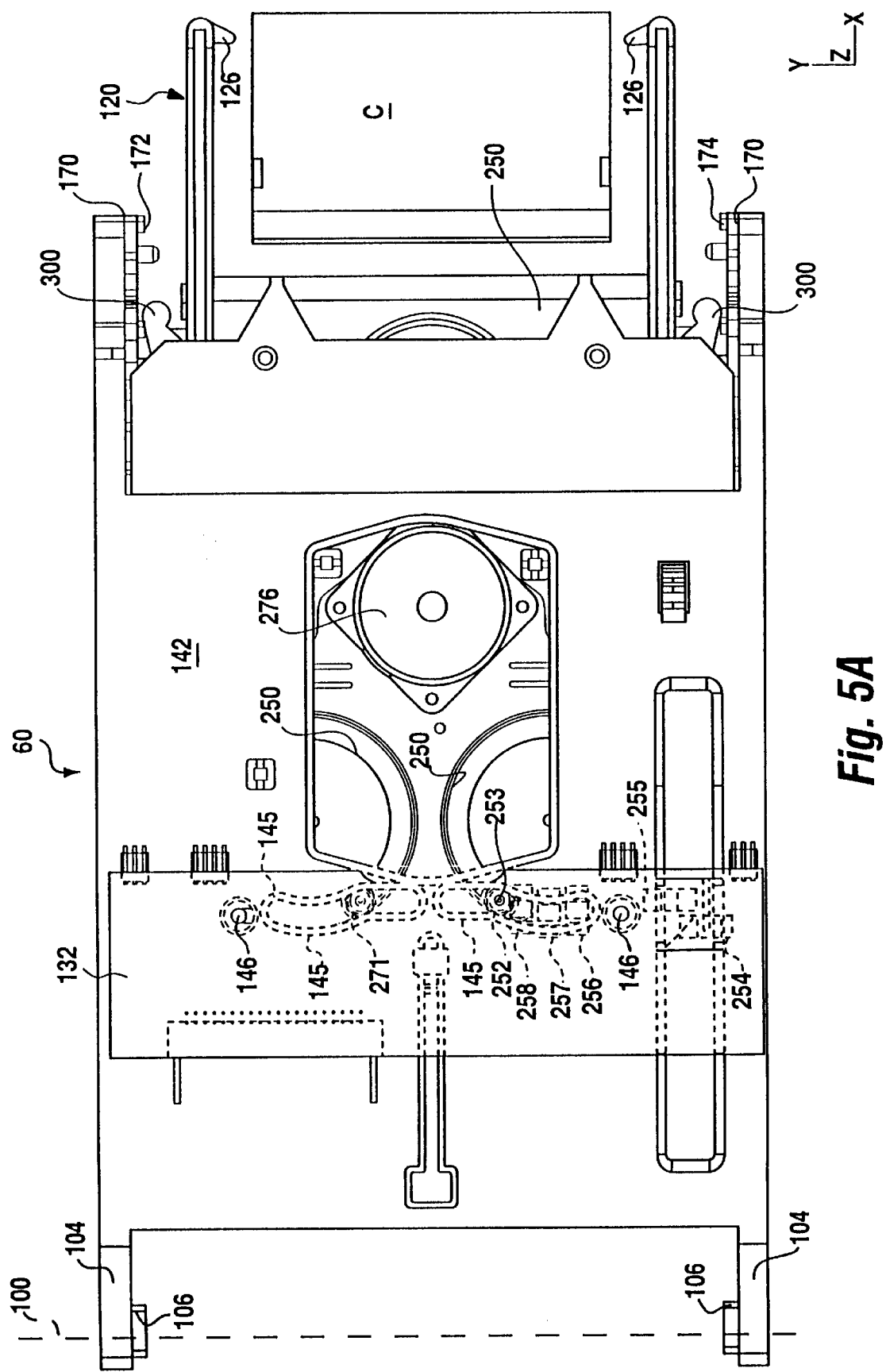
Figure 6A:
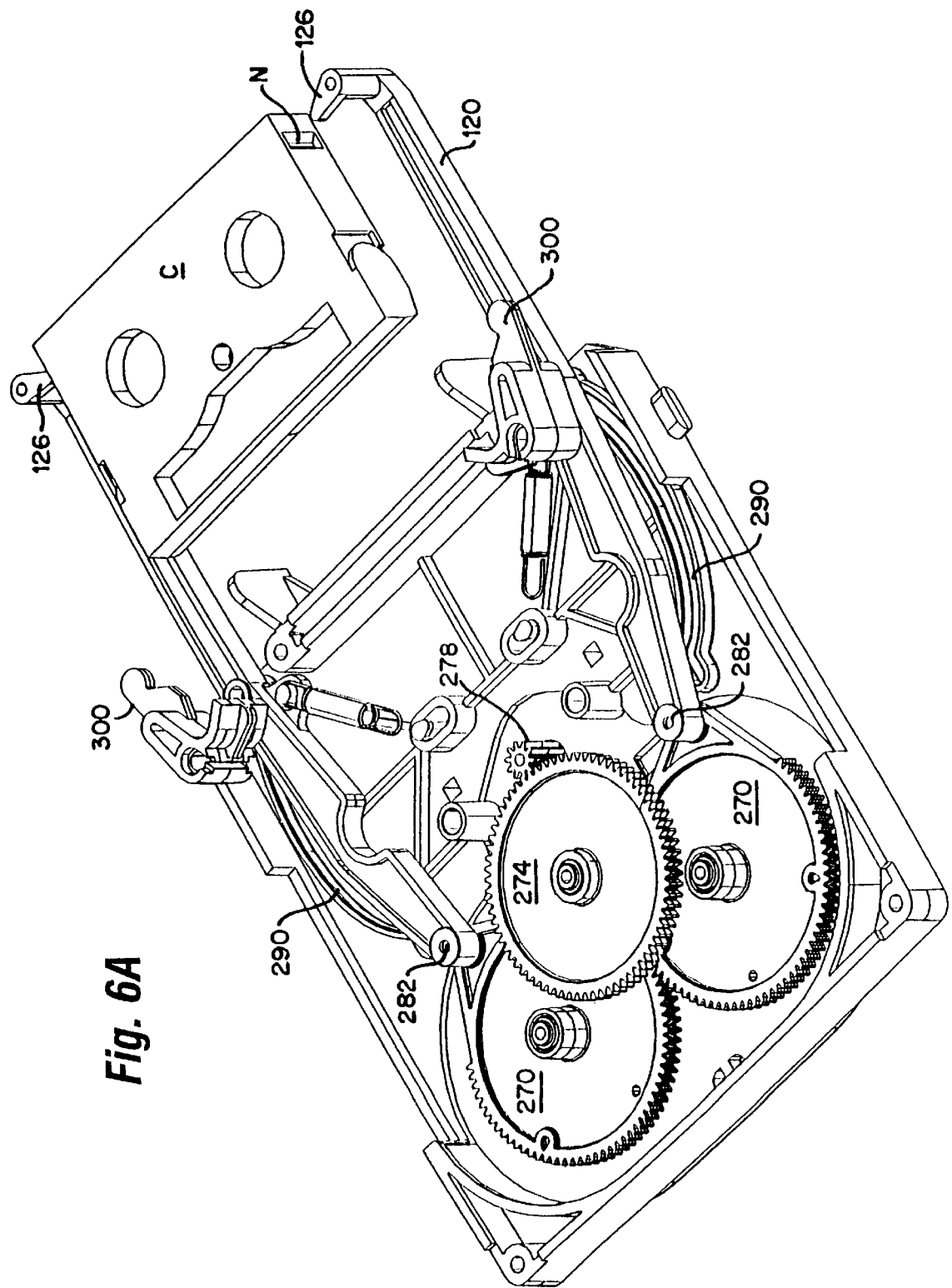
FIG. 6A, FIG. 6B, FIG. 6C, FIG. 6D, and FIG. 6E are bottom views of a engagement arm actuation unit with bottom plate removed showing a sequence of operations performed by a cartridge transport system of the cartridge library of FIG. 1.

In the scenario depicted by the three sets of drawings, cartridge transport system 60 has already climbed up toothed rack 90 of magazine mounting assembly 45 so that finger tips 126 of cartridge engagement arms 120 are aligned with (but not yet engaging) an uppermost cartridge C in magazine 40, and particularly with notches N of cartridge C as shown in each of FIG. 4A, FIG. 5A, and FIG. 6A. To travel to the position shown in FIG. 4A, FIG. 5A, and FIG. 6A, the engagement arm drive motor 276 was activated so that finger tips 126 were spread apart to their farthest extent. Then, carriage rotation motor 166 was activated whereby pinion 164 rotated. As pinion 164 rotated in the appropriate direction, pinion 164 meshed with larger outer gear 159, thereby causing larger outer gear 159 to rotate. As larger outer gear 159 rotated, so did smaller inner gear 160. Since smaller inner gear 160 engages toothed rack 90 of magazine mounting assembly 45, the rotation of smaller inner gear 160 in the appropriate direction caused the entire cartridge transport system 60 to pivot or rotate in a theta ($\theta$) direction about axis 100. The duration of activation of carriage rotation motor 166 determines the angle of rotation in the theta ($\theta$) direction about axis 100, and thus the displacement along the Z axis. As subsequently described (e.g., with reference to FIG. 7), cartridge transport system 60 monitors not only its position along the arcuate rear edges 88 of toothed rack 90, but also detects if cartridges are inserted or misinserted with respect to each of the plural cells of magazine 40.

Thus, FIG. 4A, FIG. 5A, and FIG. 6A show cartridge transport system 60 aligned with an uppermost cartridge C in magazine 40, with the cartridge engagement arms 120 fully spread apart, and with flipper assemblies 300 in their normally biased open (e.g., non-operative) position. In the position of FIG. 4A, FIG. 5A, and FIG. 6A, cartridge transport system 60 has its engagement arms 120 in a fully extended and fully separated position in anticipation of gripping cartridge C. By extended is meant that engagement arms 120 are at their farthest extent of travel toward magazine mounting assembly 45, and by separated is meant that engagement fingers 126 are at their greatest distance apart from one another.

The position shown in FIG. 4A, FIG. 5A, and FIG. 6A is a sensed position. That is, photointerrupter 253 trips the beam for fifth sensor assembly 258 and photointerrupter 262 trips first sensor assembly 254 (see FIG. 5A). Thus, controller 65 of cartridge library 20 knows that engagement fingers 126 are maximally extended and are spread apart and ready to grip cartridge C.

Figure 5B:
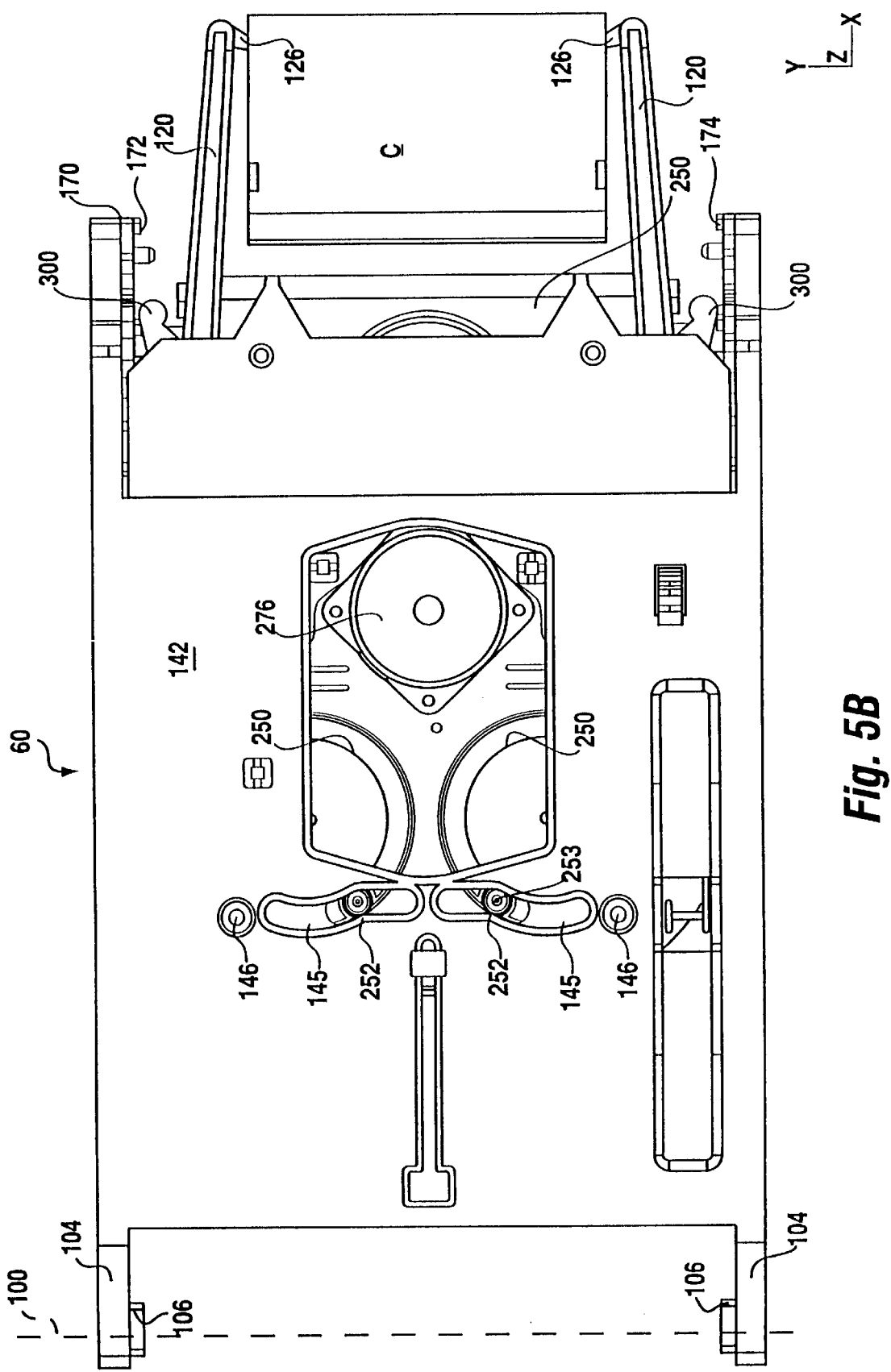
Figure 6B:
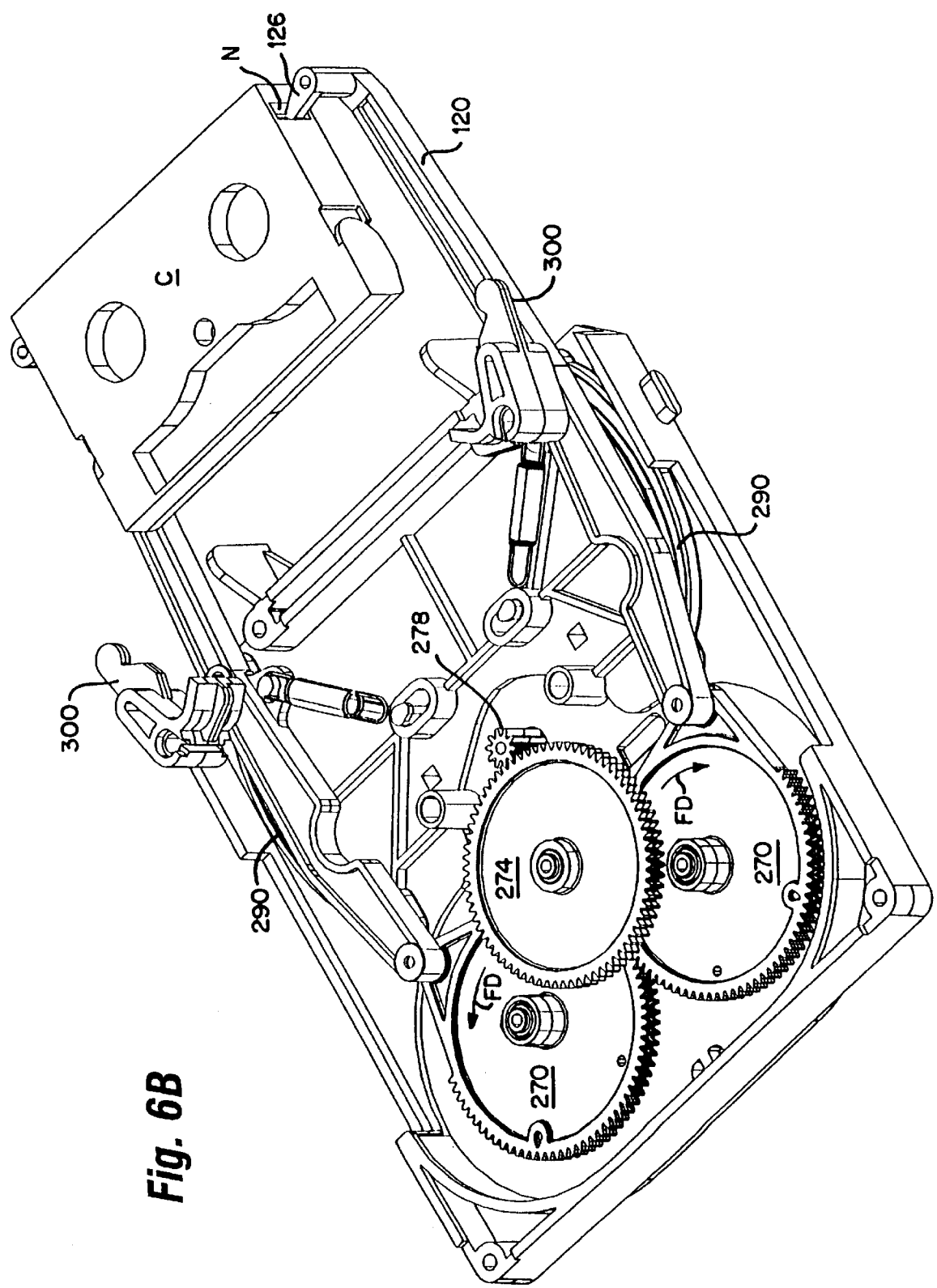

FIG. 5B and FIG. 6B show a position of cartridge transport system 60 wherein fingers 126 first engage notch N (see particularly FIG. 6B) of cartridge C. The position of FIG. 5B and FIG. 6B is attained as motor 276 rotates intermediate gear 274, causing eccentrics 270 to rotate in a forward direction shown by arrows FD in FIG. 6B. As eccentrics 270 rotate in the forward direction FD, cam follower pin 288 follows the cam groove 290, and particularly a segment of cam groove 290 at the front of cartridge transport system 60. In addition, the guide pins 252 on the tops of eccentrics 270 extend through two pairs of guide slots, particularly semi-circular slots 250 and slots 145 (see FIG. 5B). Arcuate movement of cam follower pin 288 in cam groove 290 causes forearms 286 to pivot toward one another until finger tips 126 engage cartridge changer notches N. The rotation of guide pin 252 (which rotate as eccentrics 270 are rotatably driven by engagement arm drive motor 276), extending through guide slots 145, cause the carriage second section (i.e., engagement arm actuation unit 134) to be withdrawn into the carriage first section (e.g., carriage frame 130). As the carriage second section 134 is withdrawn, so are engagement arms 120 and cartridge C engaged therebetween. The position of FIG. 5B and FIG. 6B is not sensed relative to photointerrupter 253 (for which reason circuit board 132 is not shown in FIG. 5B). Flipper assemblies 300 are essentially uninvolved in the operations of FIG. 5B and FIG. 6B, and thus remain in their non-operative (i.e., biased open) positions.

Figure 4B:
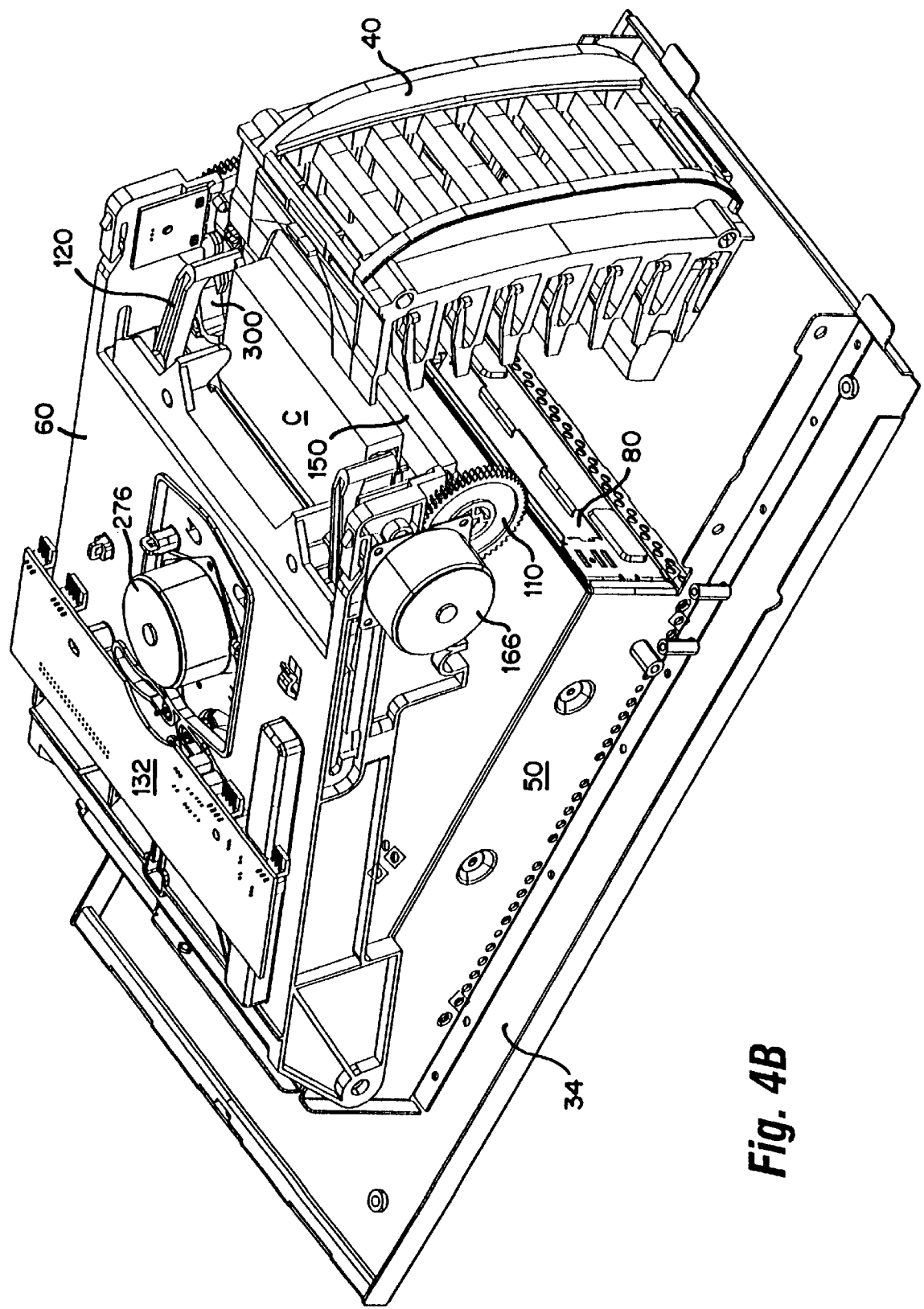
Figure 4C:
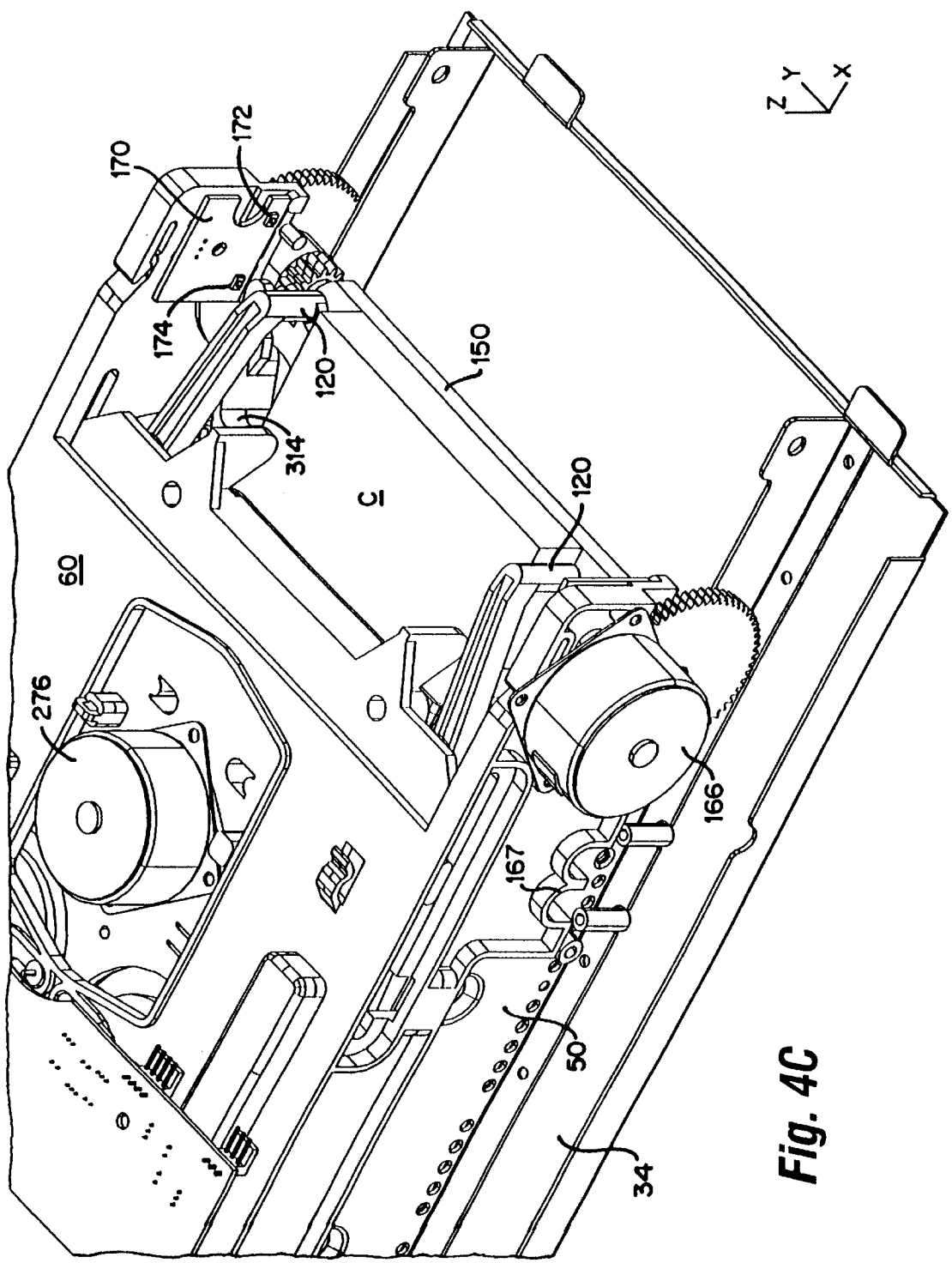
Figure 6C:
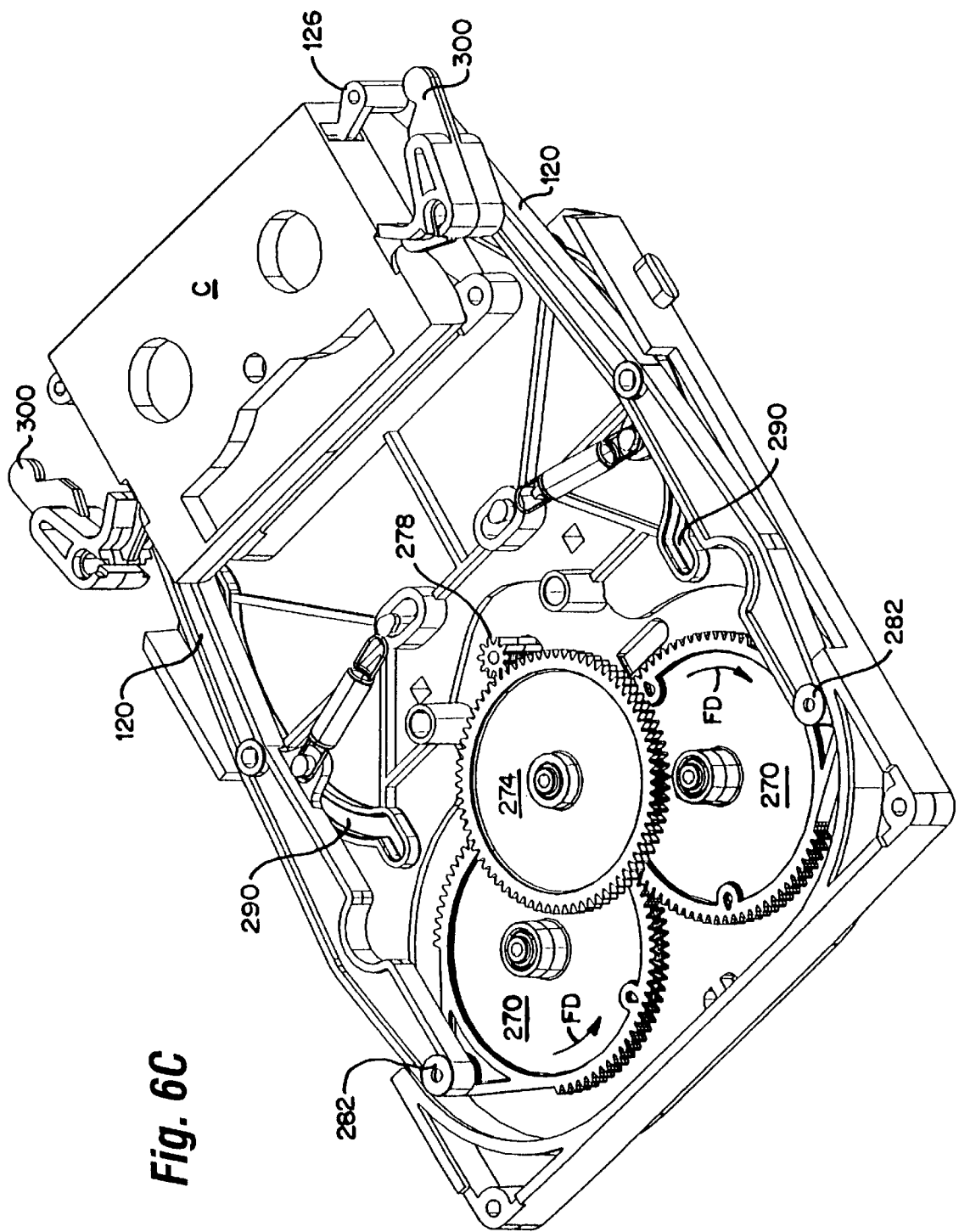

As engagement arm drive motor 276 continues to withdraw cartridge engagement arms 120, eventually the carriage second section 134 is fully retracted into carriage first section 130 and the cartridge engagement arms 120 are at a position so that the cartridge C is over and rests on cartridge shelf 150, as shown in FIG. 4B, FIG. 5C, and FIG. 6C. The position shown in FIG. 4B, FIG. 5C, and FIG. 6C is a sensed position, with photointerrupters 262 and 261 not tripping photodetectors 254 and 255, respectively (see FIG. 5C). Thus, controller 65 of cartridge library 20 knows that cartridge C is on cartridge shelf 150.

Carriage rotation motor 166 is subsequently activated in a direction opposite from previously, so that rotational motion thereof is transmitted via the meshing of pinion 164 and larger outer gear 159 to smaller inner gear 160. Rotation of smaller inner gear 160, now in the reverse direction, causes cartridge transport system 60 to climb down toothed rack 90 of magazine mounting assembly 45 (in the negative direction of the theta axis). Activation of carriage rotation motor 166 continues until home position sensed member 167 trips home sensor beam 168 of carriage home sensor 169 (see FIG. 1B and FIG. 1C). When home position sensed member 167 trips home sensor beam 168 of carriage home sensor 169, the cartridge C (carried on cartridge shelf 150 between the grips of cartridge engagement arms 120) is aligned with an entry slot or mouth of tape drive 80 in the manner shown in FIG. 4C and FIG. 5C.

Figure 4D:
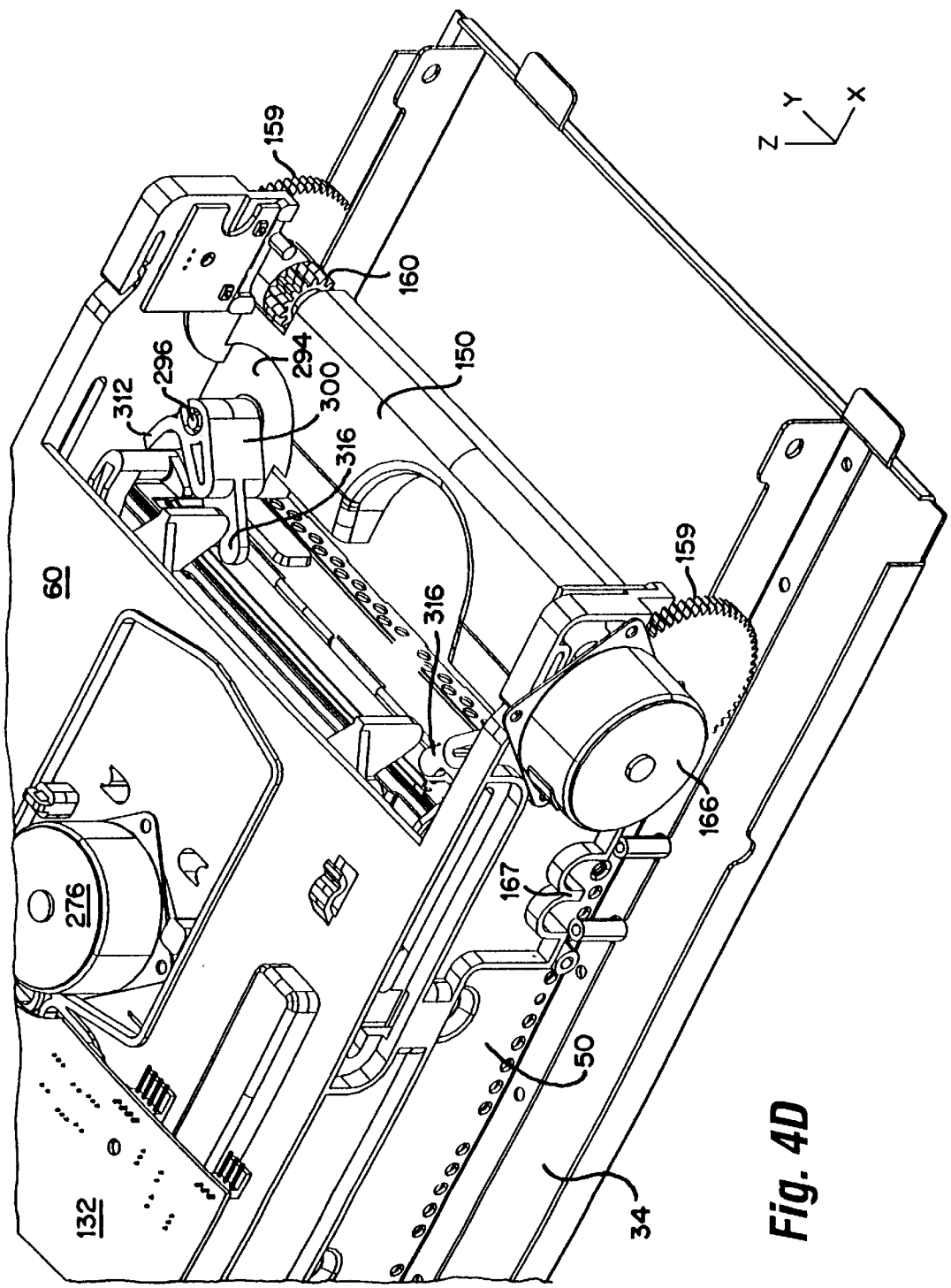
Figure 6D:
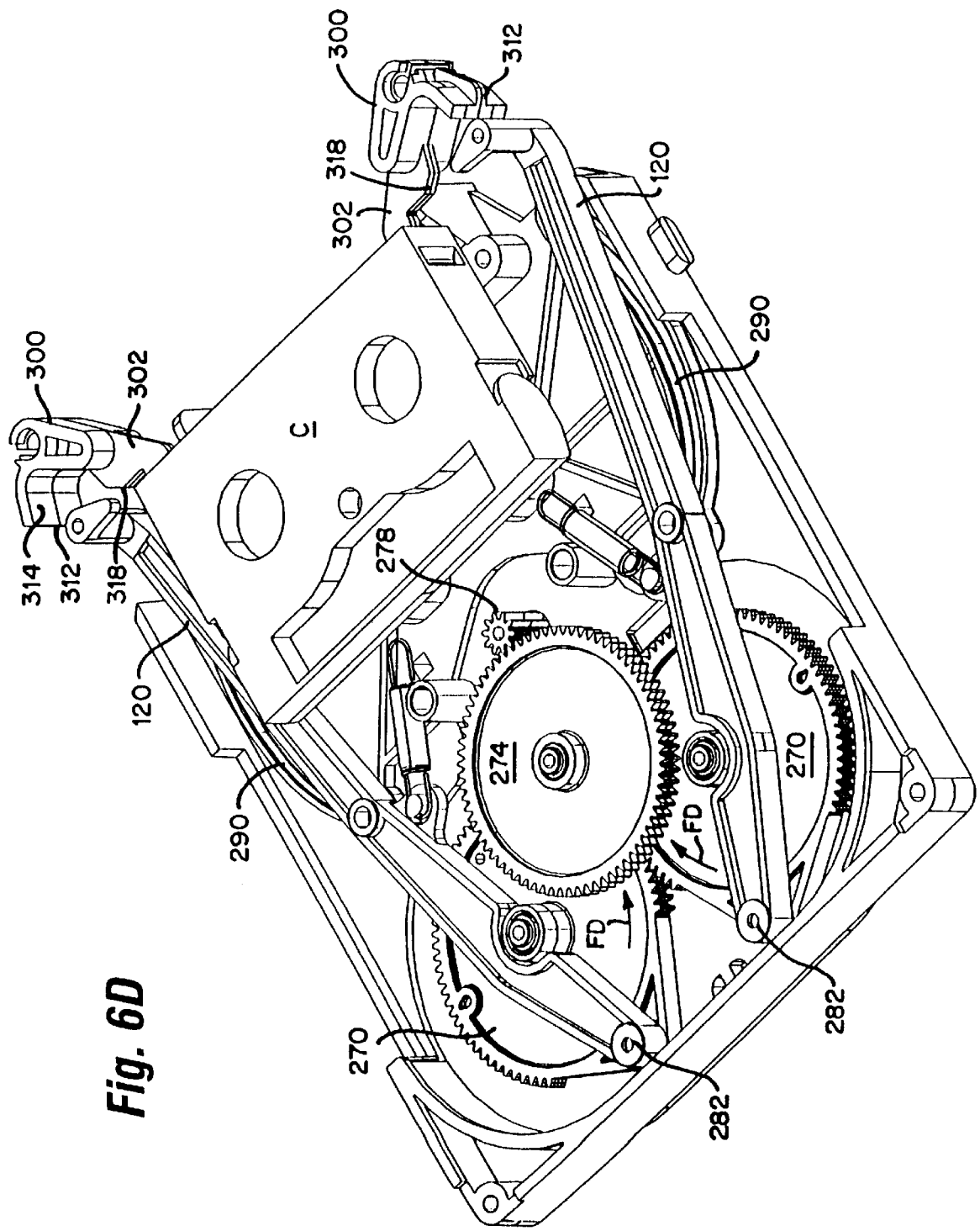

After cartridge C has been aligned with tape drive 80 in the manner above described, the cartridge C is inserted into tape drive 80 as illustrated in FIG. 4D, FIG. 5D, and FIG. 6D. The position shown in FIG. 4D, FIG. 5D, and FIG. 6D is reached as eccentrics 270 rotate in direction FD (see FIG. 6D) to an extent that engagement arms 120 contact flipper assemblies 300 and overcome the biasing force of torsion springs 303. In particular, as the cartridge engagement arms 120 retreat rewardly. The cylindrical extensions 124 thereof catch the arm follower notch 314 in corresponding flipper assemblies 300 and apply a force which causes the flipper assemblies 300 to pivot toward tape drive 80. As the flipper assemblies 300 pivot toward tape drive 80, the rounded cartridge cooperative surface 316 pushes cartridge C into the mouth (e.g. cartridge insertion slot) of drive 80. Thus, the final push causing cartridge C to be fully inserted into drive 80 is provided by cartridge contact elements 302 of flipper assemblies 300, and particularly the rounded tips 316 thereof. Upon full insertion of the cartridge C into tape drive 80, the cartridge transport system 60 has the position shown in each of FIG. 4D, FIG. 5D, and FIG. 6D. It will be appreciated from FIG. 4D and FIG. 5D and particularly from FIG. 6D that, at this farthest extent of rearward travel of cartridge engagement arms 120, the distal ends of cartridge engagement arms 120 remain in contact with flipper assemblies 300, thus continuing to overcome the biasing and to maintain flipper assemblies 300 in their closed positioned toward tape drive 80.

The position of cartridge transport system 60 shown in FIG. 4D, FIG. 5D, and FIG. 6D is a sensed position, requiring that photointerrupter 253 trip the beam of third sensor assembly 256 (see FIG. 5D), and that photointerrupters 262 and 261 trip sensors 254 and 255, respectively. Signals indicative of tripping of the beam of third sensor assembly 256 advises controller 65 that an attempt has been made to load cartridge C into drive 80. Drive 80 may provide a signal to controller 65 when cartridge C has been accepted and fully loaded into drive 80.

Prior to ejection of cartridge C from drive 80, controller 65 activates motor 276 so that eccentrics 270 rotate in a reverse direction (as indicated by arrows RD in FIG. 6E) to slightly extend engagement arms 120. Such rotation and extension, although slight, is shown by contrast of FIG. 5D with FIG. 5E. Extension of engagement arms 120 causes flipper assemblies 300 to pivot slightly away from one another, so that cartridge cooperative surfaces 318 are held stationary, slightly spaced away from, and parallel to the front surface of drive 80 as shown in FIG. 5E.

Figure 5E:
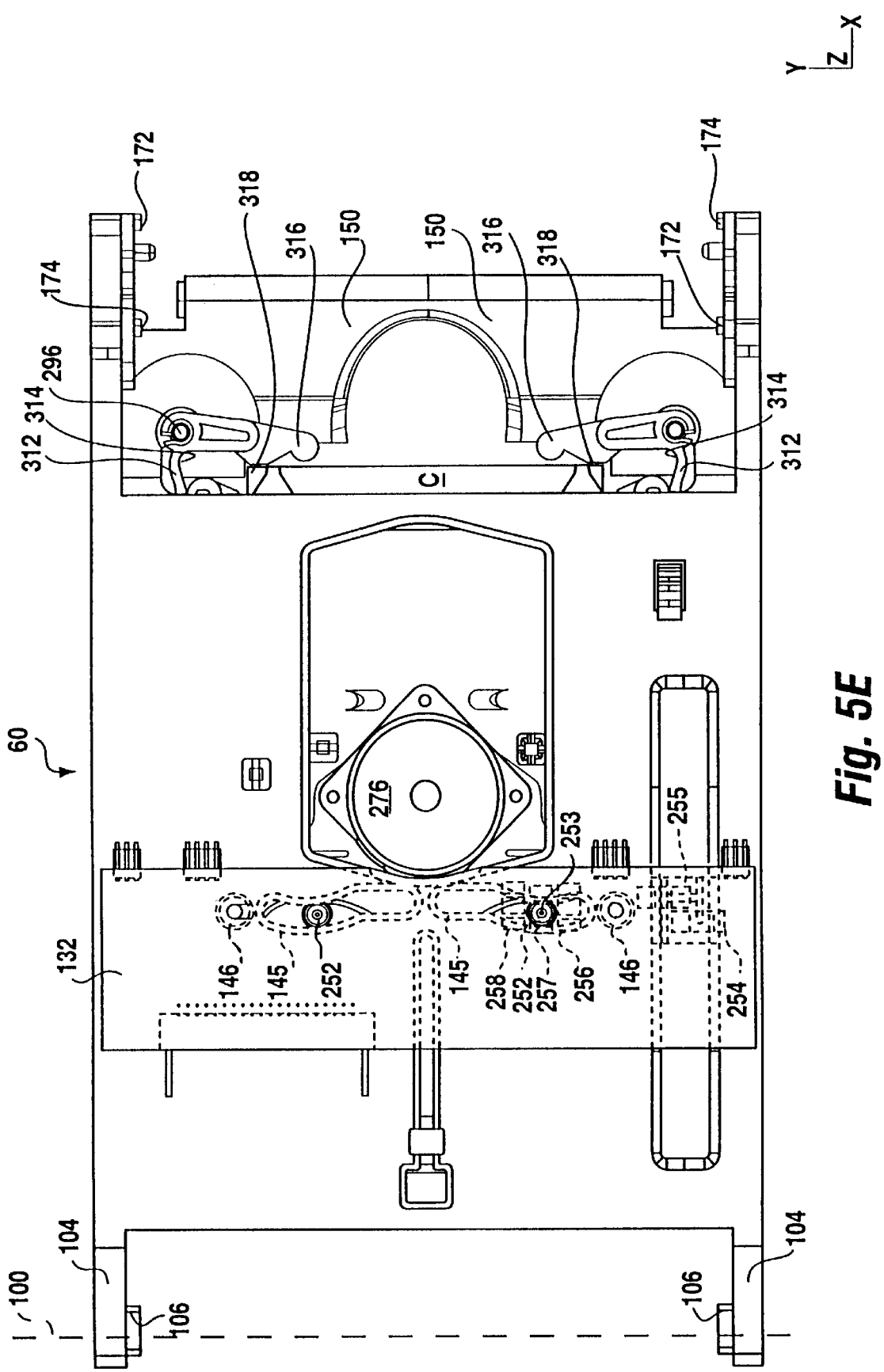

The degree of actuation of motor 276 to achieve the position of flipper assemblies 300 as shown in FIG. 5E is controlled by controller 65. In this regard, motor 276 is activated only until photointerrupter 253 trips the beam of fourth sensor assembly 257 (see FIG. 5E) and photointerrupters 263 and 261 trip photodetectors 254 and 255, respectively. Upon receiving a signal indicative of the tripping of the beam of fourth sensor assembly 257, controller 65 deactivates motor 276 whereupon flipper assemblies 300 are precisely located in the positions shown in FIG. 5E.

Figure 4E:
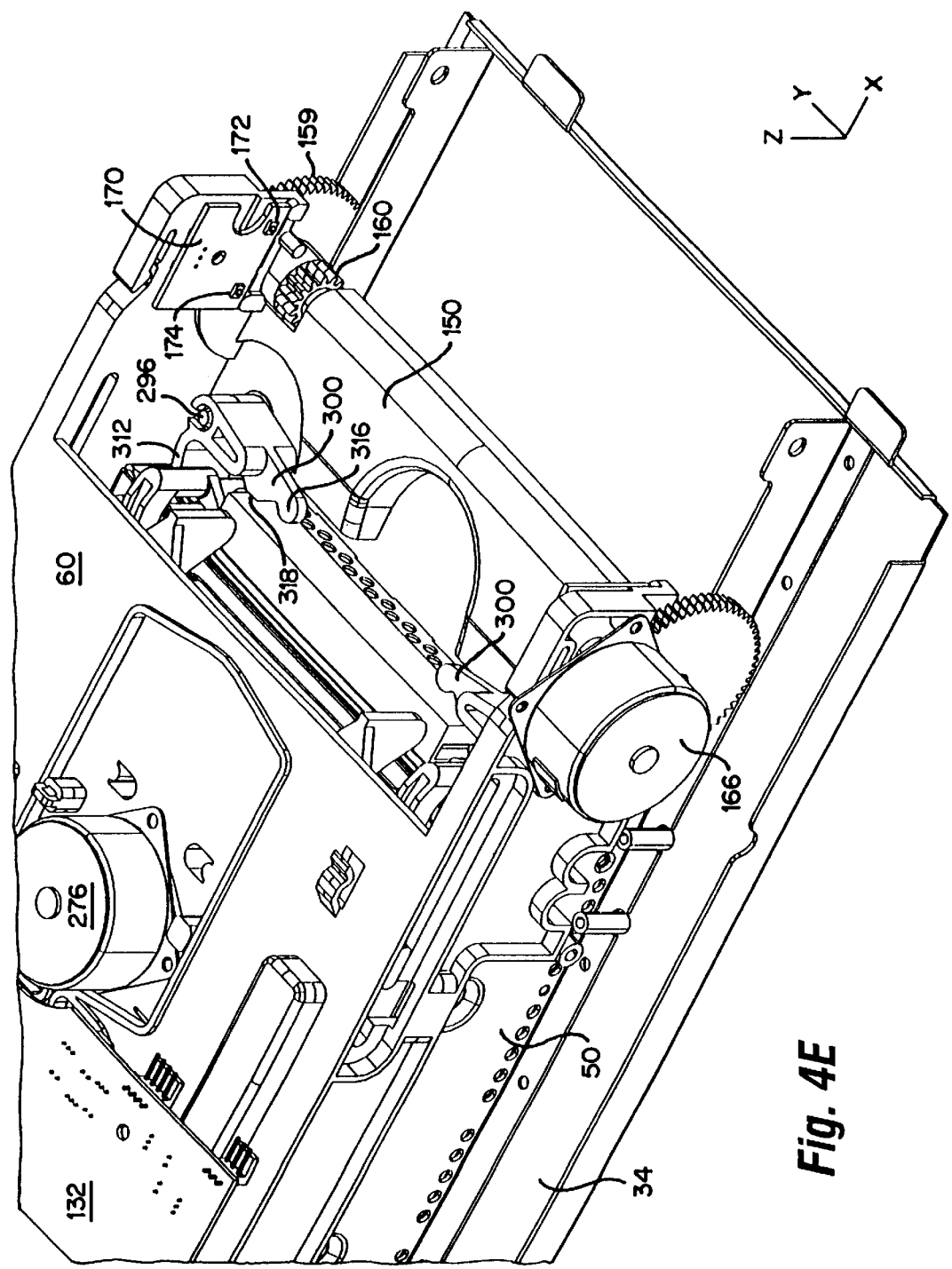
Figure 6E:
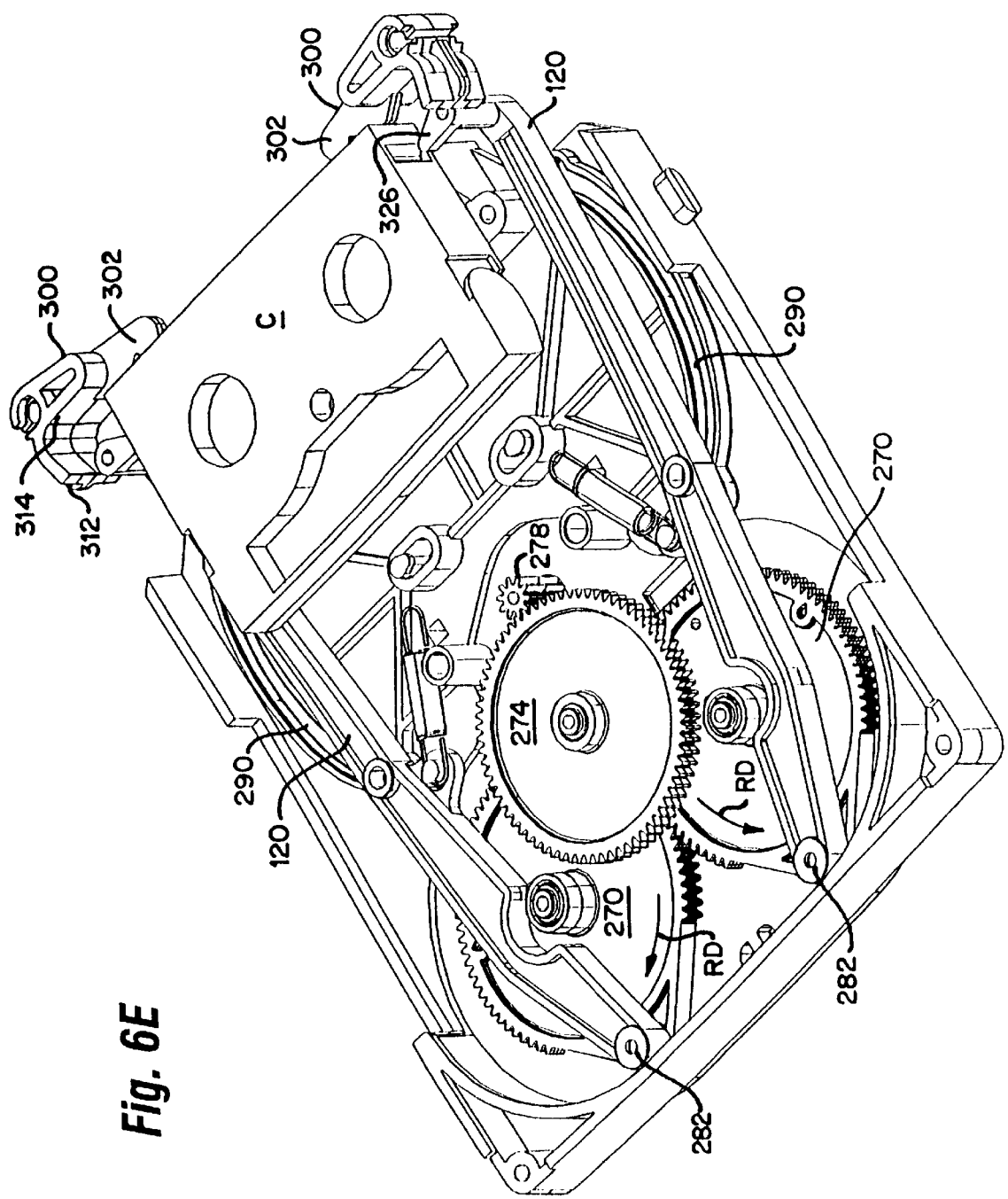

While FIG. 4E, FIG. 5E, and FIG. 6E show cartridge C after having been ejected from drive 800, the pre-ejection position of flipper assemblies 300 can be appreciated. Prior to ejection, cartridge cooperative surface 318 is positioned essentially parallel to the front of drive 80, and thus essentially serves as a stop for cartridge C upon ejection of cartridge C from tape drive 80. Therefore, when cartridge C is ejected from drive 80, cartridge C does not fall out of drive 80. Rather, because of the known position of cartridge cooperative surface 318, which is held stationary for abutment by cartridge C, cartridge C is registered and the location thereof precisely known.

After registration of cartridge C in the manner above described with respect e.g., to FIG. 5E, motor 276 is again activated for extending engagement arms 120. As engagement arms 120 are extended, fingers 126 engage notches N in cartridge C and carry cartridge C to a desired cell in magazine 40. The cell in which cartridge C is deposited can be the same cell from which it was withdrawn or, alternatively, another cell with which cartridge transport system 60 becomes aligned.

Cartridge transport system 60, under supervision of controller 465, rotates about axis 100 into alignment with a selected cell of magazine 40 in order to retrieve or insert a cartridge into the magazine. With respect to magazine 40, the cartridge library 20 of the present invention has a cartridge status detection system illustrated e.g., by FIG. 7. Although magazine 40 per se is not shown in FIG. 7 for sake of simplicity, three example cartridges $C_1$ through $C_3$ are shown in the positions they would respectively occupy in the highest three cells of magazine 40. In FIG. 7, cartridges $C_1$ and $C_2$ are properly inserted; cartridge $C_3$ is improperly inserted, e.g. cartridge $C_3$ is upside down.

As mentioned previously, and as also shown in FIG. 7, magazine mounting assembly 45 has curved rear edges 88, a segment of each of the rear edges 88 having a toothed rack 90 formed thereon. The toothed rack 90 extends at a first radius from pivot axis 100. At a second radius from pivot axis 100 (which is greater than the first radius) is an imaginary arc 700. Formed along imaginary arc 700 are a series of detection and registration windows 702. At each end of the series are outer ones detection and registration windows 702 (such as detection and registration window $702_0$ shown in FIG. 7); between the outer windows 702 are intermediate windows $702_1$, $702_2$, etc. Each of the intermediate detection and registration windows 702 has a first edge 706 which is essentially parallel or coplanar with an imaginary radial line from pivot axis 100 and parallel to a planar bottom surface $C_{BS}$ of a cartridge. Each of the detection and registration windows 702 also has a misinsertion detection edge 708 which is non-colinear with an imaginary radial line from pivot axis 100, but lies in a plane with a beveled edge of a cartridge top surface leading portion $C_{TSLP}$. FIG. 7 shows detection and registration window $702_1$, with its detection edge 706 and misinsertion detection edge 708.

As magazine mounting assembly 45 has two rear edges 88, it will be understood that each of the rear edges 88 has the detection and registration windows 702. The detection and registration windows 702 on the two rear edges 88 are horizontally aligned with one another (see FIG. 1A).

When cartridge $C_1$ is inserted in the first cell of magazine 40, the planar bottom surface $C_{BS}$ thereof is visible through detection and registration window $702_1$ in the manner shown in FIG. 7. If cartridge $C_1$ had been misinserted in the first cell of magazine 40, e.g., upside down, a surface of cartridge $C_1$ (particularly, the planar bottom surface $C_{BS}$) would be visible above misinsertion edge 708 of detection and registration window $702_0$. In this regard, see cartridge $C_3$ with its planar bottom surface $C_{BS}$ being visible above misinsertion edge $708_2$ of detection and registration windows $702_2$.

The pair of sensor circuit boards 170 carried by cartridge transport system 60 are situated so that a beam from a leading pair of a photo emitter 172 and a photodetector 174 mounted thereon travels in along the imaginary arc 700, the beam being perpendicular to the plane of the sheet of FIG. 7. Therefore, as cartridge transport system 60 rotates about pivot axis 100 in the manner elsewhere described, the beam emitted from the leading photo emitter 172 is interrupted by the sheet metal of magazine mounting assembly 45 until one of the detection and registration windows 702 is encountered. Thus, as the beam travels upwardly along imaginary arc 700, it is only intermittently detected by the photodetector 174 aligned with the emitting photo emitter 172. The beam becomes detectable upon reaching misinsertion edge 708 and remains detectable (1) until detection edge 706 is encountered in the event that a cartridge is absent, or (2) until the cartridge is encountered in the case of a cartridge being present in the cell.

In pivoting about pivot axis 100 and thereby traveling alone magazine mounting assembly 45, the cartridge transport system 60 knows its radial position relative to pivot axis 100 by a tach count of carriage rotation motor 166 maintained by controller 65. Using the tach count, controller 65 can precisely position of the leading pair of photo emitter 172 and photodetector 174 (collectively referred to as the detection/registration sensor) in connection with whatever type of operation may be performed with respect to a particular cell of magazine 40 or cartridge. With respect to the cell for cartridge $C_2$, for example, the detection/registration sensor is aligned with point $P_1$ when controller 65 wants to check for presence of cartridge $C_2$. When at point $P_1$, non-reception of the beam at photodetector 174 from photo emitter 172 confirms that cartridge $C_2$ is present. When controller 65 wants to check whether cartridge $C_2$ is misinserted, the detection/registration sensor is aligned with point $P_2$. When at point $P_2$, if the beam of detection/registration sensor is not detected, controller 65 knows that cartridge $C_2$ is misinserted. When controller 65 wants the cartridge transport system 60 to retrieve cartridge $C_2$, the detection/registration sensor is aligned with point $P_3$. Alignment of detection/registration sensor with position $P_3$ is also sought by controller 65 when it is desired to insert a cartridge in the cell shown in FIG. 7 as occupied by cartridge $C_2$.

An alternate way to determine the presence of the cartridge or the misinsertion of a cartridge is to log sensor transitions and determine if blockage is occurring at the pertinent points, e.g., points $P_1$ and $P_2$. For example, controller 65 may determine from the sensor beam the edges of the cartridge, and with reference to the cartridge edges confirm that a cartridge is present or determine that a cartridge is misinserted. By determining sensor transitions and determining cartridge edges relative to the tach count, the controller 65 can determine whether the sensor is interrupted at point $P_1$ (thus confirming cartridge presence) or point $P_2$ (thus indicating cartridge misinsertion).

Thus, the series of detection and registration windows 702 formed on magazine mounting assembly 45 serve for detecting (1) status of the cartridge in magazine 40 (e.g., presence or absence or misinsertion), and (2) an angular position of cartridge transport system 60 about pivot axis 100.

Thus, the detection and registration apertures 702 have three distinct points therein. These points are as follows: (1) a misinsertion detection point ($P_2$) therein at which the data cartridge is sensed if the data cartridge is misinserted into the magazine; (2) a cartridge detection point ($P_1$) therein at which the data cartridge is sensed if the data cartridge is present in the magazine; and (3) a transport alignment point ($P_3$) herein which serves as a reference when the cartridge transport assembly inserts or retrieves the data cartridge from the magazine.

Although the three points $P_1$ through $P_3$ are illustrated in FIG. 7 only with reference to one of die detection and registration windows 702 and in connection with cartridge $C_2$, it should be understood that a comparable set of three points exists with respect to cartridge activities aligned with any other of the detection and registration windows 702. The windows 702 are thus formed in predetermined relationship with cells of magazine 40.

Figure 8B:
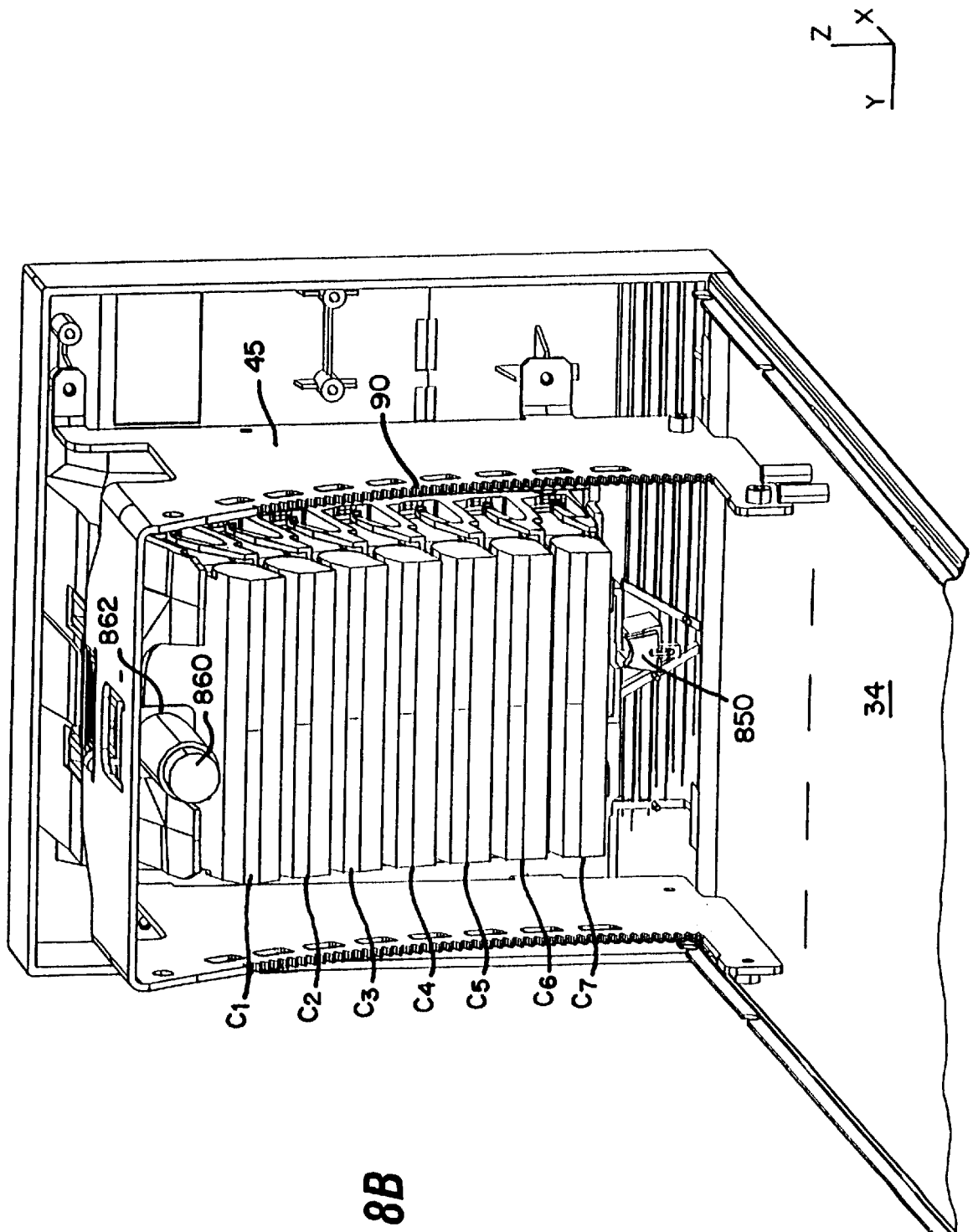

FIG. 8A and FIG. 8B are respective front and rear views of front wall 36 and magazine mounting assembly 45 with magazine 40 inserted therein. As understood also in conjunction with FIG. 1, on its front surface front wall 36 has a recessed and partially apertured area 802 over which an interactive console 804 fits. The interactive console 804 includes both input keys 806 and a display 810. Across its bottom, the front wall 36 has a series of vent louvers 812.

The vent louvers 812 on magazine mounting assembly 45 are aligned with tape drive 80 (contained in drive mounting assembly 50) in order to facilitate air flow through the library and through tape drive 80. A fan mounted on rear wall 35 assists in air flow through library 20.

The front wall 36 of cartridge library 20 has a central recessed region 818. Two lateral side panels 820 of recess 818 extend essentially perpendicularly from the plane of a front surface of front wall 36. Top and bottom panels 822, 824, respectively, of central recessed region 818 taper interiorily and centrally from the plane of the front surface of front wall 36. The lateral side panels 820 terminate interiorily in front wall 36 at respective concave panels 830. A magazine-receiving aperture 840 into which magazine 40 is insertable extends between concave panels 830. Depending from top panel 822 and extending slightly into magazine-receiving aperture 840 are two spaced apart tabs 841 of a magazine latch assembly 842 (see FIG. 8A and FIG. 16B). In a central portion thereof, top panel 822 has a top access recess 844. In symmetrical fashion, bottom panel 824 has a central bottom access recess 846. Both top access recess 844 and bottom access recess 846 are essentially keystone-shaped recesses which taper in width across the grasping side of magazine toward the center of lateral side panels 820. At its apex, bottom access recess 846 has a trough 848 formed therein (see FIG. 15A).

FIG. 8B shows (from the rear) each of seven cartridges $C_1$–$C_7$ loaded into magazine 40. In addition, FIG. 8B shows magazine presence sensor 850 which is mounted on a rear surface of front wall 36 beneath magazine 40, as well as magazine latch solenoid 860. The magazine latch solenoid 860 is mounted on a tab 862 which is partially cut and bent down from a top wall of magazine mounting assembly 45.

Figure 14A:
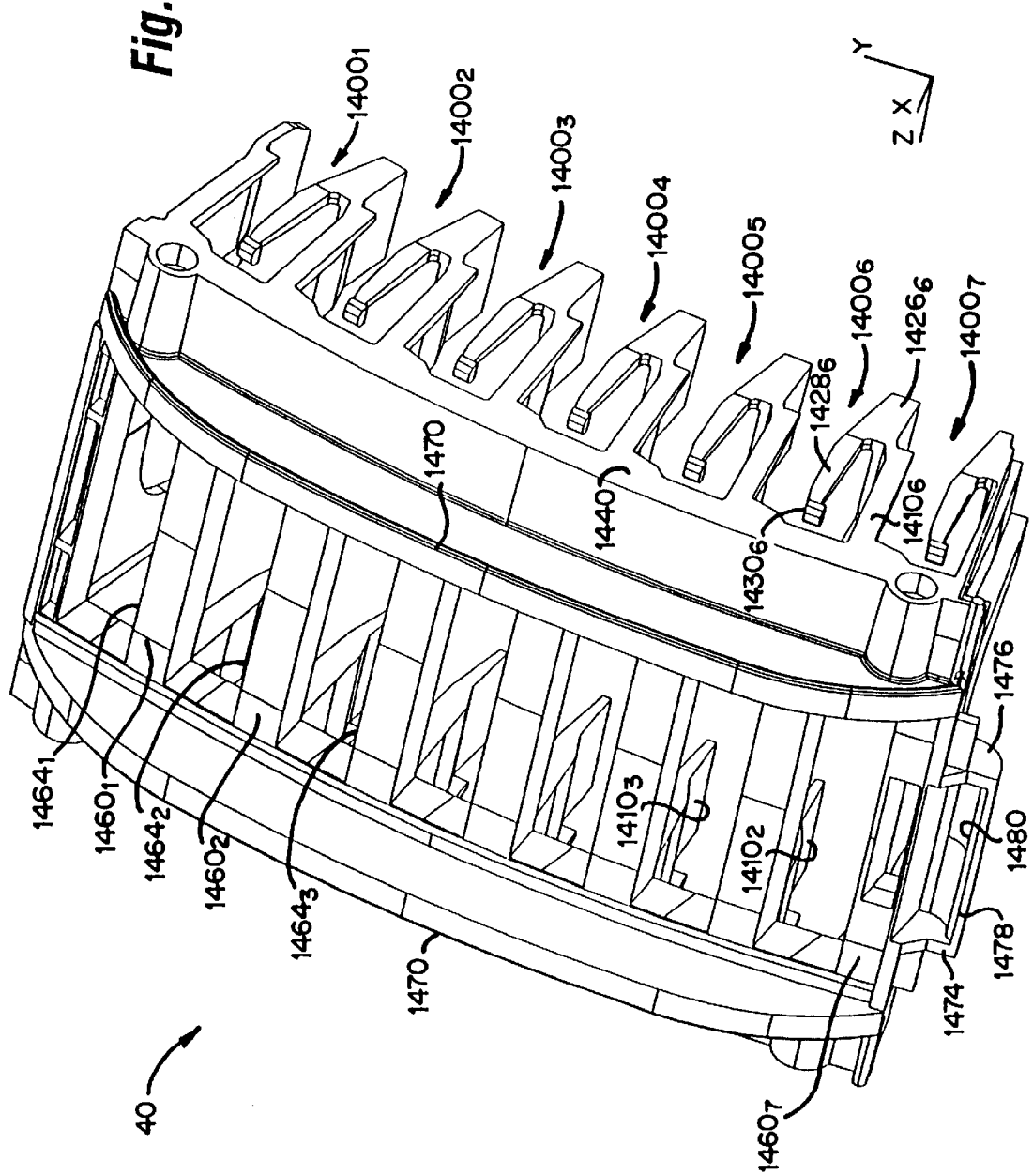
FIG. 14A and FIG. 14B are isometric views of a magazine utilizable with the cartridge library of FIG. 1 from a grasping side and a cell side, respectively.
Figure 14B:
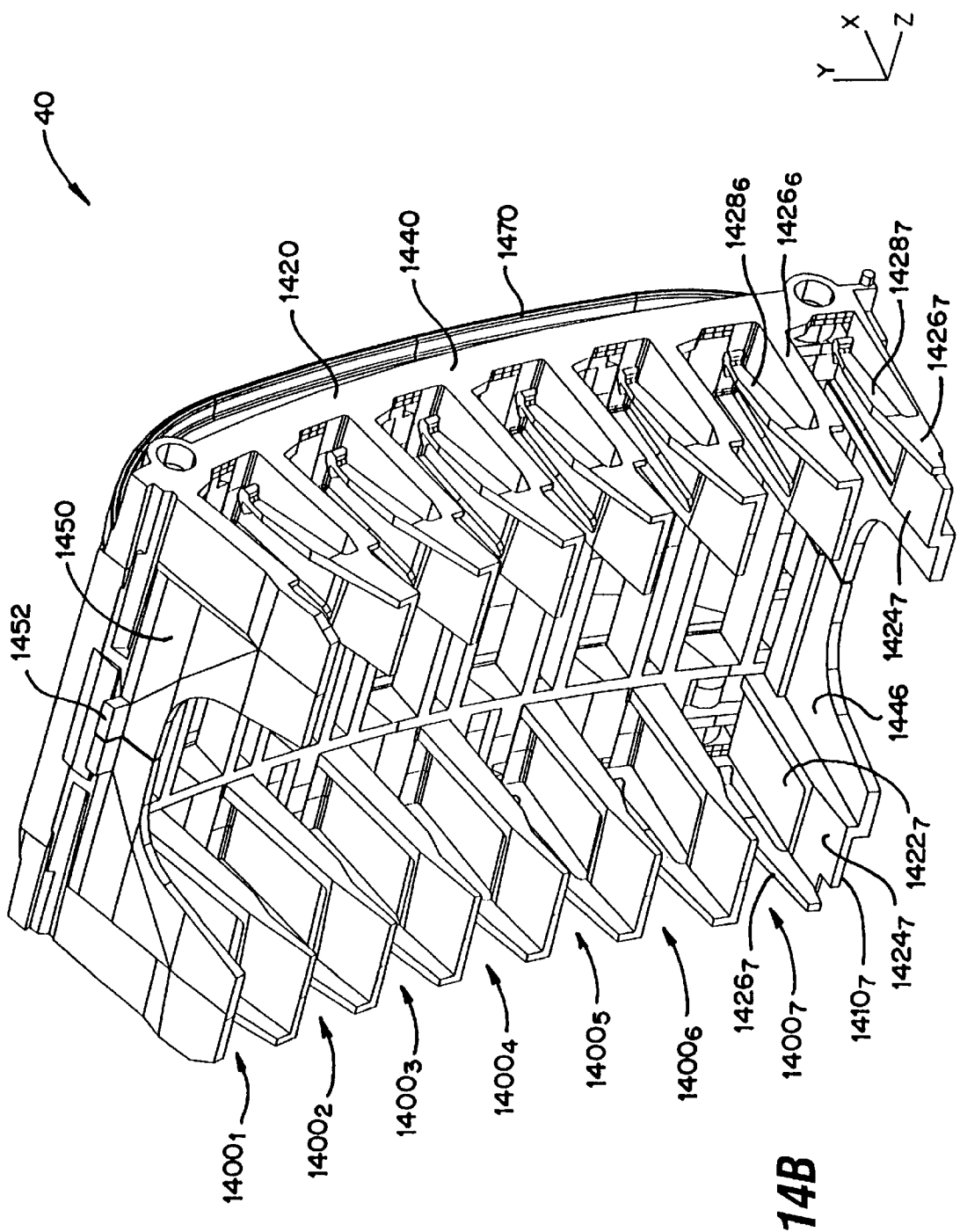

FIG. 14A and FIG. 14B are views of magazine 40 as appearing from a grasping side and a cell side, respectively. As understood, e.g., from FIG. 1A, the grasping side of magazine 40 is visible from the front of cartridge library 20 as magazine 40 is inserted into magazine mounting assembly 45; the cell side of magazine 40 extends interiorly through magazine mounting assembly 45 to orient cartridges situated in the cells toward cartridge transport system 60.

In the illustrated embodiment, magazine 40 defines seven cells 1400 on its cell side, particularly cells $1400_1$–$1400_7$. The magazine 40 is fabricated with each of the cells 1400 situated so that cover-actuated edges of the cartridge C resident therein lie proximate imaginary arc 700 as seen in FIG. 7. Comparable points of each of the seven cartridges $C_1$–$C_7$ are equidistant from pivot axis 100. The seven cartridges $C_1$–$C_7$ are spaced uniformly along imaginary arc 700 at equal angular intervals.

As shown in FIG. 14B, each cell 1400 is at least partially defined by two spaced apart cell partitions 1410. In the illustrated embodiment, the cell partitions 1410 are formed integral (e.g., molded) with a magazine wall or spine 1420. Each cell partition 1410 has a cartridge support rib or shelf 1422 upon which a cartridge bottom surface ($C_{BS}$) lies, as well as a tapering inclined ramp 1424, as illustrated in FIG. 14B with reference to cell $1410_7$. Each cell partition 1410 also has a cartridge lateral retaining wall 1426. A cantilevered cartridge engagement arm 1428 extends from the lateral retaining wall 1426 in a direction in which a cartridge is inserted into the cell 1400. At its distal end, each cantilevered cartridge engagement arm 1428 has an enlarged head 1430.

The magazine wall or spine 1420 has opposing spine lateral edges 1440. The opposing two spine lateral edges 1440 lie in parallel planes, also known as reference planes. For each cell 1400, each spine lateral edge 1440 has a cell partition 1410 extending therefrom in cantilevered fashion. Each spine lateral edge 1440 is essentially planar with the lateral retaining walls 1426 of the cell partitions 1410 extending therefrom. In turn, the lateral retaining wall 1426 has cantilevered cartridge engagement arm 1428 extending back toward spine lateral edge 1440.

Since there are two spaced apart cell partitions 1410 per cell 1400, there are two cantilevered cartridge engagement arms 1428 per cell 1400. The cantilevered cartridge engagement arms 1428 of a cell 1400 are sufficiently resilient so that, if a cartridge is improperly inserted in the cell 1400 (e.g., inserted with its cover-actuated edge first), the two cantilevered cartridge engagement arms 1428 of that cell 1400 are deflected beyond a lateral plane of magazine 40, e.g., deflected beyond a reference plane.

Figure 14D:
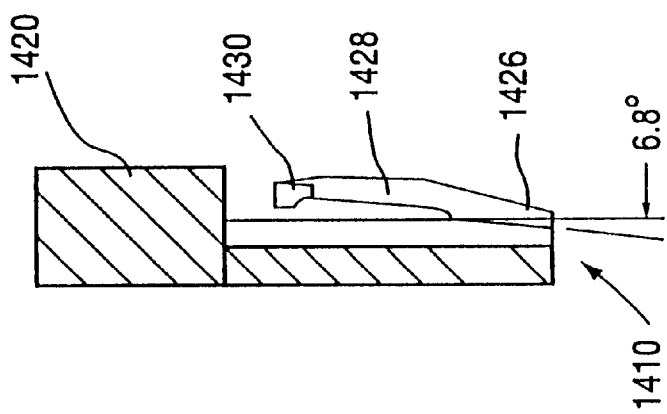
FIG. 14D is a sectioned view taken along line A—A of FIG. 14C.
Figure 14C:
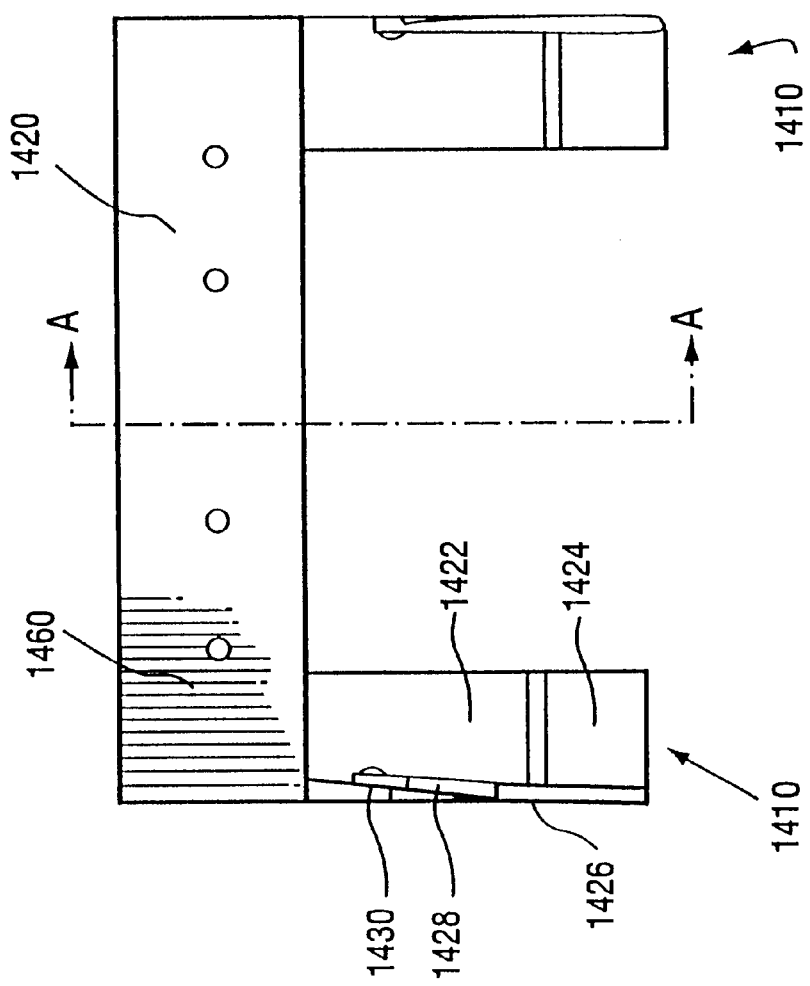
FIG. 14C is a top view of a portion of a cell provided in the magazine of FIG. 14A and FIG. 14B.

FIG. 14C shows a cell 1400 from above, with its two cell partitions 1410 connected to (e.g. formed integral with) magazine wall or spine 1420. FIG. 14D is a sectioned view taken along line A—A of FIG. 14C. FIG. 14C and FIG. 14D are drawn to scale.

Unlike other cell partitions 1410, the cell partition $1410_7$ is formed integral with an apron 1446 extending therebeneath (see FIG. 14B). The magazine apron 1446 has an arcuate, essentially C-shaped apron edge 1448 facing toward cartridge transport system 60 when magazine 40 is installed in magazine mounting assembly 45. A magazine cover 1450, formed somewhat as a mirror image of apron edge 1448 but unconnected to any cell partition 1410, defines a top of cell $1400_1$. Whereas other cells are defined between adjacent ones of the spaced-apart cell partitions 1410, cell $1400_1$ is defined by cell shelf portion $1410_1$ and magazine cover 1450. The magazine cover 1450 has a magazine stop 1452 extending perpendicularly therefrom.

On its grasping side, magazine 40 has a series of seven horizontally extending ribs 1460 connecting the two spine lateral edges 1440, shown as ribs $1460_1$, $1460_2$, . . . $1460_7$ in FIG. 14A. In addition, the magazine cover 1450 bridges the spine lateral edges 1440 at the top of magazine 40. Between adjacent ribs 1460 a cartridge window 1664 is formed. Cartridge window $1664_1$ is formed between magazine cover 1450 and rib $1460_1$. At the angle shown in FIG. 14A with cartridges absent from the cells 1400, undersides of the cell shelf portions 1410 are visible. When a cartridge resides in a cell 1400, the edge of the cartridge opposite the cover-actuated edge is visible through the cartridge window 1664. Such visible edge is typically the edge upon which a barcode label or other indicia is adhered, so that the label or indicia of the cartridge is clearly visible through the cartridge window 1664.

The ribs 1460 of magazine 40 are spanned on the grasping side of magazine 40 by two grasping fins 1470. The grasping fins 1470 extend in a direction parallel to the side planes of magazine spine 1420, and are spaced inwardly from the side planes of magazine spine 1420 as shown in FIG. 14A.

At its bottom, magazine 40 has a magazine pivot member 1474 integrally formed thereon. The magazine pivot member 1474 has a semicylindrical pivot member or surface 1476 oriented toward the cell side of magazine 40. The extent of magazine pivot member 1474 across the grasping side of the magazine 40 is chosen so that the magazine pivot member 1474 can fit into trough 848 formed in bottom access recess 846. The magazine pivot member 1474 has a lower pivot lip 1478 which is notched on the grasping side to form an inclined indentation 1480.

Figure 15A:
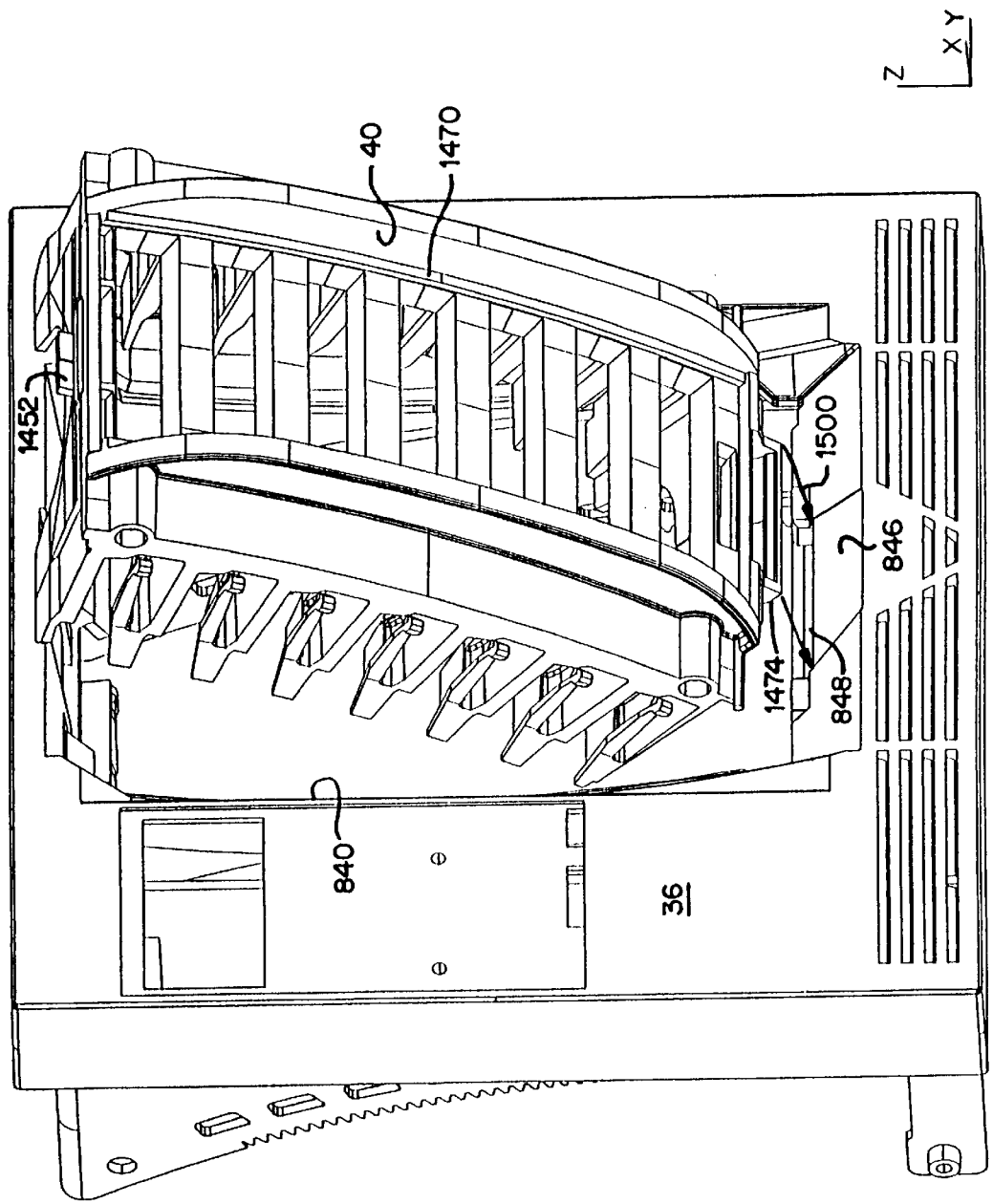
FIG. 15A and FIG. 15B are isometric views of two sequential initial stages of inserting the magazine of FIG. 14A–FIG. 14D into the cartridge library of FIG. 1.
Figure 15B:
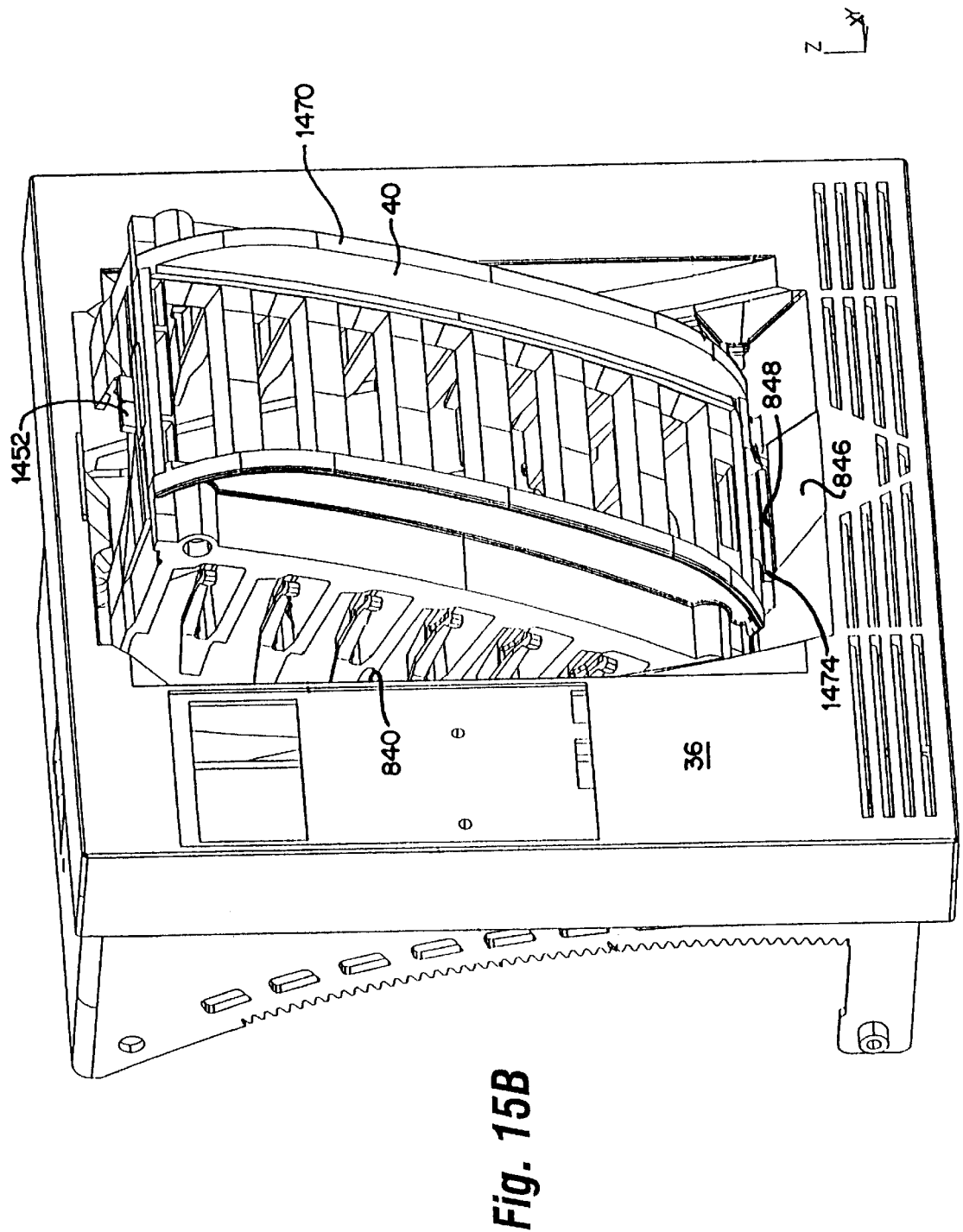

FIG. 15A and FIG. 15B show two sequential stages of inserting magazine 40 into cartridge library 20 through front wall 36. Although these figures show magazine 40 as not presently containing cartridges, it should be understood that cartridges can be stored in one or more of the cells 1400. For insertion of magazine 40, an (human) operator's hand grasp the grasping fins 1470. As shown in FIG. 15A, magazine 40 is first aligned with magazine-receiving aperture 840 of library front wall 36. The grasping side of magazine 40 is oriented toward the operator (being held in the operator's hand) and the cell side of magazine 40 is oriented toward the interior of magazine-receiving aperture 840. When being initially held for the insertion, the magazine 40 is inclined so that the bottom of magazine 40 precedes the remainder of magazine 40 into magazine-receiving aperture or cavity 840.

After the initial alignment of FIG. 15B, as shown in FIG. 15B the magazine pivot member 1474 is then inserted into trough 848 of front wall 36. FIG. 15A shows with arrows 1500 how edges of magazine pivot member 1474 are aligned with edges of trough 848 in order to obtain the insertion depicted by FIG. 15B.

After magazine pivot member 1474 of magazine 40 is inserted into trough 848 of front wall 36, the magazine 40 is pivoted within trough 848 on its magazine pivot member 1474 until the top of magazine 40 approaches the top of lateral side panels magazine-receiving aperture 840. Upon full extent of the pivoting, the magazine 40 assumes the position shown in FIG. 8A.

Figure 16A:
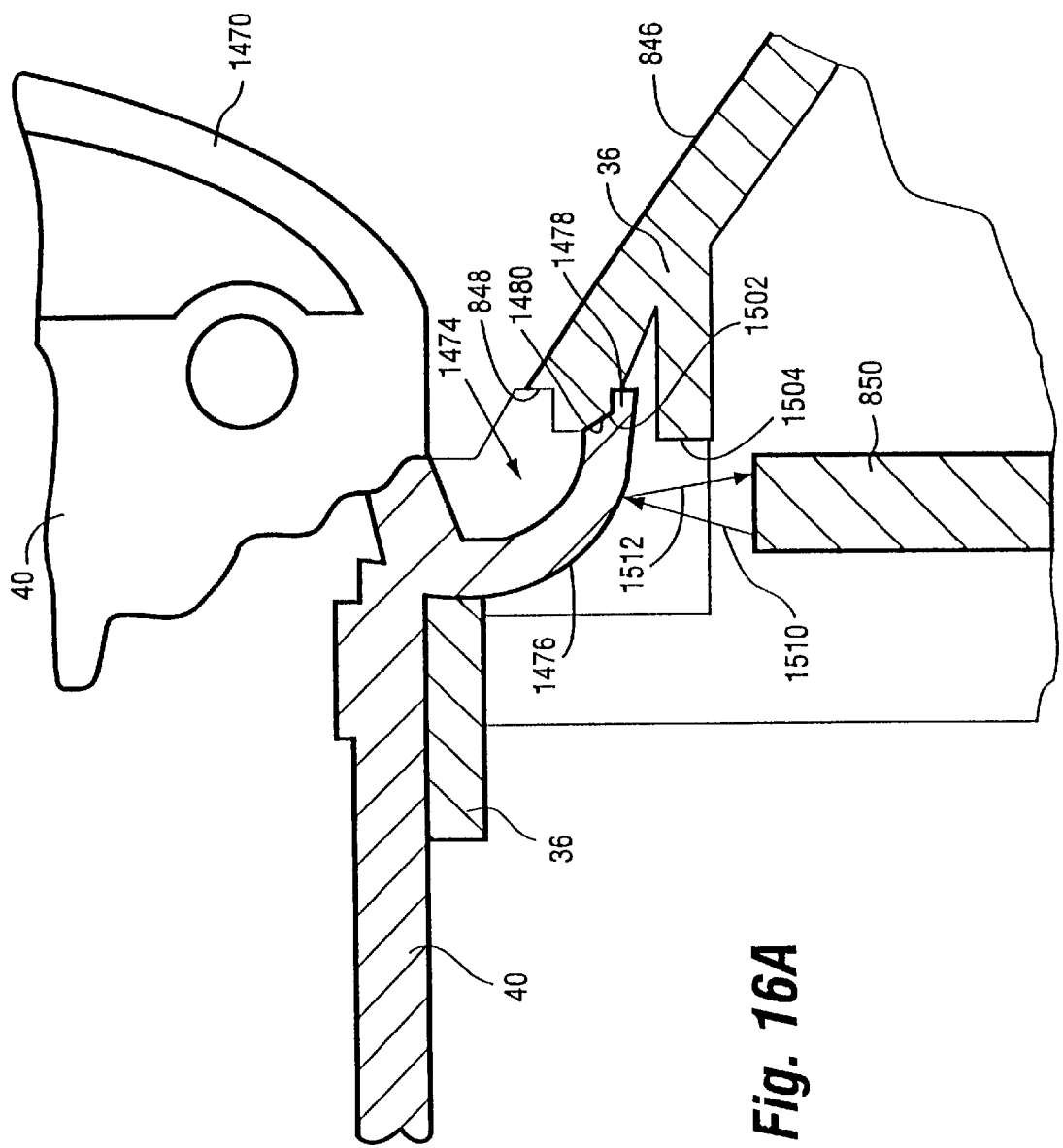
FIG. 16A is a sectioned side view showing bottom portions of a magazine inserted into the cartridge library of FIG. 1, and particularly mating of a magazine pivot member in a trough of a front wall of the library.

FIG. 16A shows how magazine pivot member 1474 mates with trough 848 of front wall 36 of cartridge library 20. When magazine 40 is being inserted, lower pivot lip 1478 of magazine 40 is first inserted into trough 848 and then pivoted about an pivot axis 1602 which is perpendicular to the plane of the sheet of FIG. 16A. The semicylindrical pivot surface 1476 enables lower pivot lip 1478 to descend into trough 848 and to bear against pivot axis 1502, which is a backside surface 1504 of bottom access recess 846. The backside of bottom access recess 846 is stepped so that the inclined indentation 1480 of magazine pivot member 1474 can mate therewith when magazine 40 is pivoted to its totally inserted position. The mating of lower pivot lip 1478 with the backside of bottom access recess 846 serves to secure or lock the bottom of magazine 40 into cartridge library 20.

When in the position shown in FIG. 16A, the presence of magazine 40 is detected by magazine presence sensor 850. As shown in FIG. 16A, magazine presence sensor 850 is positioned to have a field of view upwardly through an aperture 1504 in the bottom of trough 848 of front wall 36. For example, a incident beam emitted from magazine presence sensor 850 and a reflected beam (reflected from the bottom of magazine pivot member 1474 of magazine 40) are depicted by broken lines 1510, 1512, respectively, in FIG. 16A.

Figure 16B:
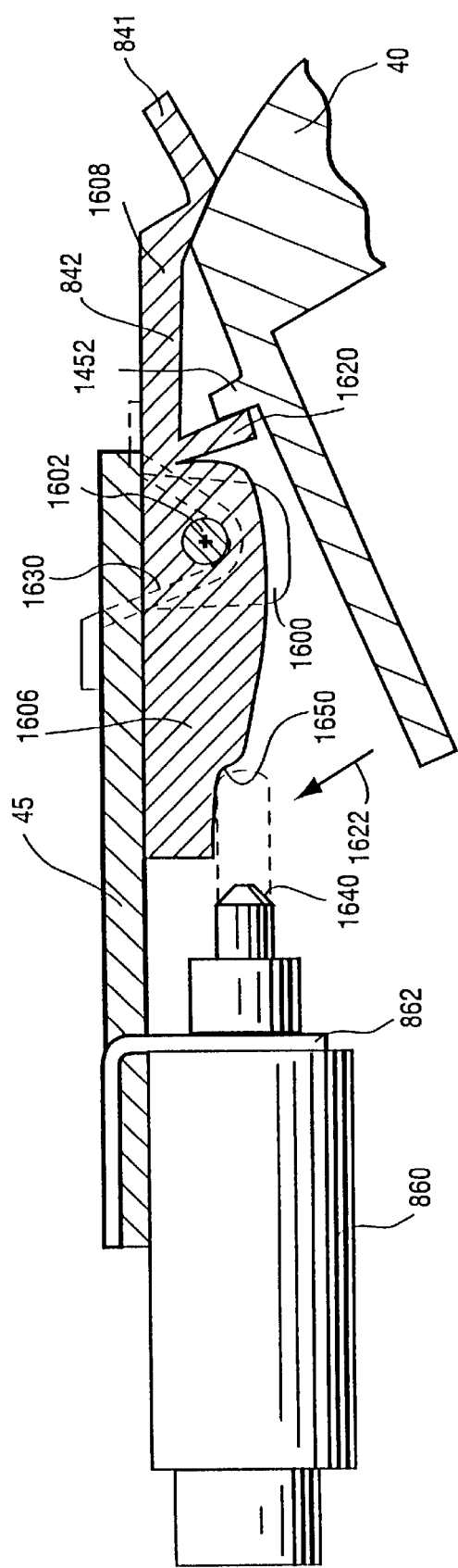
FIG. 16B is a sectioned side view showing top portions of a magazine inserted into the cartridge library of FIG. 1.

When fully inserted into magazine-receiving aperture 840 of front wall 36 of cartridge library 20, the top of magazine 40 is engaged by magazine latch assembly 842 in the manner shown in FIG. 16B. The underside of the top surface of magazine mounting assembly 45 has two spaced apart flanges 1600 depending therefrom. Each flange 1600 has an aligned aperture therein to receive a pivot shaft 1602. The magazine latch assembly 842 can pivot about pivot shaft 1602 when magazine latch assembly 842 is unlocked. As shown in FIG. 16B, magazine latch assembly 842 has a latch body portion 1606 which extends between the flanges 1600 and which has an aperture for accommodating pivot shaft 1602. Extending forwardly from latch body portion 1606 is a projection 1608. At its end, projection 1608 has the two V-shaped tab 841 (as seen in cross section) formed thereon. The tabs 841 bear against the very top of the grasping side of magazine 40 when magazine 40 is inserted into magazine-receiving aperture 840. On its underside, the projection 1608 has a stop flange 1620 depending therefrom. When magazine 40 is fully inserted into magazine-receiving aperture 840, the magazine stop 1452 abuts 1620, thereby precluding magazine 40 from pivoting further about pivot axis 1502 or any further insertion into magazine-receiving aperture 840. The magazine latch assembly 842 is biased about pivot shaft 1602 in the direction shown by arrow 1622 by a torsion spring 1630.

The magazine latch solenoid 860 functions to lock magazine latch assembly 842 in the position shown in FIG. 16B when solenoid piston 1640 is in the extended position shown by broken lines in FIG. 16B. The extended solenoid piston 1640 bears against a tail edge 1650 of magazine latch assembly 842, thereby locking magazine latch assembly 842 essentially flush against the underside of the top surface of magazine mounting assembly 45 (e.g., as shown in FIG. 16B). When magazine latch assembly 842 is so locked, a magazine 40 already in magazine-receiving aperture 840 cannot be removed. When solenoid piston 1640 is in its retracted position, the magazine latch assembly 842 is biased in the direction of arrow 1622 about pivot shaft 1602. e.g., toward a flush contact with the underside of the top surface of magazine mounting assembly 45. However, the biasing of torsion spring 1630 can be overcome by the operator inserting the magazine 40 into magazine-receiving aperture 840 in the manner previously described. When fully inserted, the magazine stop 1452 will abut stop flange 1620 of magazine latch assembly 842, and the tabs 841 of magazine latch assembly 842 will engage the grasping side of magazine 40 to retain the magazine 40 in magazine receiving aperture 840. Then, once the magazine latch solenoid 860 is activated to lock the magazine latch assembly 842, the magazine 40 is securely locked into magazine mounting assembly 45.

Orderly insertion of magazine 40 into magazine mounting assembly 45 presumes that all cartridges C have been properly loaded into magazine 40 prior to insertion. If cartridges are misinserted (e.g., inserted backwardly) into magazine 40, the magazine 40 has structure which precludes insertion of magazine 40 into magazine mounting assembly 45.

Figure 17A:
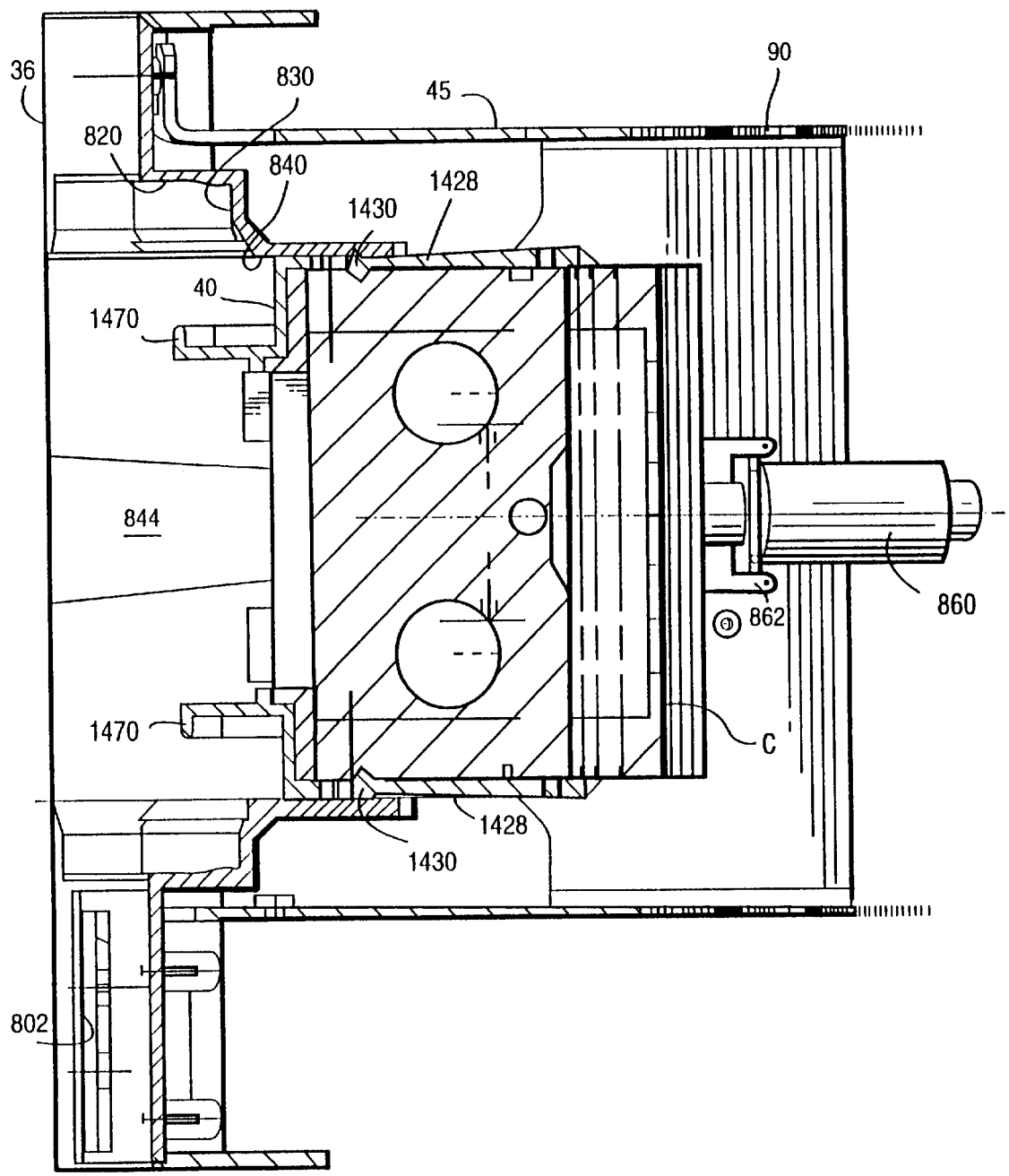
FIG. 17A is a cross-sectioned bottom view showing insertion of the magazine of FIG. 14A–FIG. 14D into the cartridge library of FIG. 1 when a cartridge is properly situated in a cell of the magazine.

In the above regard, FIG. 17A shows a properly loaded cartridge C residing in a cell 1400 of magazine 40. In view of the fact that the cartridge is properly loaded in magazine 40, when magazine 40 is inserted into magazine-receiving aperture 840 the cantilevered misinsertion arm 1428 on each side of the cell resilient bends and the enlarged heads 1430 at the distal ends of the cantilevered misinsertion arm 1428 are accommodated into notches N formed in the cartridge in the manner shown in FIG. 17A.

Figure 17B:
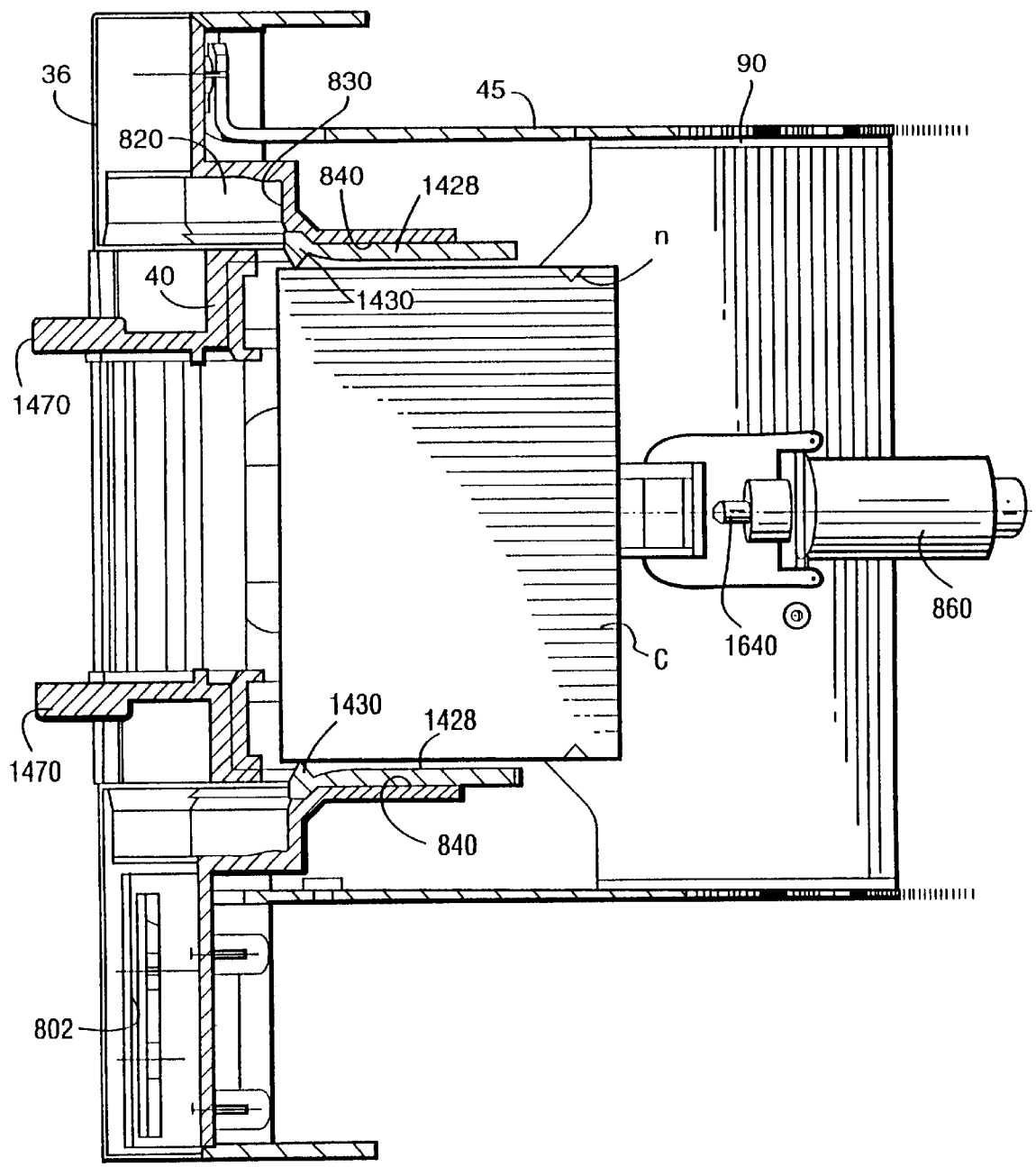
FIG. 17B is a cross-sectioned bottom view showing insertion of the magazine of FIG. 14A–FIG. 14D into the cartridge library of FIG. 1 when a cartridge is improperly (e.g., backwards) situated in a cell of the magazine.

On the other hand. FIG. 17B shows what happens when the cartridge is loaded backwardly into magazine 40. Since the cartridge C of FIG. 17B is inserted backwardly, the notches n of the cartridge are not properly positioned to accommodate the enlarged head 1430 of cantilevered misinsertion arm 1428. Therefore, the enlarged head 1430 are deflected outwardly from the cartridge C rather than being accommodated by a notch or other physical indentation formed in the cartridge. In such situation, when magazine 40 is inserted into magazine-receiving aperture 840, the cantilevered misinsertion arms 1428 of the ill-loaded cell deflect outwardly in the manner shown in FIG. 17B, and strike against the front surfaces of magazine mounting assembly 45 in such a manner as to preclude full insertion of magazine 40 into magazine-receiving aperture 840.

FIG. 18A–FIG. 18D show another embodiment of a magazine latch assembly for magazine mounting assembly 45, particularly magazine latch assembly 1842. The magazine latch assembly 1842 differs from the previously magazine latch assembly 842 (see, e.g., FIG. 16B) primarily in providing a resilient damping upon insertion of magazine 40 into the top of magazine-receiving aperture 840. Elements depicted in FIG. 18A–FIG. 18D which are common to comparable elements of the previous embodiment remain numbered as previously.

Figure 18A:
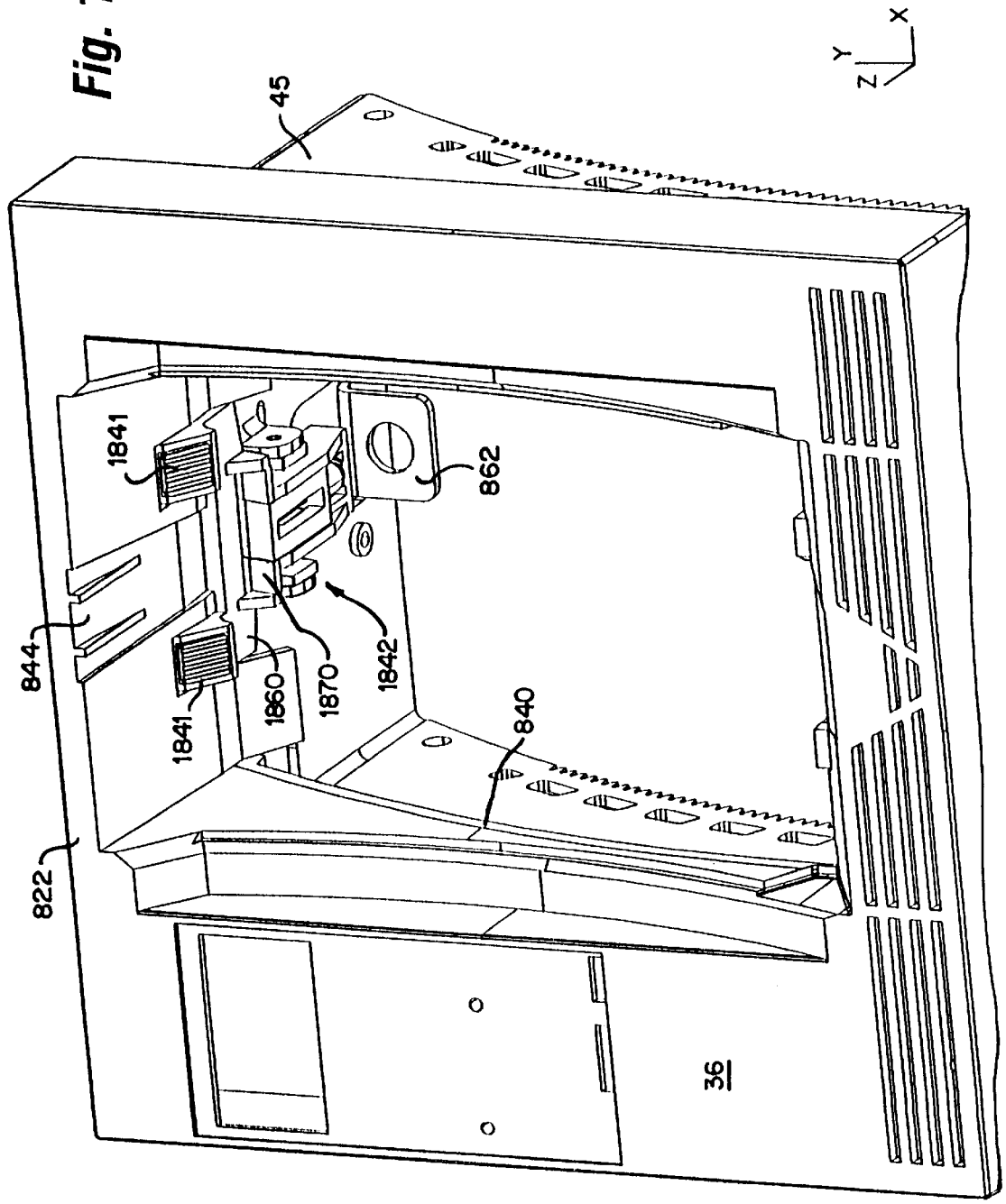
FIG. 18A is a front perspective view from below of a front panel of a cartridge library with an insertion-force dampening magazine latch assembly.
Figure 18B:
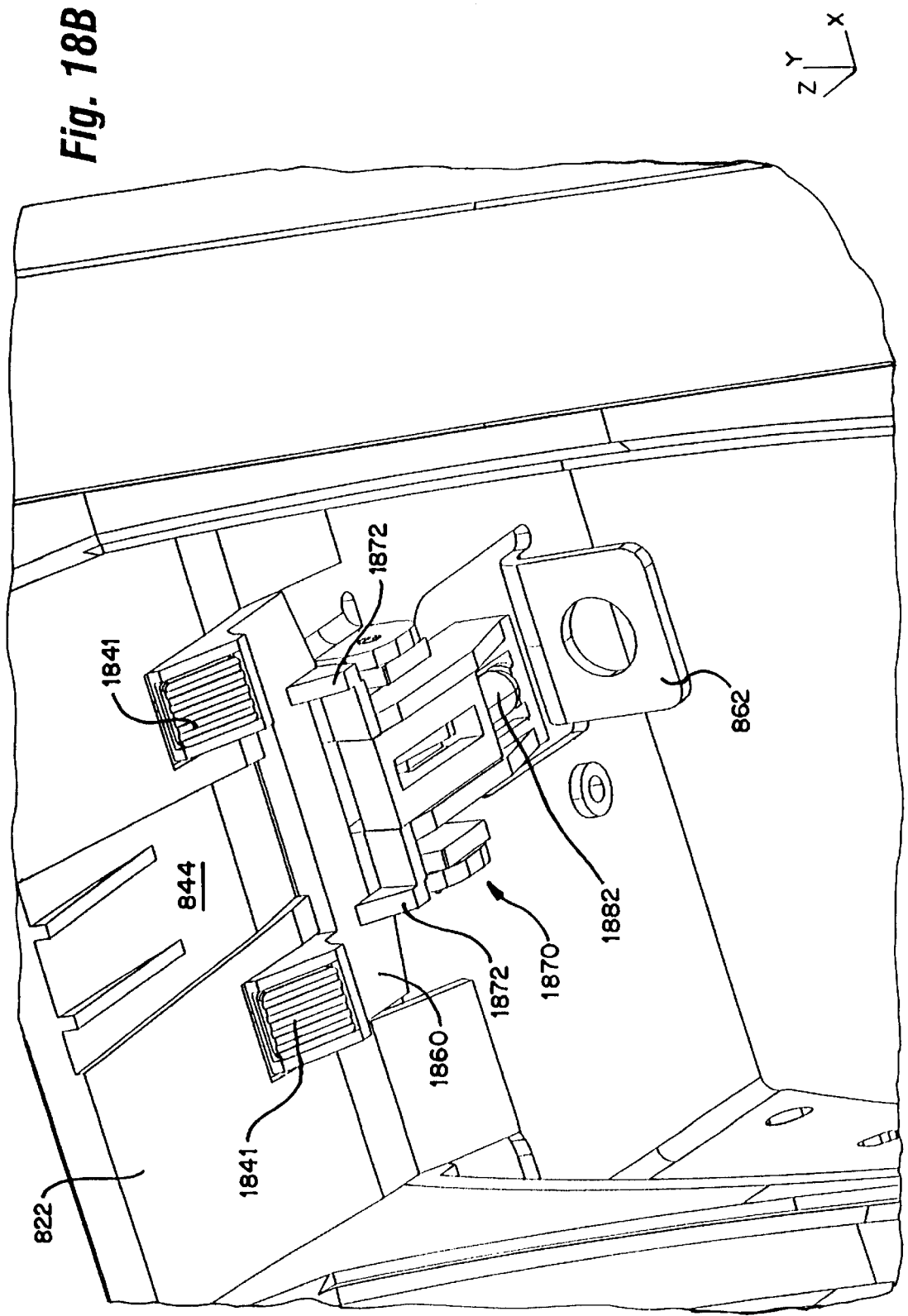
FIG. 18B is an enlarged view of a portion of FIG. 18A.
Figure 18C:
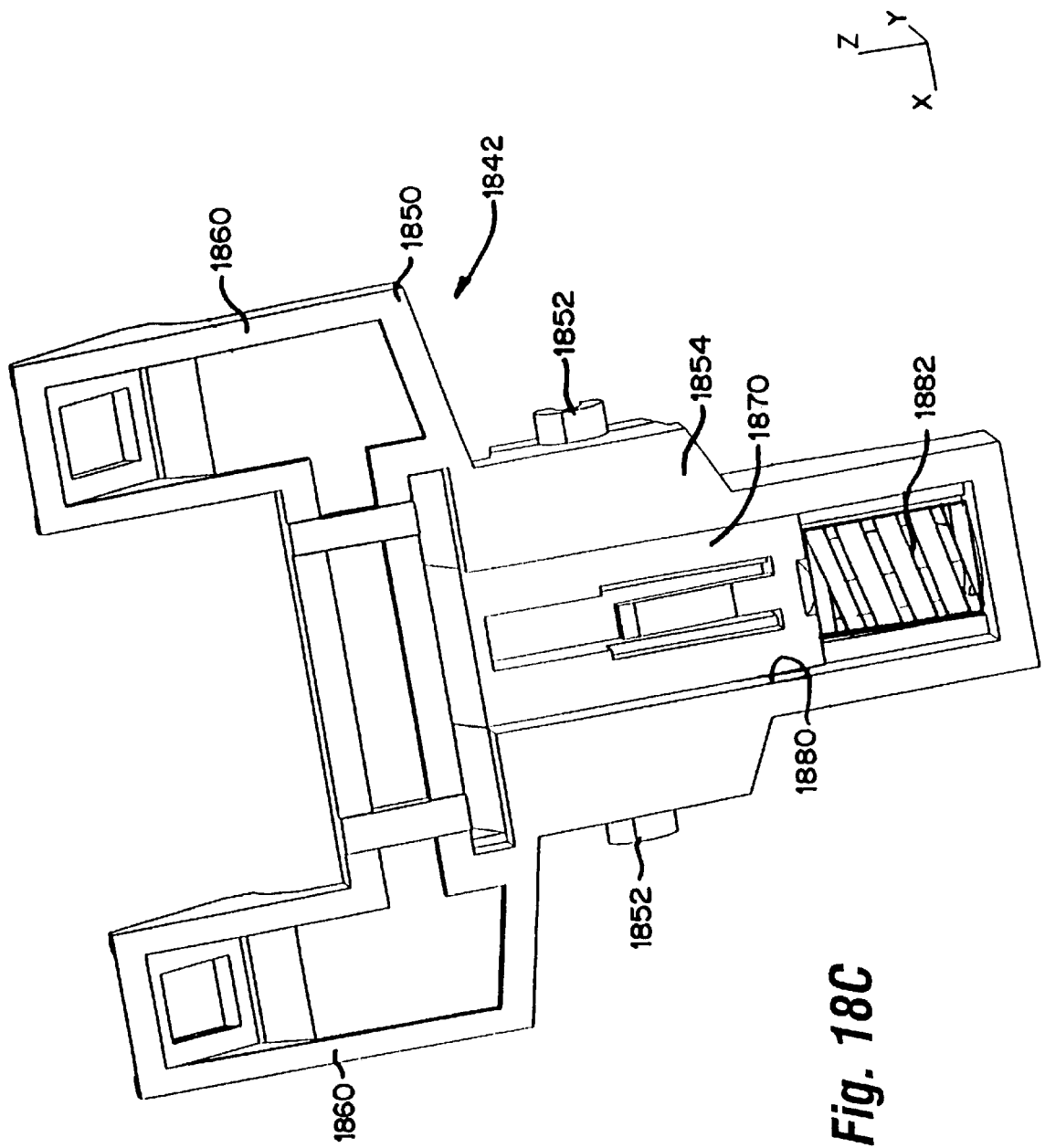
FIG. 18C is a top perspective view of the insertion-force dampening magazine latch assembly of FIG. 18A.

As seen from its top in FIG. 18C, magazine latch assembly 1842 comprises a pivoting latch member 1850 which pivots about pivot pins 1852 formed on tail section 1854 thereof. The pivoting latch member 1850 has two forwardly extending arms 1860. The distal end of arms 1860 have V-shaped tabs 1841 formed on an underside thereof, as seen in FIG. 18A and FIG. 18B. The underside of pivoting latch member 1850 carries a T-shaped plunger 1870. Plunger 1870 has two spaced apart ramped surfaces 1872 at its forward end which contact a magazine 40 being inserted into magazine-receiving aperture 840. A tail section of plunger 1870 slides in a groove 1880 formed in tail section 1854 of latch member 1850. Plunger 1870 is biased forwardly toward an inserting magazine 40 by spring 1882 which also resides in groove 1880 of tail section 1854.

Figure 18D:
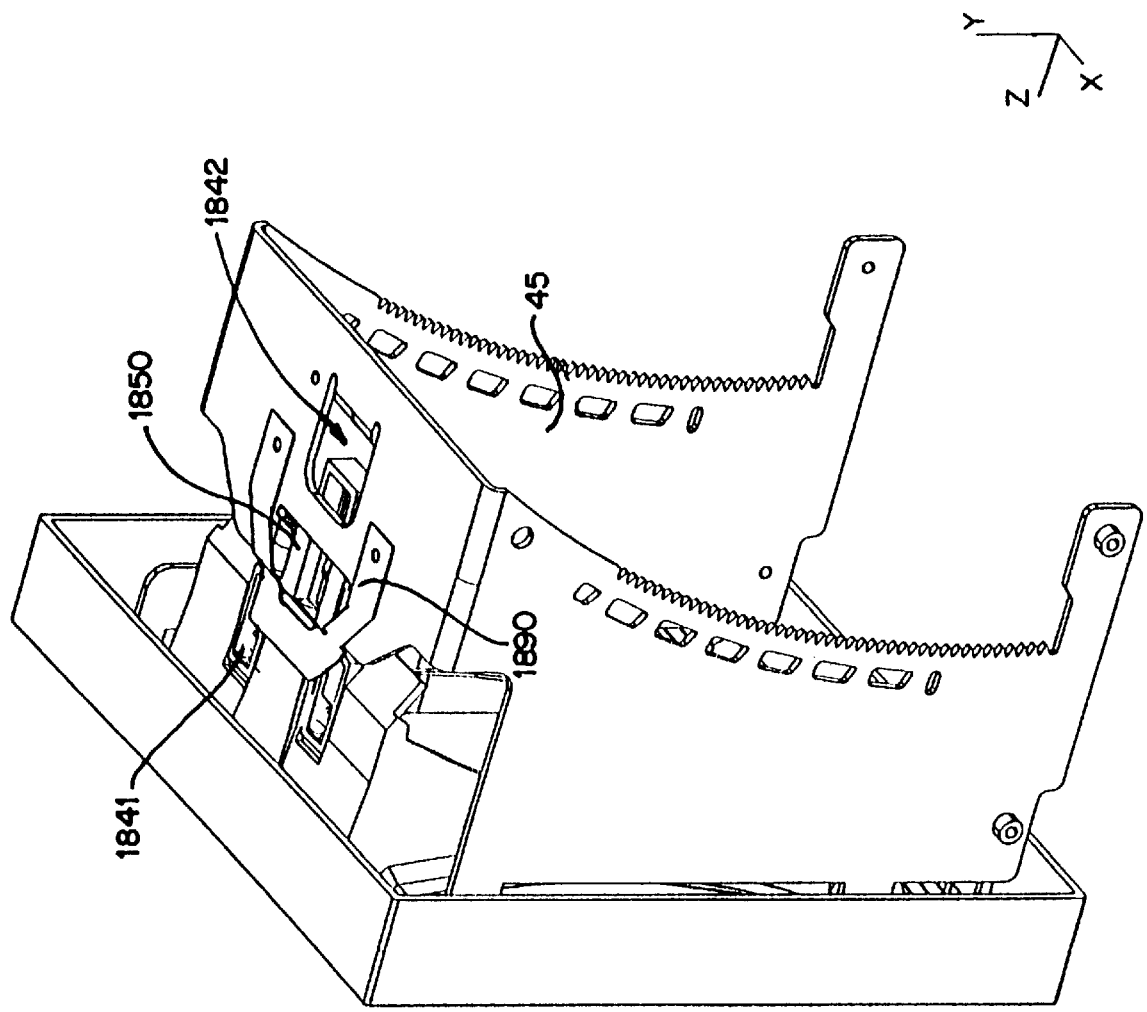
FIG. 18D is a side and rear perspective view of a magazine mounting assembly which has mounted thereon the insertion-force dampening magazine latch assembly of FIG. 18A.

As shown in FIG. 18D, a leaf spring 1890 attached to the top of magazine mounting assembly 45 biases the pivoting latch member 1850 to protrude slightly into magazine-receiving aperture 840, e.g., toward an inserting magazine. As a magazine is inserted into the top of aperture 840, the magazine exerts an upward force on pivoting latch member 1850, thereby causing latch member 1850 to pivot against the biasing force of leaf spring 1890. As the magazine 40 rides under the tabs 1841 and into place, the magazine bears against ramps 1872 of plunger 1870, causing plunger 1870 to absorb resiliently the insertion force of the magazine. Due to the dampening of the insertion force of the magazine by plunger 1870, the cartridges in the magazine tend to remain in their cells and do not become dislodged from the magazine.

Figure 9:
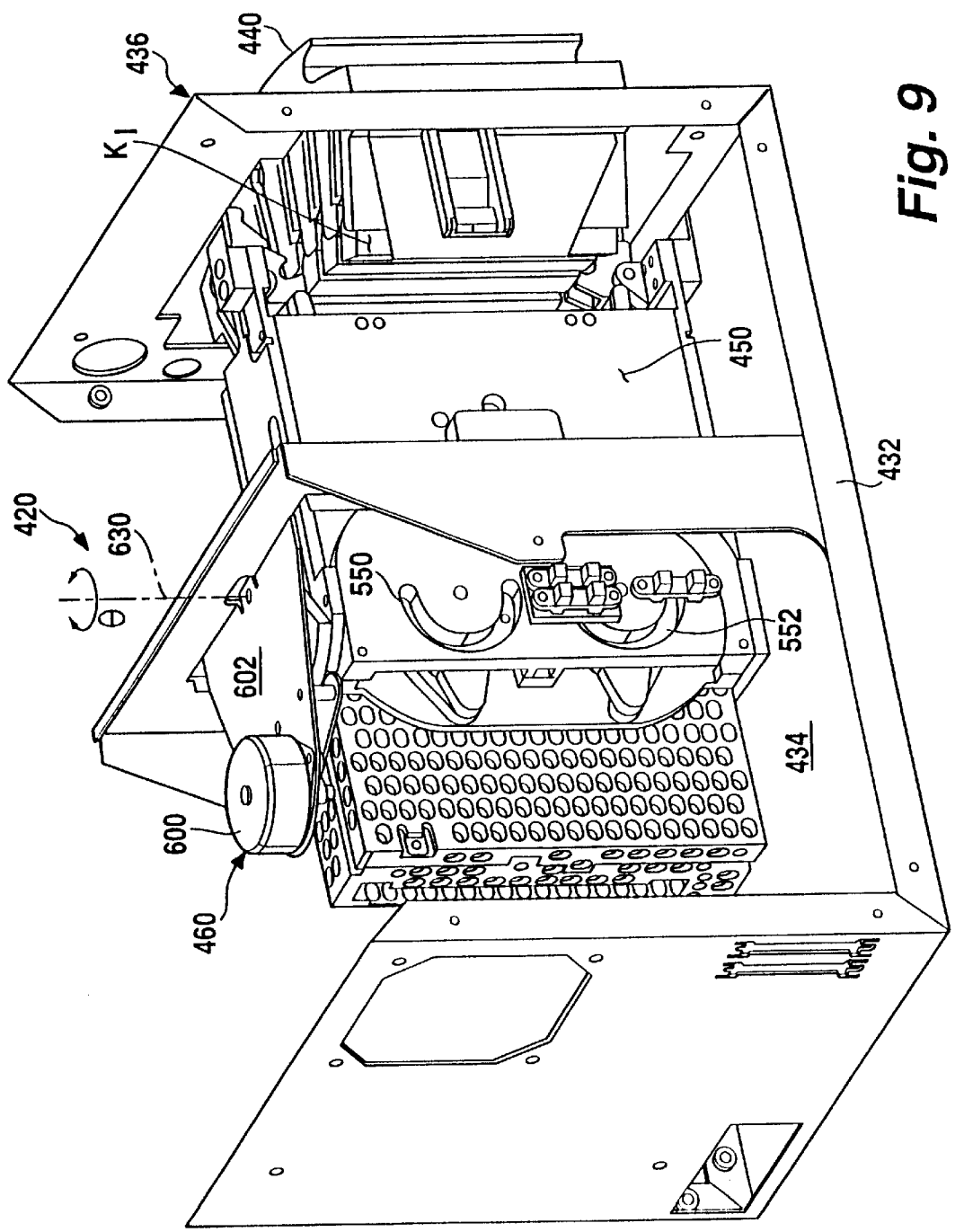
FIG. 9 is a left side perspective view, with cover removed, of a cartridge library according to a second embodiment of the invention.
Figure 10:
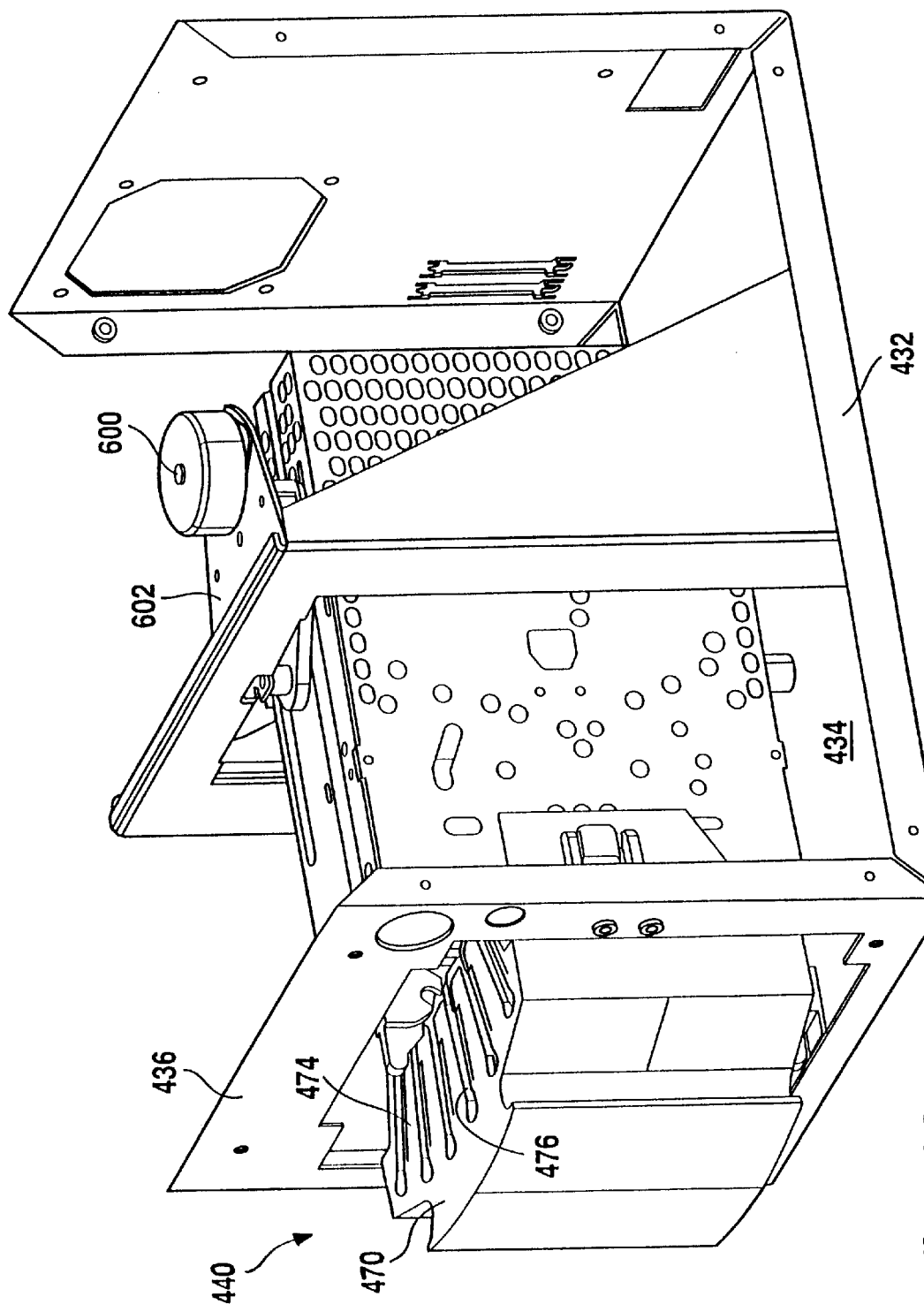
FIG. 10 is a right side perspective view of the cartridge library of FIG. 9.

FIG. 9 and FIG. 10 show a second embodiment of a cartridge library, particularly cartridge library 420 wherein cartridges $K_1$, $K_2$, ... $K_6$ are stored. Cartridges $K_1$, $K_2$, ... $K_6$ are eight millimeter tape cartridges, such as ANSI Standard eight millimeter tape cartridges, for example. Hereinafter, in connection with cartridge library 420, when reference is made to a cartridge generally rather than to any particular cartridge, such representative cartridge is denominated simply with reference letter "K". It should be understood that cartridge library 420 is not limited to the particularly illustrated type of data cartridges, but that other cartridges can instead be utilized.

Cartridge library 420 has a frame 432 and an unillustrated cover (which has been removed in FIG. 9 and FIG. 10 to reveal internal structure of the library). Frame 432 includes a bottom or base plate 434 and a front wall 436. Mounted within frame 432 are an array 440 of cartridges (also known as the cartridge storage section); drive assembly 450 drive assembly transport system 460, and a controller 465. Controller 465 is mounted on a circuit board which in turn is mounted to frame 432. The controller circuit is oriented on edge and is mounted through a SCSI connector to a rear panel of the chassis of the library.

Frame front wall 436 has an aperture therein to accommodate cartridge storage section 440. Cartridge storage section 440 has mounting wall 470 which is generally arcuate. A rear surface of mounting wall 470 has radially extending partitions 474 (see FIG.). Partitions 474 form a plurality of cells 476 for receiving cartridges $K_1$, $K_2$, ... $K_6$.

Figure 11:
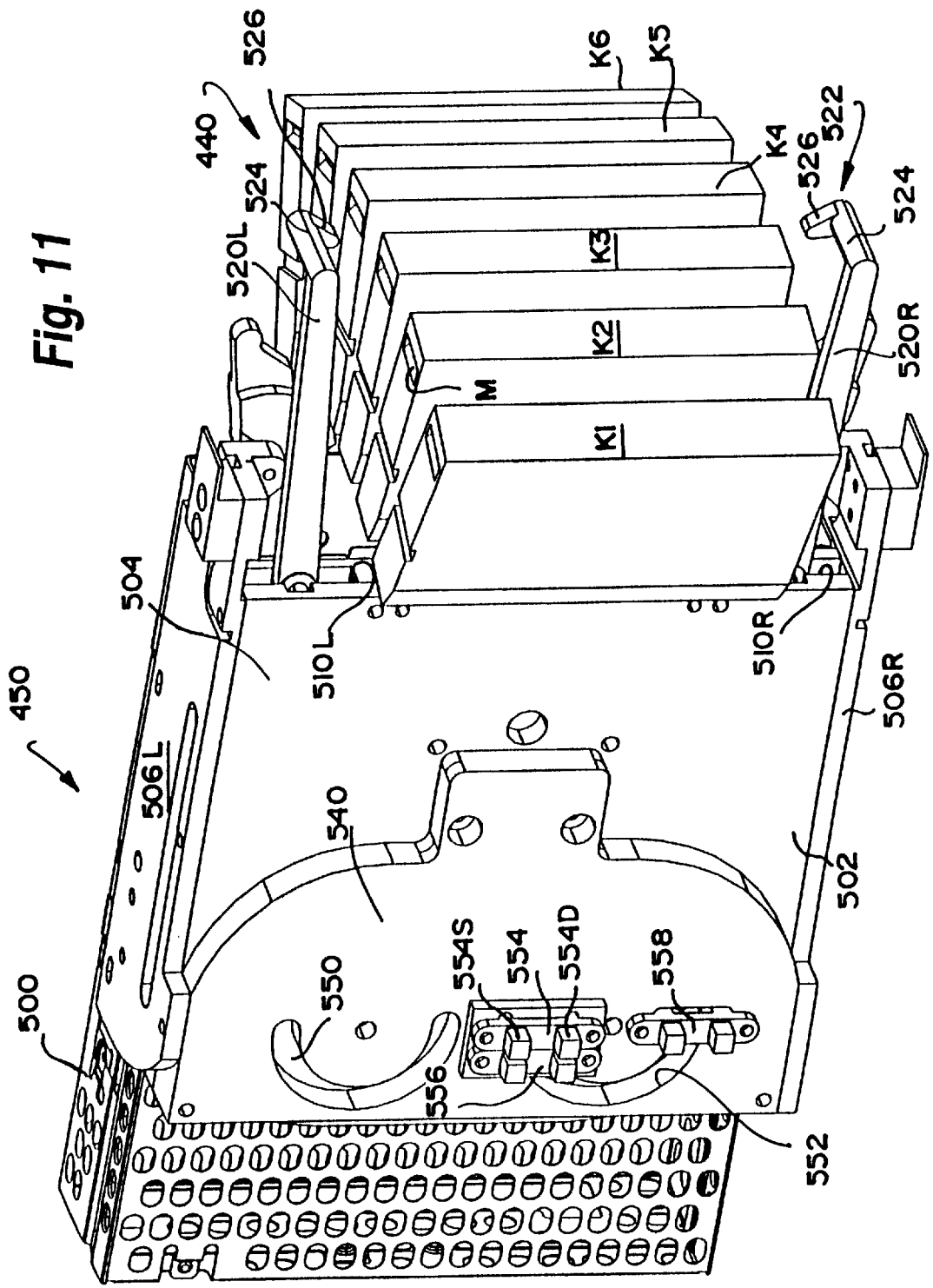
FIG. 11 is a side perspective view of a drive assembly for use in the cartridge library of FIG. 9.

FIG. 11 shows drive assembly 450 of cartridge library 420. Drive assembly 450 includes drive 500 which is mounted in carriage 502. Carriage 502 has an essentially rectangular mounting plate 504, and opposing side walls 506. In addition, carriage 502 has a front wall 508 (see FIG. 12). Front wall 508 has two rectangular apertures 510 through which engagement arms 520 extend.

Carriage mounting plate 504 has both a sensing side (shown in FIG. 11 and FIG. 12) and a caming side (shown in FIG. 13A through FIG. 13E). While carriage mounting plate 504 is generally planar, at its rear carriage mounting plate 504 has an offset portion which appears as plateau 540 on the sensing side and as a recess 542 on its caming side.

Drive 500 is secure to carriage mounting plate 504 with threaded fasteners through existing threaded holes in the housing of drive 500.

As shown in FIG. 11, at their distal ends engagement arms 520 have an "L" shaped actuator finger 522 perpendicularly projecting therefrom. Finger 522 has a cylindrical extension 524 and a generally triangularly shaped finger tip 526. Finger tip 526 is configured to engage a cartridge changer notch M provided in cartridge K.

At its rear, cartridge mounting plate 504 has two semicircular grooves 550, 552 extending therethrough. As described further herein, a photointerrupter protrudes through groove 552 and travels along the arcuate path of groove 552. In the course of its travel, the photointerrupter interrupts an optical beam for each of three sensor assemblies 554, 556, and 558 which are mounted on the sensing side of cartridge mounting plate 504. Each sensor assembly 554, 556, and 558 comprises a bridge which extends over groove 552. On the underside of each bridge, an electromagnetic beam travels from source to sensor. Although the beam as such is not illustrated, a backside of the beam source and beam detector for each sensor assembly is shown in FIG. 11. For example, sensor assembly 554 has a source 554S and a detector 554D.

Caming side of cartridge mounting plate 504 is shown in each of FIG. 13A through FIG. 13E. As mentioned above, recess 542 is formed in caming side of cartridge mounting plate 504. Recess 542 has two eccentrics 570 rotatably mounted thereon. Each eccentric 570 has a toothed or geared periphery. One of eccentrics 570 has the photointerrupter 571 positioned radially thereon to extend through groove 552 (see FIG. 12). Between and meshing with each eccentric 570 is worm gear 574. Worm gear 574 is rotatably retained in recess 542 and has a driven end thereof connected to drive motor 576. Drive motor 576 is also mounted within recess 542.

Each eccentric 570 is predominately circular, with an eccentric connector 580 provided at a chordal portion thereof. Eccentrics 570 can have their respective connectors 580 formed integrally therewith. Eccentric connector 580 carries a pivot pin 582 to which a proximal end of engagement arm 520 is pivotally connected.

The cartridge loader of the second embodiment includes both engagement arms 520 and flipper assemblies hereinafter described. Each engagement arm 520 is a rigid unitary piece comprising two segments, particularly segment 584 and forearm segment 586. Arm segments 584 are biased towards one another by extension springs 589. At the intersection of segments 584, 586, each engagement arm 520 carries a cam follower pin 588.

With respect to FIG. 13A, cam follower pin 588 of engagement arms 520 extends below engagement arms 520 and into caming groove 590. As explained hereinafter, caming groove 540 serves to define a path of travel of engagement arm 520 as the cartridge loader moves through each of its critical positions as shown in each of FIG. 13A, FIG. 13B, FIG. 13C, FIG. 13D, and FIG. 13E.

Forwardly projecting from each of side walls 506 of carriage 502 is a secondary cartridge contacting assembly, also known as flipper assembly 600. As described in more detail hereinafter, flipper assemblies 600 are actuated in response to movement of engagement arms 520. Flipper assembly 600 comprises a cartridge contact element 602 which serves to perform a "soft load" of a cartridge K which has already been partially inserted into drive 500. In addition, cartridge contact element 602 serves as a stop and registrar when cartridge K is being ejected or discharged from drive 500.

Flipper assembly 600 includes protrusions in the form of a mounting plate 610 which extends from a forward edge of carriage side wall 506. Second cartridge contact element 602 is pivotally connected to mounting plate 610 at point 612 (see FIG. 13A). In addition, torsion springs connect cartridge contact element 602 and mounting plate 610, but are concealed in recession portions connect cartridge contact element 602 and mounting plate 610. Cartridge contact element 602 is configured to have an arm follower notch 614, as well as two cartridge cooperative surfaces 616, 618. Cartridge cooperative surface 616, which is essentially rounded, serves to push cartridge K into drive 500 during a soft load. Cartridge cooperative surface 618, which is essentially linear, serves as a stop and registrar upon ejection of cartridge K.

Engagement arms 520 and flipper assemblies 600 serve the functions of primary and secondary cartridge loaders. The cartridge loading operation for loading cartridge K into drive 500 is now described with respect to the specific successive stages shown in FIG. 13A, FIG. 13B, FIG. 13C, FIG. 13D, and FIG. 13E.

Figure 13A:
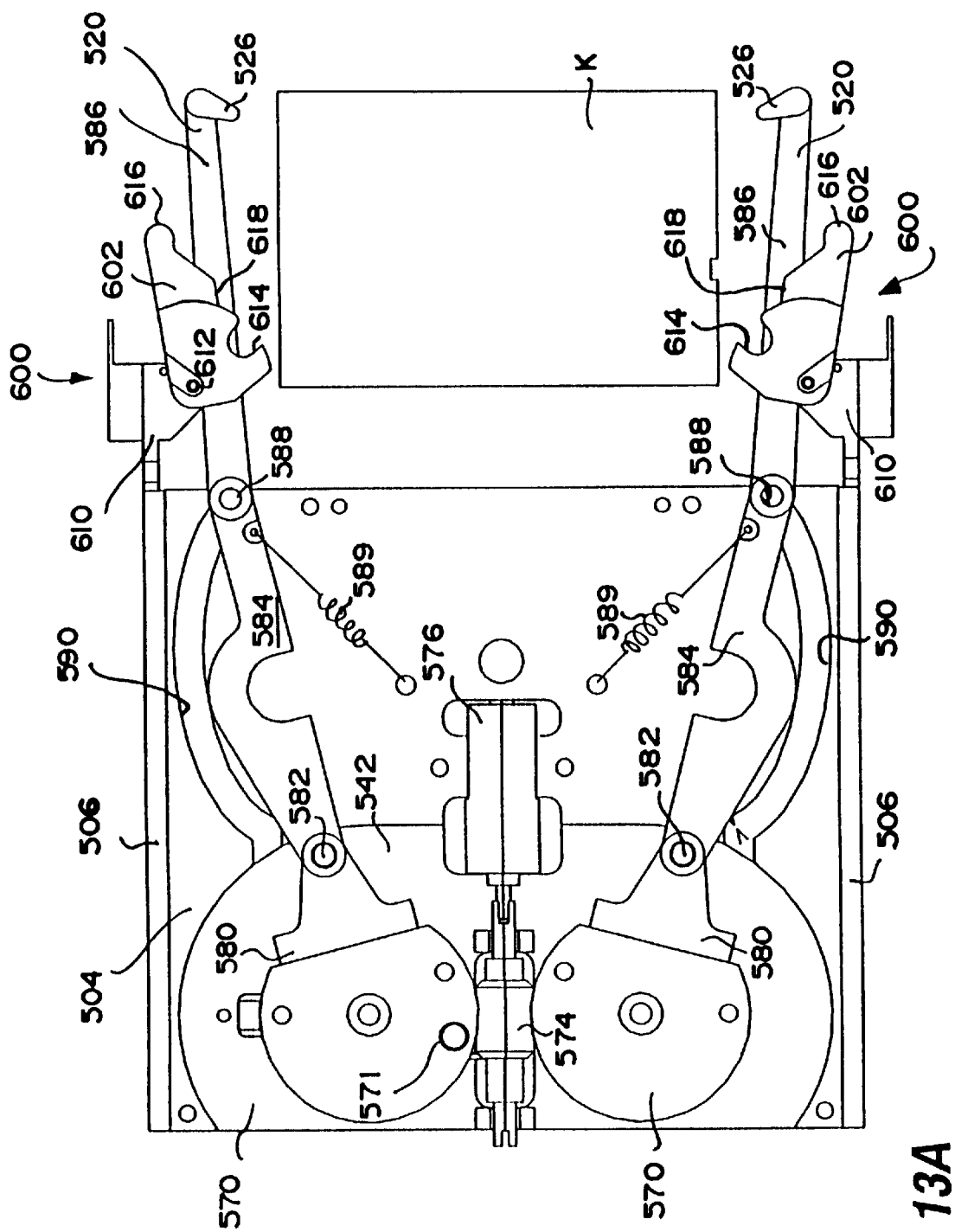
FIGS. 13A–13E are side views of differing portions of a cartridge loader included in the drive assembly of FIG. 11.

FIG. 13A shows a first position of the cartridge loader. In the first position, the cartridge loader has its engagement arms 520 in a fully extended and fully separated position in anticipation of gripping cartridge K (cartridge K being retained in cartridge storage section 440). By extended is meant that engagement arms 520 are at their farthest extent of travel toward cartridge storage section 440, and by separated is meant that engagement fingers 526 are at their greatest distance apart from one another. In the position shown in FIG. 13A, drive assembly 450 is free to move (e.g., rotate) into alignment with a selected cartridge K to be extracted from cartridge storage section 440. In the first position, cartridge contact element 602 of flipper assembly 600 is springbiased open by the unillustrated torsion springs.

The first position shown in FIG. 13A is a sensed position. That is, photointerrupter 571 trips the beam for sensor assembly 558 (see FIG. 12). Thus, controller 465 of cartridge library 420 knows that engagement fingers 526 are maximally extended and are spread apart and ready to grip cartridge k.

Figure 13B:
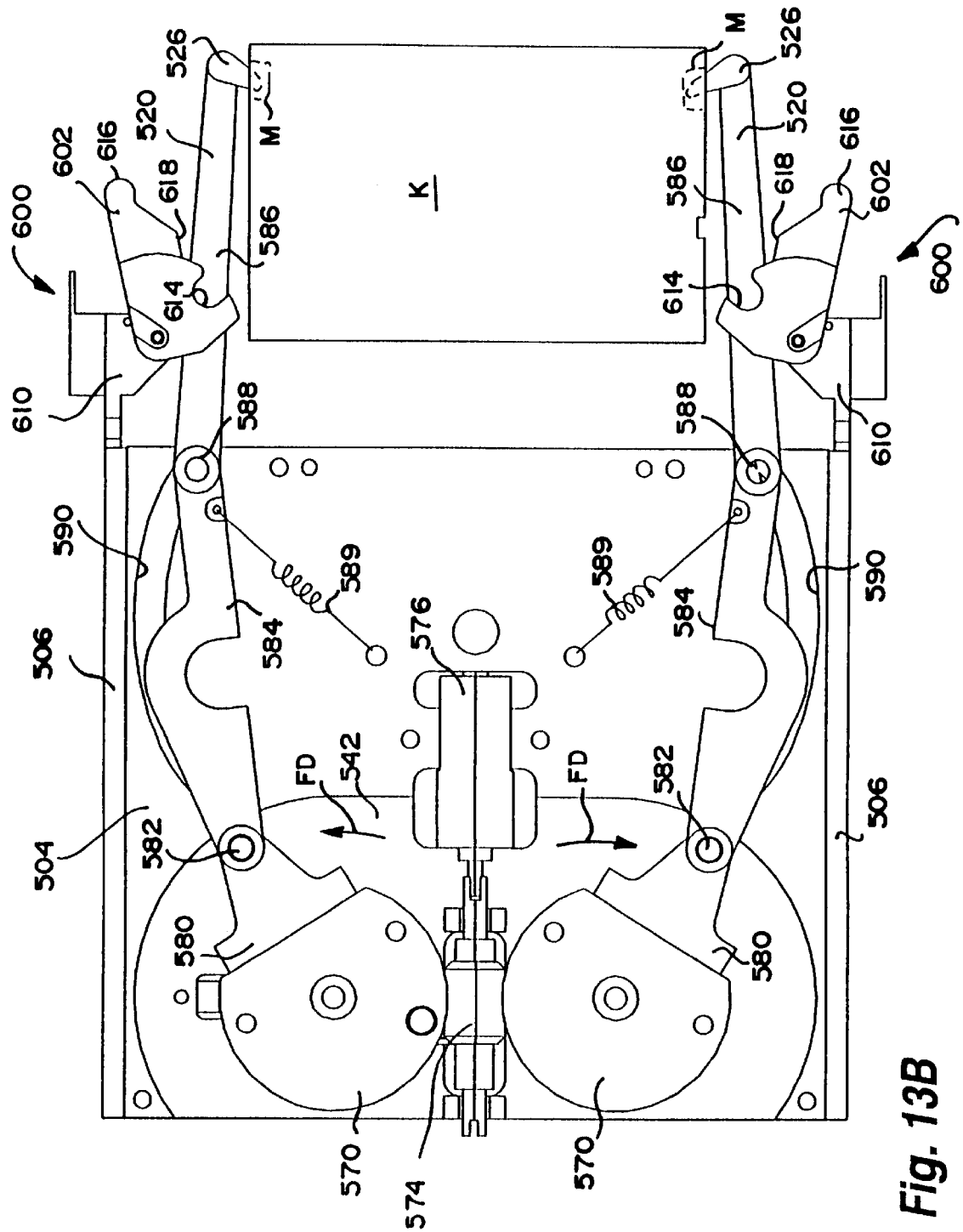

FIG. 13B shows a second position wherein fingers 526 first engage notch M of cartridge K. The position of FIG. 13B is attained as motor 576 rotates worm gear 574, causing eccentrics 570 to rotate in a forward direction shown by arrows FD. As eccentrics 570 rotate in the forward direction FD, cam follower pin 588 follows the cam groove 590, and particularly a segment of cam groove 590 at the front of drive assembly 450. Arcuate movement of cam follower pin 588 in cam groove 590 causes forearms 586 to pivot toward one another until finger tips 526 engage cartridge changer notches M. The second position of FIG. 13B is not sensed relative to photointerrupter 571. Flipper assemblies 600 are essentially uninvolved in the second position operations of FIG. 13B.

Figure 13C:
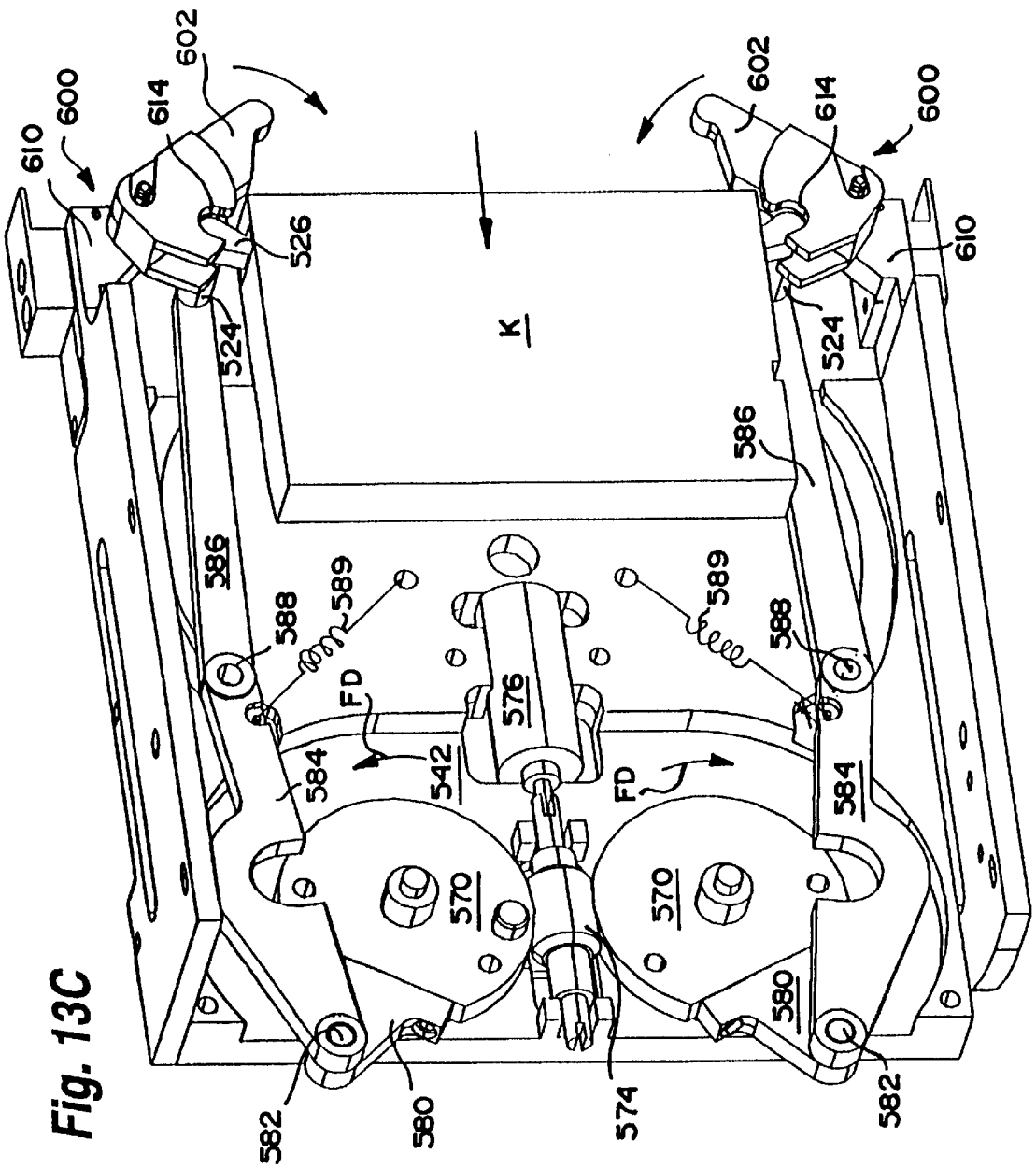

FIG. 13C shows a third position in which, as rotation continues in direction FD and as cartridge K is pulled toward drive 500, engagement arms 520 engage respective flipper assemblies 600. Referring again to FIG. 13B, continued travel of engagement arms 520 causes cylindrical extensions 524 of engagement arm 520 (see FIG. 11) to mate with respective arm follower notches 614 of flipper assemblies 600. Such actual mating in shown in FIG. 13C, where it is understood that continued retraction of engagement arm 520 (i.e., movement toward the left of the drawing) causes flipper assemblies 600, engaged by cylindrical extensions 524 of engagement arm 520, to pivot about their points of attachment to flipper assembly mounting plate 610. In other words, cartridge contact elements 602 of flipper assemblies 600 pivot toward one another.

Figure 13D:
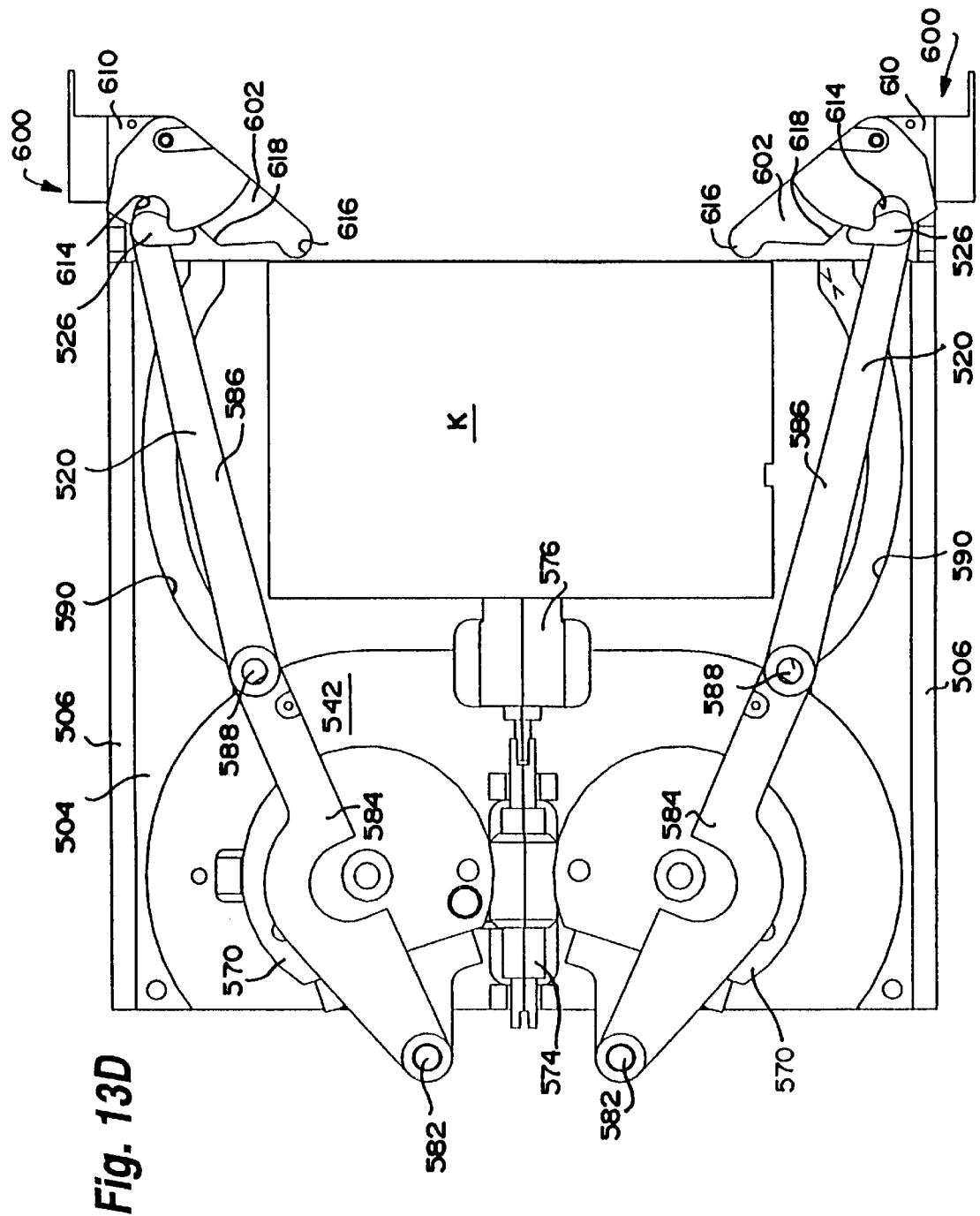

As understood from FIG. 13C, retraction of engagement arms 520 results in cartridge K being inserted into a slot of drive 500. However, contact of fingers 526 with cartridge K does not continue sufficiently to completely insert cartridge K into drive 500. In fact, as illustrated in FIG. 13D, upon continued retraction engagement arm 520 begin to separate before cartridge K is fully inserted into drive 500. The final push causing cartridge K to be fully inserted into drive 500 is provided by cartridge contact elements 602 of flipper assemblies 600. In this regard, the pivoting of cartridge contact elements 602 begun in FIG. 13C continues until cartridge cooperative surfaces 616 of flipper assemblies 600 abut cartridge K and shove cartridge K into drive 500. When completed pivoted, cartridge cooperative surfaces 616 are essentially flush with the front of drive 500, with the rounded tips thereof having pushed cartridge K through the slot of drive 500. The pivoting of flipper assemblies 600 results from retraction of engagement arms 520 in the manner above described. That is, as engagement arms 520 continue to retract (although at some point no longer themselves contacting cartridge K), cylindrical extension 524 mating with, notch 614 of flipper assembly 600 causes flipper assembly 600 to pivot in the manner shown in FIG. 13D.

Thus, FIG. 13D shows a fourth position of the cartridge loader of the presently described embodiment of the invention. FIG. 13D is a sensed position, since in order to reach the fourth position photointerrupter 571 must successively trip beams of both sensor assemblies 556 and 554 (see FIG. 12). Upon receiving signals indicative of tripping of beams of both sensor assemblies 556 and 554, controller 465 knows that cartridge K has been fully inserted into drive 500.

Prior to ejection of cartridge K from drive 500, controller 465 activates motor 576 so that eccentrics 570 rotate in a reverse direction (as indicated by arrows RD in FIG. 13E) to slightly extend engagement arms 520. Such rotation and extension, although slight, is shown by contrast of FIG. 13D with FIG. 13E. Extension of engagement arms 520 causes flipper assemblies 600 to pivot slightly away from one another, so that cartridge cooperative surfaces 618 are held stationary, slightly spaced away from, and parallel to the front surface of drive 500 as shown in FIG. 13E.

Figure 13E:
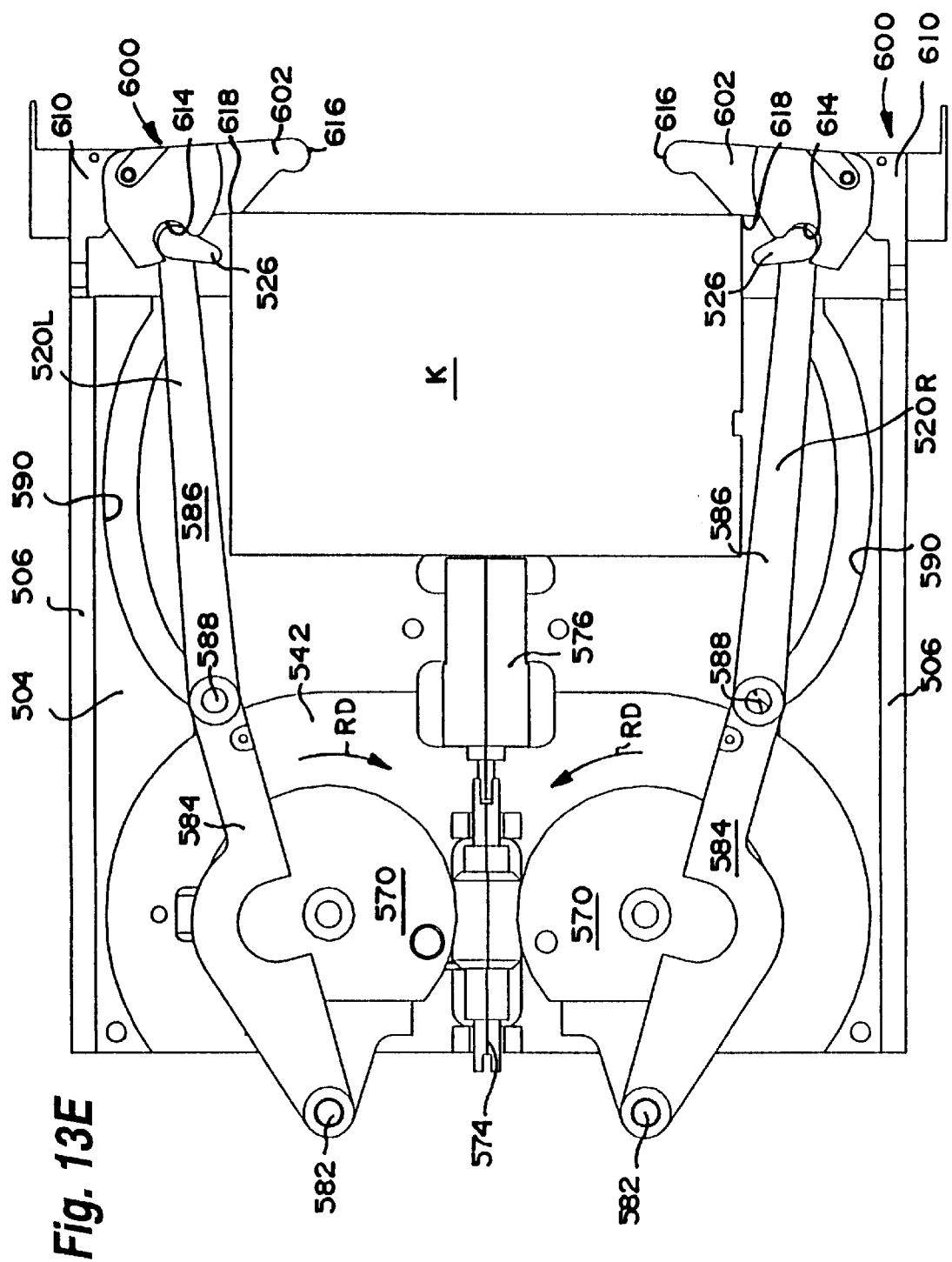

The degree of actuation of motor 576 to achieve the position of flipper assemblies 600 as shown in FIG. 13E is controlled by controller 465. In this regard, motor 576 is activated only until photointerrupter 571 trips the beam of sensor assembly 576 (see FIG. 11). Upon receiving a signal indicative of the tripping of the beam of sensor assembly 576, controller 465 deactivates motor 576 whereupon flipper assemblies 600 are precisely located in the positions shown in FIG. 13E.

While FIG. 13E shows cartridge K after having been ejected from drive 500, the pre-ejection position of flipper assemblies 600 can be appreciated. Prior to ejection, cartridge cooperative surface 618 is positioned essentially parallel to the front of drive 500, and thus essentially serves as a stop for cartridge K upon ejection of cartridge K. Therefore, when cartridge K is ejected from drive 500, cartridge K does not fall out of drive 500. Rather, because of the known position of cartridge cooperative surface 618, which is held stationary for abutment by cartridge K, cartridge K is registered and the location thereof precisely known.

After registration of cartridge K in the manner above described with respect to FIG. 13E, motor 576 is again activated for extending engagement arms 520. As engagement arms 520 are extended, fingers 526 engage notches M in cartridge K and carry cartridge K to a desired cell 476 in library 420. The cell in which cartridge K is deposited can be the same cell from which it was withdrawn or, alternatively, by virtue of movement of drive assembly 450, another cell with which drive assembly 450 becomes aligned.

Drive assembly transport system 460, under supervision of controller 465, is responsible for rotating drive assembly 450 into alignment with a selected cartridge cell 476. As shown in FIG. 9, drive assembly transport system 460 includes a motor 600 which is mounted to frame 432 by bracket 602. Drive assembly 450 is mounted to a shaft which is coincident with vertical axis 630. Drive assembly transport system 460 includes a gear on such shaft which is connected by suitable gearing to motor 600. Activation of motor 600 causes pivoting of the entire drive assembly 450 about axis 630.

As used herein, the term "library" is intended to include systems of varying degrees of intelligence and automation, including cartridge stackers and autoloaders. Moreover, it should also be understood that the term "cartridge" as employed herein is a synonym for cassette and other commonly employed terms describing a housing wherein transducable media is contained.

While the drive assemblies of the present invention have been illustrated as being angularly displaceable about a pivot point, it should be understand that other modes or directions of displacement are within the purview of the present invention. That is, the present invention is applicable to other embodiments in which a moveable drive assembly has cartridge loading mechanism(s) mounted thereto. For example, the drive assemblies of the present invention can be linearly translated or displaced into selective alignment with an array of linearly extending cartridge cells. Nor are the particular transport mechanisms illustrated herein deemed to be exhaustive or limiting.

Moreover, the number of cells shown in the libraries described above is merely illustrative. Greater or lesser numbers of cells can be provided.

Further, the controllers of the libraries of the present invention can perform further operations, including communications with the drives for facilitating e.g., processing of cartridges and/or insertion/ejection of cartridges.

Various features of the present invention can be made integral although perhaps not illustrated as such in the drawings. For example, injection molding can be employed to provide integral structure of various elements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data cartridge library comprising:
    a library frame;
    a magazine mounted to the frame for defining at least one cell for accommodating a data cartridge;
    a drive assembly for transducing information relative to storage media of the data cartridge when the data cartridge is inserted into the drive assembly;
    a cartridge transport assembly for selectively transporting the data cartridge between the drive assembly and the magazine, the cartridge transport assembly comprising:
    a carriage first section;
    a carriage second section which is translatable relative to the carriage first section;
    a pair of cartridge engagement arms mounted to one of the carriage first section and the carriage second section for selectively engaging and releasing the data cartridge;
    a motor mounted to one of the carriage first section and the carriage second section which serves both to actuate the pair of cartridge engagement arms and translation of the carriage second section in a direction toward and away from the magazine;
    wherein the cartridge transport assembly is pivotally mounted on the drive assembly at a pivot axis.

2. The apparatus of claim 1, wherein said cartridge transport assembly is directly mounted on the drive assembly.

3. A data cartridge library comprising:
    a library frame
    a magazine mounted to the frame for defining at least one cell for accommodating a data cartridge;
    a drive assembly for transducing information relative to storage media of the data cartridge when the data cartridge is inserted into the drive assembly;
    a cartridge transport assembly for selectively transporting the data cartridge between the drive assembly and the magazine, the cartridge transport assembly comprising:
    a carriage first section;
    a carriage second section which is translatable relative to the carriage first section;
    a pair of cartridge engagement arms mounted to one of the carriage first section and the carriage second section for selectively engaging and releasing the data cartridge;
    a motor mounted to one of the carriage first section and the carriage second section which serves both to actuate the pair of cartridge engagement arms and translation of the carriage second section in a direction toward and away from the magazine;
    wherein the cartridge transport assembly is pivotal about a pivot axis which is parallel to a longitudinal center line of the data cartridge when the data cartridge is inserted into the drive assembly.

4. The apparatus of claim 3, wherein said data cartridge center line is parallel to a longitudinal axis of said cartridge.

* * * * *